United States Patent
Hyoudou et al.

(10) Patent No.: US 10,333,817 B2
(45) Date of Patent: Jun. 25, 2019

(54) NON-TRANSITORY COMPUTER-READABLE STORAGE MEDIUM, COMMUNICATION DEVICE, AND DETERMINATION METHOD

(71) Applicant: FUJITSU LIMITED, Kawasaki-shi, Kanagawa (JP)

(72) Inventors: Kazuki Hyoudou, Chofu (JP); Osamu Shiraki, Kawasaki (JP); Jun Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 15/667,902

(22) Filed: Aug. 3, 2017

(65) Prior Publication Data

US 2018/0048553 A1 Feb. 15, 2018

(30) Foreign Application Priority Data

Aug. 10, 2016 (JP) .................................. 2016-158039

(51) Int. Cl.
*H04L 12/26* (2006.01)
*H04L 12/24* (2006.01)
*H04L 29/06* (2006.01)

(52) U.S. Cl.
CPC ........ *H04L 43/106* (2013.01); *H04L 41/0677* (2013.01); *H04L 43/0852* (2013.01); *H04L 43/0829* (2013.01); *H04L 69/161* (2013.01); *H04L 69/22* (2013.01); *H04L 69/28* (2013.01)

(58) Field of Classification Search
CPC ............. H04L 41/0677; H04L 43/0829; H04L 43/0852; H04L 43/106; H04L 69/161; H04L 69/22; H04L 69/28
See application file for complete search history.

(56) References Cited

U.S. PATENT DOCUMENTS

| | | | | |
|---|---|---|---|---|
| 2010/0290343 | A1* | 11/2010 | Tanaka | H04L 12/4645 370/235 |
| 2011/0231545 | A1 | 9/2011 | Enomoto et al. | |
| 2013/0326014 | A1* | 12/2013 | Niu | H04L 61/2061 709/217 |
| 2018/0212819 | A1* | 7/2018 | Zhang | H04L 41/0677 |

FOREIGN PATENT DOCUMENTS

| | | |
|---|---|---|
| JP | 9-270822 | 10/1997 |
| JP | 2004-274703 | 9/2004 |
| WO | WO 2010/064532 A1 | 6/2010 |

\* cited by examiner

*Primary Examiner* — Mewale A Ambaye
(74) *Attorney, Agent, or Firm* — Staas & Halsey LLP

(57) ABSTRACT

A non-transitory computer-readable storage medium that stores a determination program that causes a communication device to execute a process including transmitting a check packet to the communication destination device, when the communication device receives a first response packet, determining whether or not header information of a second response packet is included in data of the first response packet, a communication path corresponding to the first response packet and a communication path corresponding to the second response packet being different each other, and determining that a failure occurs in the communication path corresponding to the second response packet when the header information of a second response packet is included in data of the first response packet and when the communication device does not receive the second response packet within a predetermined time from transmitting the check packet.

7 Claims, 41 Drawing Sheets

FIG. 14

| DESTINATION IP | Src port | ID | RESPONSE NUMBER | RESPONSE LIST (Src port list) | RECEPTION RESPONSE NUMBER | RECEPTION LIST (Src port list) | TIMER |
|---|---|---|---|---|---|---|---|
| IPg | 12345 | 1 | 3 | pn1,pn2,pn3 | 1 | pn1 | 5 |
| IPf | 22334 | 5 | 3 | pn11,pn12,pn13 | 3 | pn11,pn12,pn13 | 6 |
| ... | | | ... | | ... | ... | ... |

36-2

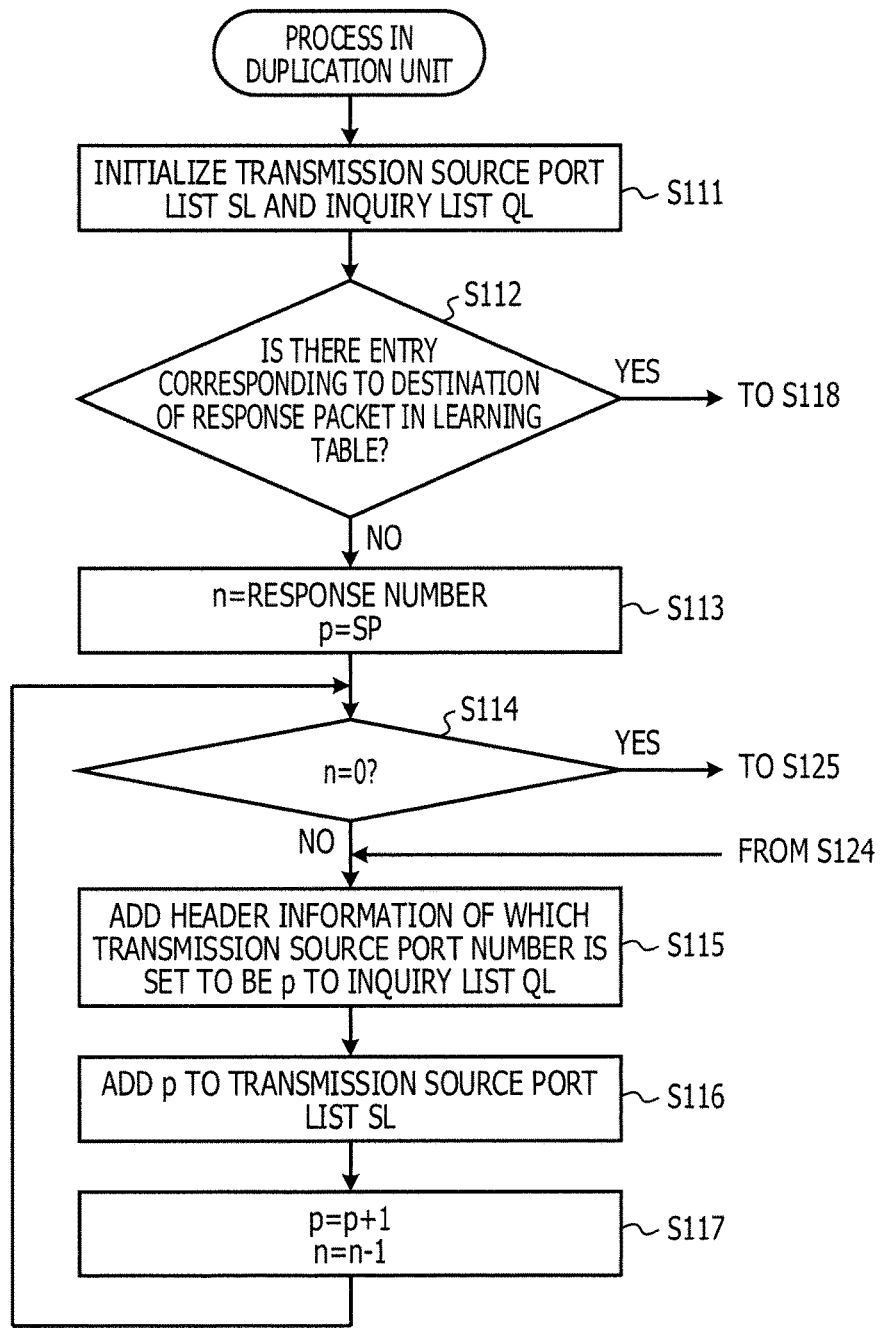

FIG. 28

| DESTINATION IP | ID | CHECK PACKET INFORMATION ||| RESPONSE PACKET INFORMATION ||||
| | | CHECK NUMBER | CHECK LIST (Src port list) | ARRIVAL CHECK NUMBER | ARRIVAL LIST (Src port list) | RESPONSE NUMBER | RESPONSE LIST | RECEPTION RESPONSE NUMBER | RECEPTION LIST | TIMER |
|---|---|---|---|---|---|---|---|---|---|---|
| IP60z | 1 | 4 | {sp1,sp2,sp3,sp4} | | | | | | | |
| IP60w | 5 | 4 | {sp11,sp12,sp13,sp14} | | | | | | | |
| ... | | | | | | ... | | | ... | ... |

FIG. 31

| DESTINATION IP | ID | (CHECK PACKET) HEADER INFORMATION | CHECK NUMBER | RECEPTION CHECK NUMBER | RECEPTION LIST (Src port list) | TIMER |
|---|---|---|---|---|---|---|
| IPg | 1 | H1 | 4 | 2 | {sp1,sp2} | 5 |
| IPf | 5 | H2 | 4 | 3 | {sp21,sp22,sp23} | 6 |
| ... | | ... | | | ... | ... |

| DESTINATION IP | ID | CHECK PACKET INFORMATION ||||| RESPONSE PACKET INFORMATION | TIMER |
|---|---|---|---|---|---|---|---|---|
| | | CHECK NUMBER | CHECK LIST (Src port list) | | ARRIVAL CHECK NUMBER | ARRIVAL LIST (Src port list) | | |
| IP60z | 1 | 4 | {sp1,sp2,sp3,sp4} | | 4 | {sp1,sp2,sp3,sp4} | ... | 5 |
| IP60w | 5 | 4 | {sp11,sp12,sp13,sp14} | | 3 | {sp11,sp12,sp13,sp14} | ... | 6 |
| ... | ... | ... | ... | | ... | ... | ... | ... |

| RESPONSE NUMBER | RESPONSE LIST (Src port list) | RECEPTION RESPONSE NUMBER | RECEPTION LIST (Src port list) |
|---|---|---|---|
| 3 | {pn21,pn22,pn23} | 2 | {pn21,pn22} |
| 3 | {pn31,pn32,pn33} | 3 | {pn31,pn32,pn33} |
| ... | | ... | ... |

NON-TRANSITORY COMPUTER-READABLE STORAGE MEDIUM, COMMUNICATION DEVICE, AND DETERMINATION METHOD

CROSS-REFERENCE TO RELATED APPLICATION

This application is based upon and claims the benefit of priority of the prior Japanese Patent Application No. 2016-158039, filed on Aug. 10, 2016, the entire contents of which are incorporated herein by reference.

FIELD

The embodiments discussed herein are related to a non-transitory computer-readable storage medium, a communication device, and a determination method.

BACKGROUND

In a data center, a physical network is established by connecting a plurality of physical servers in a wired manner, and virtual machines or virtual switches are operated using the physical servers included in the physical network. With such a configuration, virtual networks have been increasingly established. Even in a system in which the virtual network is established in the physical network, there are some cases where a plurality of paths is used in communication between devices in order to secure a communication speed or measures against a system failure.

When communication is performed between the virtual machines included in the virtual network, communication is performed between the physical servers in which the virtual machines that perform communication operate, respectively. Thus, both a case where causes of the failure are present in the virtual network and a case where causes of the failure are present in the physical network are considered in the system in which the virtual network is established in the physical network. Accordingly, when the measures against the system failure are set up, an operator is to specify whether the causes of the failure are attributed to the failure in the physical network or are attributed to the problem in the virtual network. Here, the operator specifies whether or not the failure occurs in the physical network, and determines that a communication failure occurs due to the failure in the virtual network in a case where the failure does not occur in the physical network.

However, there are some cases where it is difficult to find a location in which the failure occurs by simply performing real-time monitoring or log analysis in the physical server included in the physical network. Thus, there are some cases where whether or not packet loss occurs is determined using a check packet.

As related arts, a test method using a packet acquired by adding path information to a header portion to which destination information is set has been suggested (for example, Japanese Laid-open Patent Publication No. 9-270822). In this test method, a relay node transmits a packet transmitted from a transmission source based on routing information, and a device as a transmission source determines a state of a communication path based on whether or not a response packet is received from a destination specified using the destination information. A system in which a node that receives a frame transmitted from a management computer transmits a received frame based on the routing information indicating a delivery path of the frame in a communication network and transmits a response to the management computer also has been suggested. In this system, the management computer specifies a location in which the failure occurs based on a reception state of the response from the node included in the network (for example, International Publication Pamphlet No. WO 2010064532). A communication method of enabling restoration even though the packet loss occurs in any one path by generating a redundant packet if the packet is received and transmitting the received packet and the redundant packet over different paths to a network as a destination has been suggested (for example, Japanese Laid-open Patent Publication No. 2004-274703).

SUMMARY

According to an aspect of the invention, a non-transitory computer-readable storage medium that stores a determination program that causes a communication device to execute a process, the communication device monitoring a communication state with a communication destination device, the process including transmitting a check packet to the communication destination device, when the communication device receives a first response packet, determining whether or not header information of a second response packet is included in data of the first response packet, both of the first response packet and the second response packet being transmitted from the communication destination device in response to reception of the check packet on the communication destination device, a communication path corresponding to the first response packet and a communication path corresponding to the second response packet being different each other, and determining that a failure occurs in the communication path corresponding to the second response packet when the header information of a second response packet is included in data of the first response packet and when the communication device does not receive the second response packet within a predetermined time from transmitting the check packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram for describing an example of a check packet table;

FIGS. 23A and 23B are a flowchart for describing an example of the generation method of the response packet;

FIG. 28 is a diagram for describing an example of the check packet table;

FIG. 31 is a diagram for describing an example of a reception state table;

FIG. 38 is a diagram for describing an example of the check packet table; and

DESCRIPTION OF EMBODIMENTS

In order to detect a failure in a path from a communication device to a device as a communication destination, the communication device transmits a check packet, and determines whether or not a response packet to the transmitted check packet is received. However, in a case where the paths from the communication device to the device as the communication destination are redundant, since there is a possibility that the check packet and the response packet will be transmitted over different paths, it is difficult to specify the path in which the failure occurs. That is, in a case where a transmission source of the check packet does not receive the response packet, there are a possibility that a failure will occur in a transmission path of the response packet and a possibility that a failure will occur in a transmission path of the check packet, but it is difficult to specify the path in which the failure occurs.

An object of an aspect of the present embodiment is to specify a path in which a failure occurs.

Figure 1:
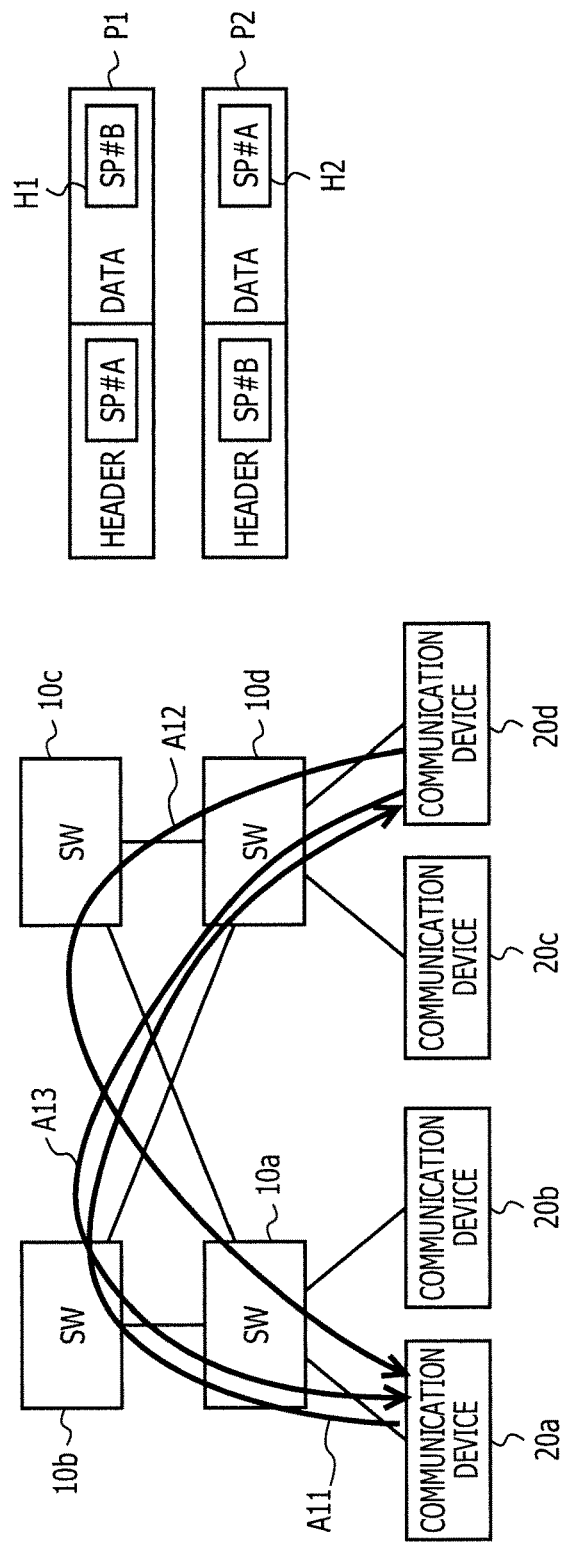
FIG. 1 is a diagram for describing an example of a check method according to an embodiment.

FIG. 1 is a diagram for describing an example of a check method according to an embodiment. A system illustrated in FIG. 1 includes communication devices 20 (20a to 20d) and switches 10 (10a to 10d), but the number of communication devices 20 or the number of switches 10 included in the system is arbitrarily set. In the example of FIG. 1, it is assumed that there are a path (path R1) passing through a switch 10a, a switch 10b, and a switch 10d, and a path (path R2) passing through the switch 10a, a switch 10c and the switch 10d, as communication paths from the communication device 20a to the communication device 20d. It is assumed that each switch 10 distributes a path by using a hash value of a header of the received packet. Accordingly, it is assumed that in the switch 10 such as the switch 10a or the switch 10d through which a plurality of paths passes, a path to be used for transmitting a reception packet is selected depending on a hash value of a header of the reception packet.

In such a system, it is assumed that the communication device 20a generates a check packet P0 (not illustrated) for the communication device 20d. It is assumed that the communication device 20a stores information of a header included in the check packet P0 and the check packet P0 is transmitted to the communication device 20d. Thus, if the check packet P0 is transmitted from the communication device 20a, this check packet arrives at the switch 10a.

The switch 10a determines to transmit the check packet P0 to the switch 10b by using the hash value of the header of the check packet P0. The switch 10a transmits the check packet P0 to the switch 10b. If the check packet P0 is received from the switch 10a, since the destination of the check packet P0 is the communication device 20d, the switch 10b transmits the check packet P0 to the switch 10d. Since the destination of the check packet P0 is the communication device 20d, the switch 10d transmits the check packet P0 to the communication device 20d. Accordingly, the check packet P0 is transmitted along the path (path R1) illustrated in an arrow A11 of FIG. 1. In a case where the failure does not occur in the path R1, the check packet P0 arrives at the communication device 20d.

If the check packet P0 is received, the communication device 20d generates response packets as a response to the check packet P0 by a predetermined number. Here, the predetermined number is an arbitrary number of 2 or more. When a plurality of response packets is generated, the communication device 20d sets information items of headers included in the response packets to have different values such that a possibility that communication paths through which the plurality of response packets passes will be different paths becomes high. For example, the communication device 20d sets transmission source port numbers of the plurality of response packets to be different from one another. In FIG. 1, it is assumed that the communication device 20d generates response packets P1 and P2, as the response packets. It is assumed that the transmission source port number (SP) included in the header of the response packet P1 is SP#A. Meanwhile, it is assumed that the transmission source port number included in the header of the response packet P2 is SP#B.

In a case where a part of the response packets does not arrive at the communication device 20a, the communication device 20d adds header information of "another response packet" to data of each response packet such that the communication device 20a can recognize the information of the header of the response packet that does not arrive at the transmission destination. Here, the "another response packet" of a certain response packet is a response packet among the plurality of response packets which notify that the reception succeeds and are generated as responses to the check packet except for this response packet. Accordingly, the response packet P2 is another response packet of the response packet P1. Meanwhile, the response packet P1 is another response packet of the response packet P2. Accordingly, header information H1 of the response packet P2 is included in data of the response packet P1. Meanwhile, header information H2 of the response packet P1 is included in data of the response packet P2. In the example of FIG. 1, information of the transmission source port number included in the header of another response packet is used as the information of another response packet. Thus, the response packet P1 includes data indicating that the transmission source port number is SP#B, as the header information H1 of another response packet. The response packet P2 includes data indicating that the transmission source port number is SP#A, the header information H2 of another response packet.

If the communication device 20d transmits the response packets P1 and P2 to the communication device 20a, it is assumed that both the response packets P1 and P2 arrive at the switch 10d. It is assumed that the switch 10d determines that the transmission destination of the response packet P1 is the switch 10c based on the hash value of the header information of the response packet P1. Thus, the response packet P1 is transmitted over the path (arrow A12) up to the communication device 20a through the switch 10c and the switch 10a. It is assumed that the path of an arrow A12 is a path R2.

Meanwhile, it is assumed that the switch 10d determines for the response packet P2 that the transmission destination of the response packet P2 is the switch 10b based on the hash value of the header information of the response packet P2. Thus, the response packet P2 is transmitted over a path (arrow A13) up to the communication device 20a through the switch 10b and the switch 10a. An arrow A13 is a path along the path R1.

In a case where a failure occurs neither the path R1 nor the path R2, the communication device 20a can receive both the response packets P1 and P2. In this case, a failure does not occur in a physical network between the communication device 20a and the communication device 20d.

In a case where a failure occurs in any one of the path R1 and the path R2, the communication device 20a can receive the response packet transmitted over the path in which the failure does not occur. For example, it is assumed that the communication device 20a receives the response packet P2 and does not receive the response packet P1. Thus, the communication device 20a can specify the presence of the response packet P1 which fails to be received and the information included in the header of the response packet P1 by using the header information H2 of the data of the response packet P2 which succeeds to be received. Here, the communication device 20a determines that the failure occurs in the transmission path specified using the information of the header of the response packet P1. An arbitrary known method can be used as the method of specifying the transmission path based on the information of the header.

Incidentally, in a case where the failure occurs in the path R1, the check packet P0 does not arrive at the communication device 20d as represented by an arrow A11. Thus, the communication device 20d does not generate the response packets, and the communication device 20a does not also receive the response packets. As stated above, in a case where any response packet is also not received, the communication device 20a determines that the check packet transmitted by the communication device 20a itself does not arrive at the communication device 20d as the destination. When the check packet P0 is transmitted, since the information of the header of the check packet P0 is stored, the communication device 20a determines that the failure occurs in the transmission path specified by the information of the header of the check packet P0.

As mentioned above, the communication device 20 that receives the check packet transmits the plurality of response packets including the header information of another response packet over different paths, and the communication device 20 as the transmission source of the check packet can recognize the presence of the response packet that is not received. It is possible to specify the path in which the failure occurs by specifying the information of the header of the response packet that is not received by using the received response packet. In a case where any response packet is not received, the communication device 20 can determine that the failure occurs in the transmission path of the transmitted check packet. Accordingly, it is possible to specify the path in which the failure occurs among the plurality of redundant paths by the method according to the embodiment.

<Examples of Device Configuration and Network>

Figure 2:
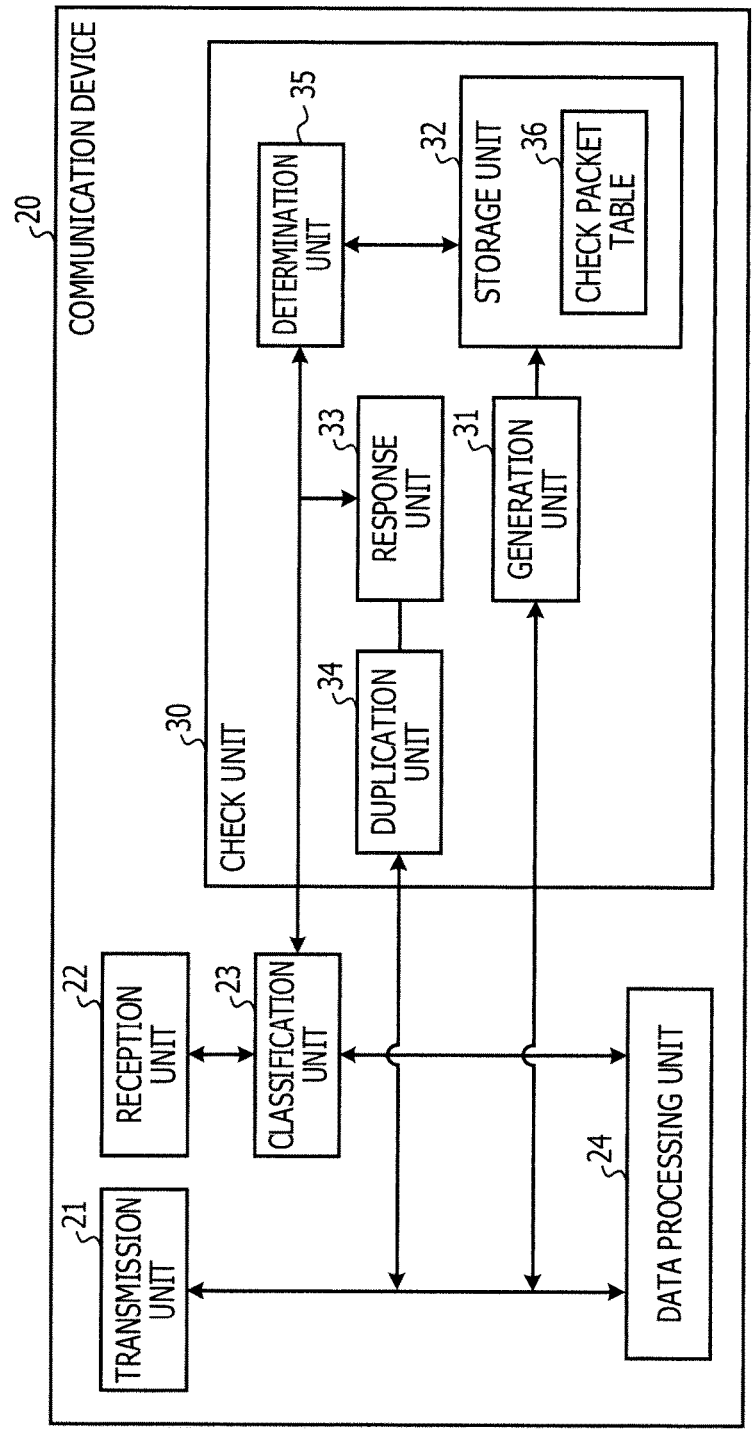
FIG. 2 is a diagram for describing an example of a configuration of a communication device.

FIG. 2 is a diagram for describing an example of a configuration of the communication device 20. The communication device 20 includes a transmission unit 21, a reception unit 22, a classification unit 23, a data processing unit 24, and a check unit 30. The check unit 30 includes a generation unit 31, a storage unit 32, a response unit 33, a duplication unit 34, and a determination unit 35. The storage unit 32 stores a check packet table 36, and retains data to be used in the process performed in the check unit 30. For example, the storage unit 32 may retain an address resolution protocol (ARP) table.

The transmission unit 21 transmits the packet to another device such as another communication device 20. The reception unit 22 receives the packet from another device such as the communication device 20 or the switch 10. The reception unit 22 outputs the received packet to the classification unit 23.

The classification unit 23 classifies the input packets by using a destination port number of the packet. In a case where the destination port number of the packet is a value used for identifying the check packet or the response packet processed in the check unit 30, the classification unit 23 outputs the reception packet to the response unit 33 and the determination unit 35. Hereinafter, the value used for identifying the check packet or the response packet processed in the check unit 30 is described as a "checking port number". Meanwhile, in a case where the destination port number of the packet is a value other than the checking port number, the classification unit 23 outputs the reception packet to the data processing unit 24. It is assumed that the classification unit 23 previously stores the checking port number. The data processing unit 24 processes the input packet, and appropriately generates a transmission packet.

In a case where the communication device 20 receives the check packet from another communication device 20, the response unit 33 generates information as a base of the response packet, and the duplication unit 34 generates a plurality of response packets by using the information generated by the response unit 33. The duplication unit 34 transmits the plurality of generated response packets to the transmission source of the check packet through the transmission unit 21.

Meanwhile, in a case where the communication device 20 receives the response packets from another communication device 20, the determination unit 35 acquires information items of headers of the received response packets, and determines whether or not all the response packets transmitted from the communication device 20 as the destination of the check packet are acquired. The determination unit 35 determines that a failure occurs in a transmission path of the response packet that fails to be received. The details of the process performed in the determination unit 35 will be described below. In a case where the communication device 20 transmits the check packet, the generation unit 31 generates a check packet to be addressed to the communication device 20 as the communication destination as a checking target of a state of a path. The generation unit 31 stores header information of the check packet in the check packet table 36.

Figure 3:
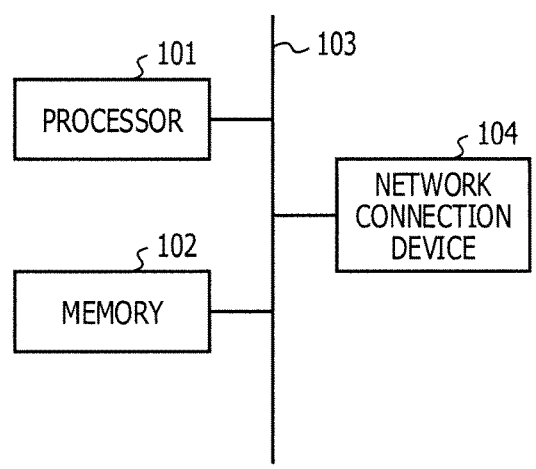
FIG. 3 is a diagram for describing an example of a hardware configuration of the communication device.

FIG. 3 is a diagram for describing an example of a hardware configuration of the communication device 20. The communication device 20 includes a processor 101, a memory 102, a bus 103, and a network connection device 104. The memory 102 includes a random access memory (RAM) and a read only memory (ROM). The processor 101 may execute a program stored in the memory 102. The bus 103 connects the processor 101, the memory 102, and the network connection device 104 such that these components are able to mutually transmit and receive data. The network connection device 104 performs the inputting and outputting of information with another device included in the network. For example, the network connection device 104 is realized as a network interface card (NIC). In the communication device 20, the processor 101 is operated as the classification unit 23, the data processing unit 24, the generation unit 31, the response unit 33, the duplication unit 34, and the determination unit 35. The memory 102 is operated as the storage unit 32, and is also operated as a part of the data processing unit 24 by being used for storing data processed by the data processing unit 24. The network connection device 104 realizes the transmission unit 21 and the reception unit 22.

The communication device 20 may optionally include one or more devices of an input device, an output device, and a portable storage medium driving device. The input device is an arbitrary device such as a keyboard used for inputting information, and the output device is an arbitrary device such as a display used for outputting data. The portable storage medium driving device can output the data included in the memory 102 to a portable storage medium, and can read a program or data from the portable storage medium. Here, the portable storage medium is an arbitrary portable storage medium.

In a case where the communication device 20 is realized as a computer, the classification unit 23, the data processing unit 24, the generation unit 31, the response unit 33, the duplication unit 34, and the determination unit 35 may be realized by software such as an operating system (OS). The entire communication device 20 may be realized by the NIC. In a case where the entire communication device 20 is realized by the NIC, one or more units of the classification unit 23, the data processing unit 24, the generation unit 31, the response unit 33, the duplication unit 34, and the determination unit 35 may be realized by hardware.

Figure 4:
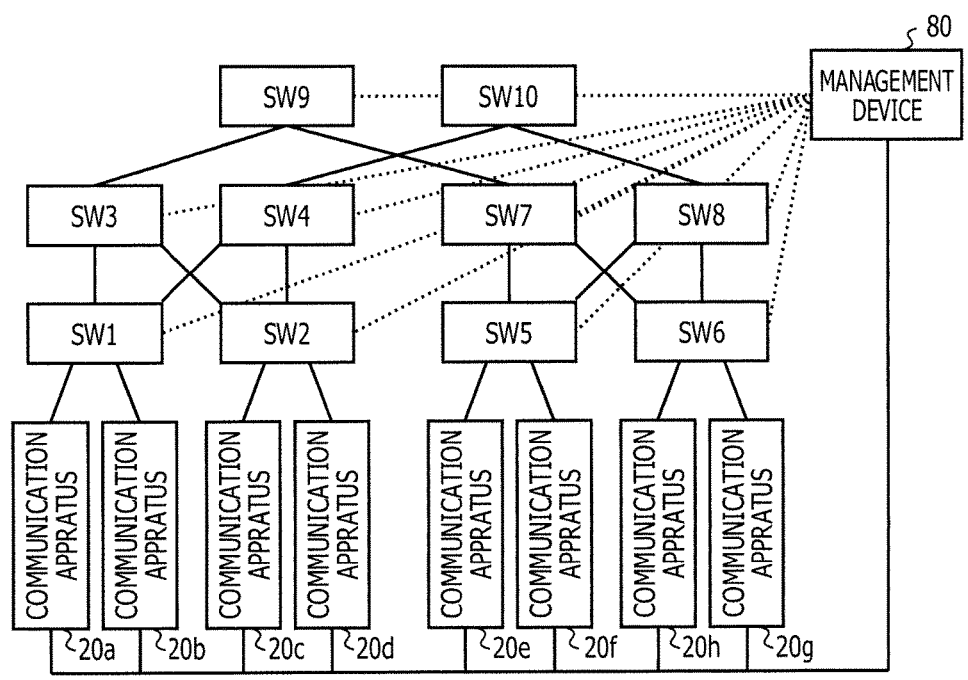
FIG. 4 is a diagram for describing an example of a network.

FIG. 4 is a diagram for describing an example of the network. The network illustrated in FIG. 4 includes communication devices 20a to 20h, a plurality of switches 10 (SW1 to SW10), and a management device 80. FIG. 4 is an example, and the number of switches 10 included in the network, the number of communication devices 20, and the connection relationship between the switches 10 or the communication devices 20 may be changed depending on the implementation of these components.

The management device 80 may be connected with all the communication devices 20 included in the network through a control line. The communication device 20 transmits an inquiry including information of a header transmitted along a path in which it is determined that a failure occurs by using a reception state of the response packet to the management device 80. The management device 80 specifies a transmission path specified from the information of the header by using the information of the header included in the inquiry received from the communication device 20, a network topology, an algorithm of a distribution process performed in each switch 10. Thereafter, the management device 80 may transmit a path information notification including information of the specified transmission path to the communication device 20 as a transmission source of the inquiry. In this case, it is possible to acquire information for specifying the path in which the failure occurs from the communication device 20. Accordingly, an operator can acquire the information of the path in which the failure occurs from a display device of the communication device 20 that transmits the check packet. The management device 80 may display the information of the path specified using the information of the header included in the inquiry on a display device capable of being visually perceived by the operator, or may transmit the information for specifying the path in which the failure occurs to a terminal being used by the operator.

In a case where a transmission destination port is able to be acquired from the switch 10 by notifying the switch 10 of the header information, the management device 80 may be connected to each switch 10 included in the network, as depicted by a dotted line of FIG. 4. The management device 80 specifies the path in which the failure occurs by transmitting the information of the header included in the inquiry to the switch 10 and acquiring a destination of the distribution performed in the switch 10 from the switch 10. The process performed by the management device 80 after the path in which the failure occurs is specified is the same as that in a case where the management device 80 is not connected to the switch 10.

<First Embodiment>

Hereinafter, a first embodiment will be described while distinguishing between a transmission process of the check packet, a distribution process for the plurality of paths, a reception process of the check packet and a transmission process of the response packet, reception of the response packet, an inquiry about the path in which the packet is lost, and a process performed in the management device 80. In the following description, in order to easily understand which one of the communication devices 20 performs the process, there are some cases where the ends of symbols will be assigned the same alphabets as the ends of symbols of the communication devices 20 that perform the process. For example, a generation unit 31a is the generation unit 31 of the communication device 20a, and a determination unit 35g is the determination unit 35 of the communication device 20g.

(1) Transmission Process of Check Packet

The generation unit 31 generates the check packet in response to a check instruction input to the communication device 20. The check instruction may be transmitted to the communication device 20 from the management device 80, or may be input by the operator from the input device of the communication device 20. An IP address assigned to the destination of the check packet may be included in the check instruction, and a value used as a transmission source port of the check packet may be optionally included in the check instruction.

Figure 5:
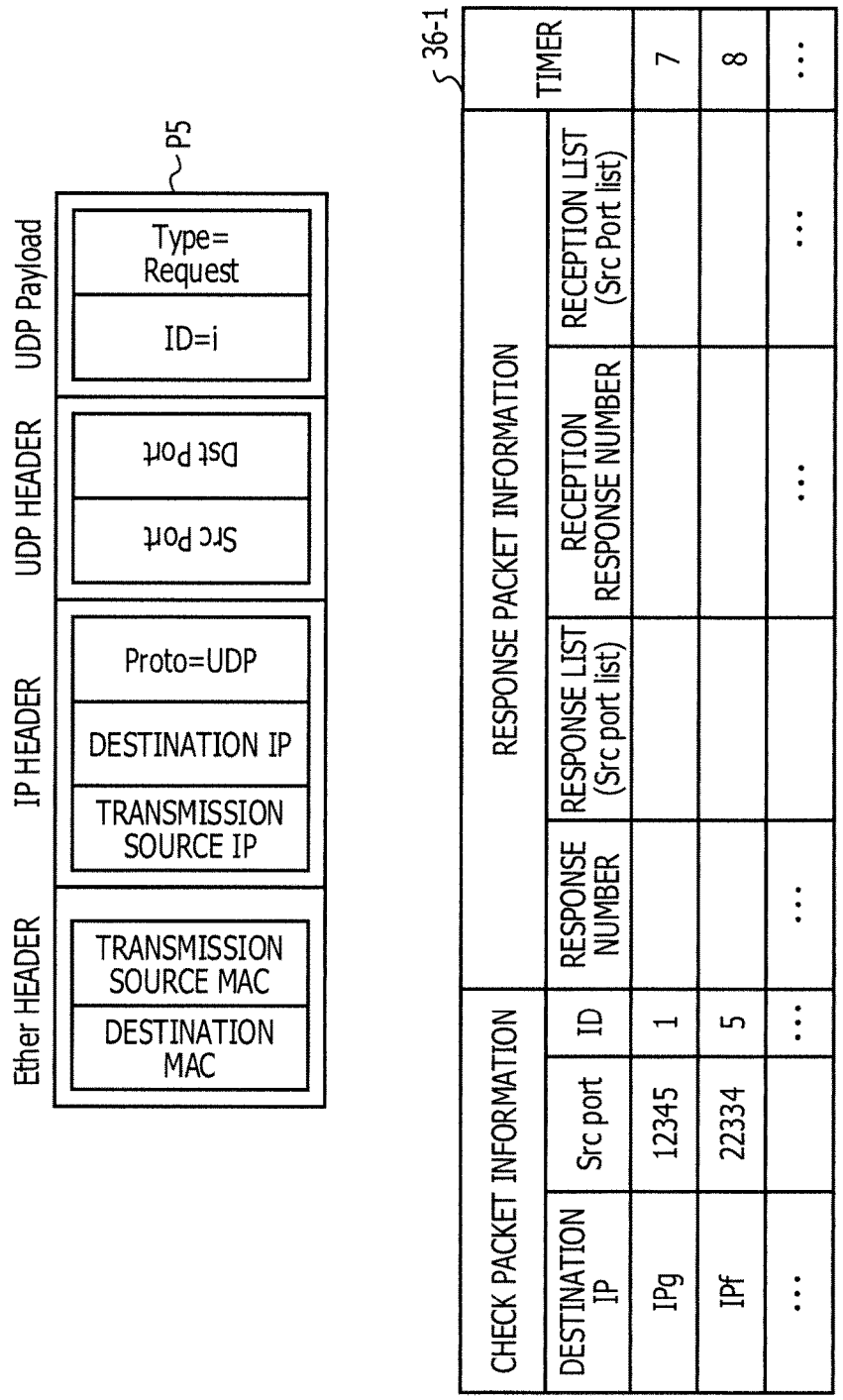
FIG. 5 is a diagram for describing an example of a check packet and a check packet table.

FIG. 5 is a diagram for describing an example of the check packet and the check packet table. P5 indicates an example of the check packet. The check packet includes an Ether header, an Internet Protocol (IP) header, a User Datagram Protocol (UDP) header, and an UDP payload. The Ether header includes a destination media access control (MAC) address and a transmission source MAC address. The IP header includes a transmission source IP address, a destination IP address, and protocol information (Proto). In the example of P5, since the protocol of the transport layer is the UDP, the protocol information is set to be a value indicating the UDP. The UDP header includes a transmission source port number (Src Port) and a destination port number (Dst Port). Here, the generation unit 31 sets the destination port number to be the checking port number such that the process is performed in the check unit 30 of the communication device 20 as the destination of the check packet. As the transmission source port number, the value generated by the generation unit 31 or a value included in the check instruction is used.

The UDP payload includes an ID field and a type field. An ID used for identifying each check packet of the check packets of which the combinations of the transmission sources and the destinations are the same is stored in the ID field. Information indicating whether the packet is the check packet or the response packet is stored in the type field. In a case where the packet is the check packet, the value of the type field is Request, and in a case where the packet is the response packet, the type field is Response.

If the check packet is generated, the generation unit 31 records the information of the check packet as check packet information of the check packet table 36.

The check packet table 36 includes check packet information, response packet information, and timer field. The check packet information is information of the check packet transmitted by the communication device 20 itself, and includes a destination IP address field, a transmission source port number field, and an ID field. An IP address of the destination of the check packet is stored in the destination IP address field, and the transmission source port number of the check packet is stored in the transmission source port number field. An ID of the check packet is stored in the ID field.

The response packet information is information used for specifying the reception state of the response packet as a response to the check packet, which is specified from information included in an entry, and includes a response number field, a response list field, a reception response number field, and a reception list field. Information of the total number of response packets transmitted as responses to the same check packet as the check packet corresponding to the response packet received by the communication device 20 is stored in the response number field. A list acquired by recording transmission source port numbers included in the response packets for a plurality of response packets transmitted as responses to the same check packet as the check packet corresponding to the response packet received by the communication device 20 is stored in the response list field. The number of response packets received by the communication device 20 is recorded in the reception response number field. A list of the transmission source port numbers included in the response packets received by the communication device 20 as responses to the check packet specified from the entry is stored in the reception list field. The timer field is a time when the response packet are received after the check packet is transmitted, if the value of the timer field is 0, the reception of the response to the check packet of the entry is ended.

Figure 6:
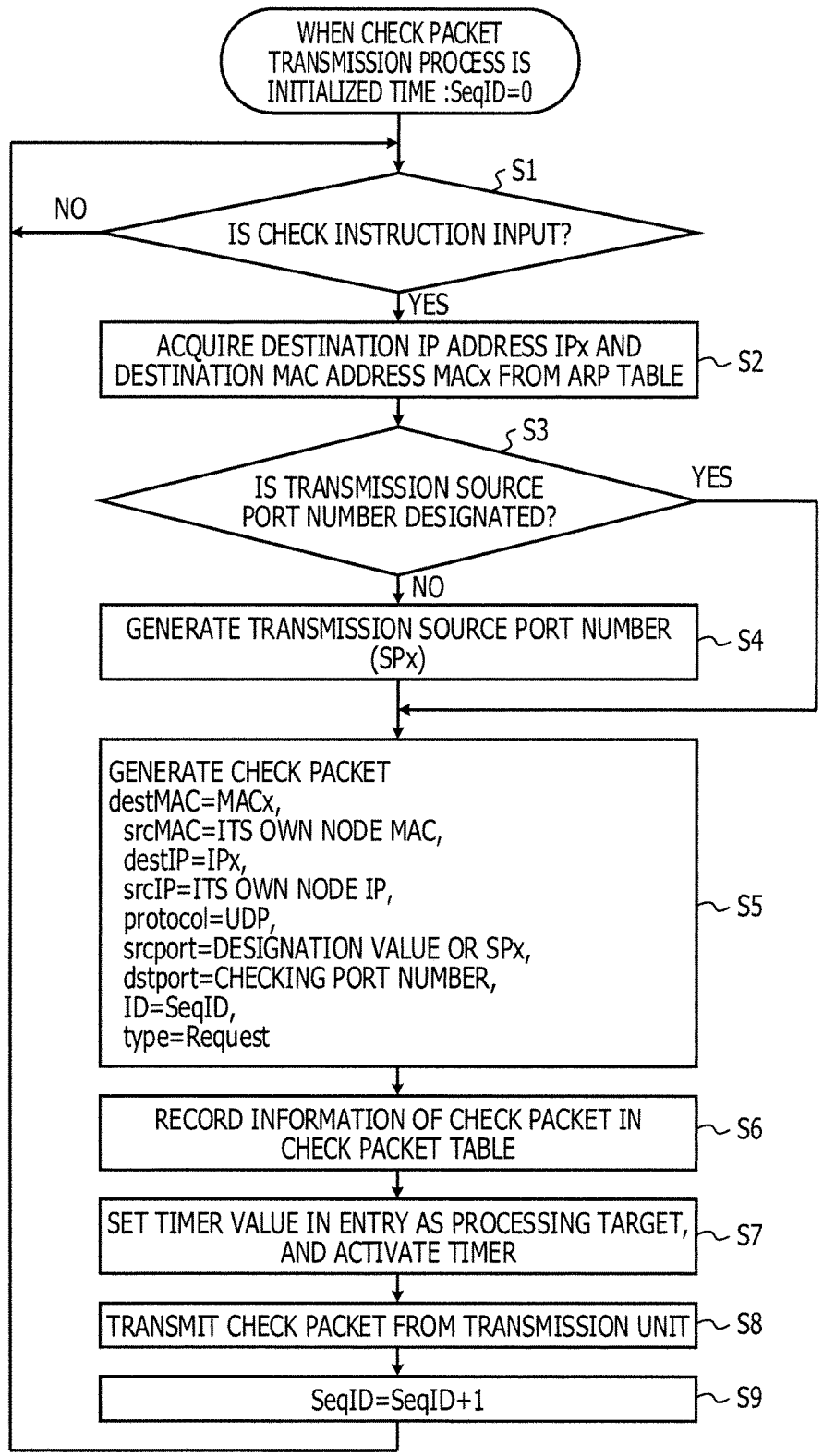
FIG. 6 is a flowchart for describing an example of a transmission process of the check packet.

FIG. 6 is a flowchart for describing an example of the transmission process of the check packet. In FIG. 6, SeqID is a variable indicating a value used as an ID of the check packet, and is set to be SeqID=0 when the communication device 20 is initialized. The generation unit 31 waits until the check instruction is input (step S1). If the input of the check instruction is detected, the generation unit 31 specifies a MAC address (MACx) of the communication device 20 as the destination from the ARP table and the destination IP address (IPx) included in the check instruction (Yes in step S1, step S2). The generation unit 31 determines whether or not a designation of the transmission source port number is included in the check instruction (step S3). In a case where the designation of the transmission source port number is not included in the check instruction, the generation unit 31 generates the transmission source port number (SPx) (No in step S3, step S4). In step S4, the generation unit 31 generates the transmission source port number by using a random number such that the value of the transmission source port number is random. In a case where the transmission source port number is included in the check instruction (Yes in step S3), if the generation unit 31 generates the transmission source port number (step S4), the generation unit 31 generates the check packet (step S5).

In the check packet, the destination MAC address is set to be the MAC address (MACx) of the communication device 20 as the destination acquired in step S2, and the destination IP address is set to be the IP address (IPx) designated in response to a generation instruction. The transmission source MAC address and the IP address of the check packet are set to be the values assigned to the communication device 20 as the transmission source of the check packet, and the protocol is designated as being the UDP. The transmission source port number included in the check packet is set to be a designation value designated by the generation instruction or the transmission source port number SPx generated in step S4. The destination port number is set to be the checking port number, and the ID is set to be the value of the SeqID. Request is set in the type field included in the check packet. If the check packet is generated, the generation unit 31 records the information of the of the check packet of the check packet table 36 (step S6).

In a check packet table 36-1 illustrated in FIG. 5, the values of the destination IP address, the transmission source port number, and the ID are recorded as the check packet information. For example, in a case where the communication device 20a transmits a check packet with which transmission source port number=12345 and ID=1 to the communication device 20*g* to which an IP address of IPg is assigned, information of a first entry in the check packet table 36-1 is recorded. Similarly, in a case where the communication device 20*a* transmits a check packet of which transmission source port number=22334 and ID=5 to the communication device 20*f* to which an IP address of IPf is assigned, information of a second entry in the check packet table 36-1 is recorded.

Thereafter, the generation unit 31 sets a timer value in the timer field of the entry as a processing target, and activates the timer (step S7). The generation unit 31 transmits the check packet from the transmission unit 21 to the destination (step S8). Thereafter, the generation unit 31 increments the variable SeqID by one, and returns to step S1 (step S9).

(2) Example of Distribution Process to Plurality of Paths

In a case where the paths are redundant, the switch 10 determines which one of paths is used for transmitting the packet by using the value included in the header. Thus, in a redundant system, if the communication device 20 transmits the check packet, the transmitted check packet is transmitted to the communication device 20 as the destination over any one of the plurality of paths. Hereinafter, the determination method of the transmission path will be described with reference to FIG. 7.

Figure 7:
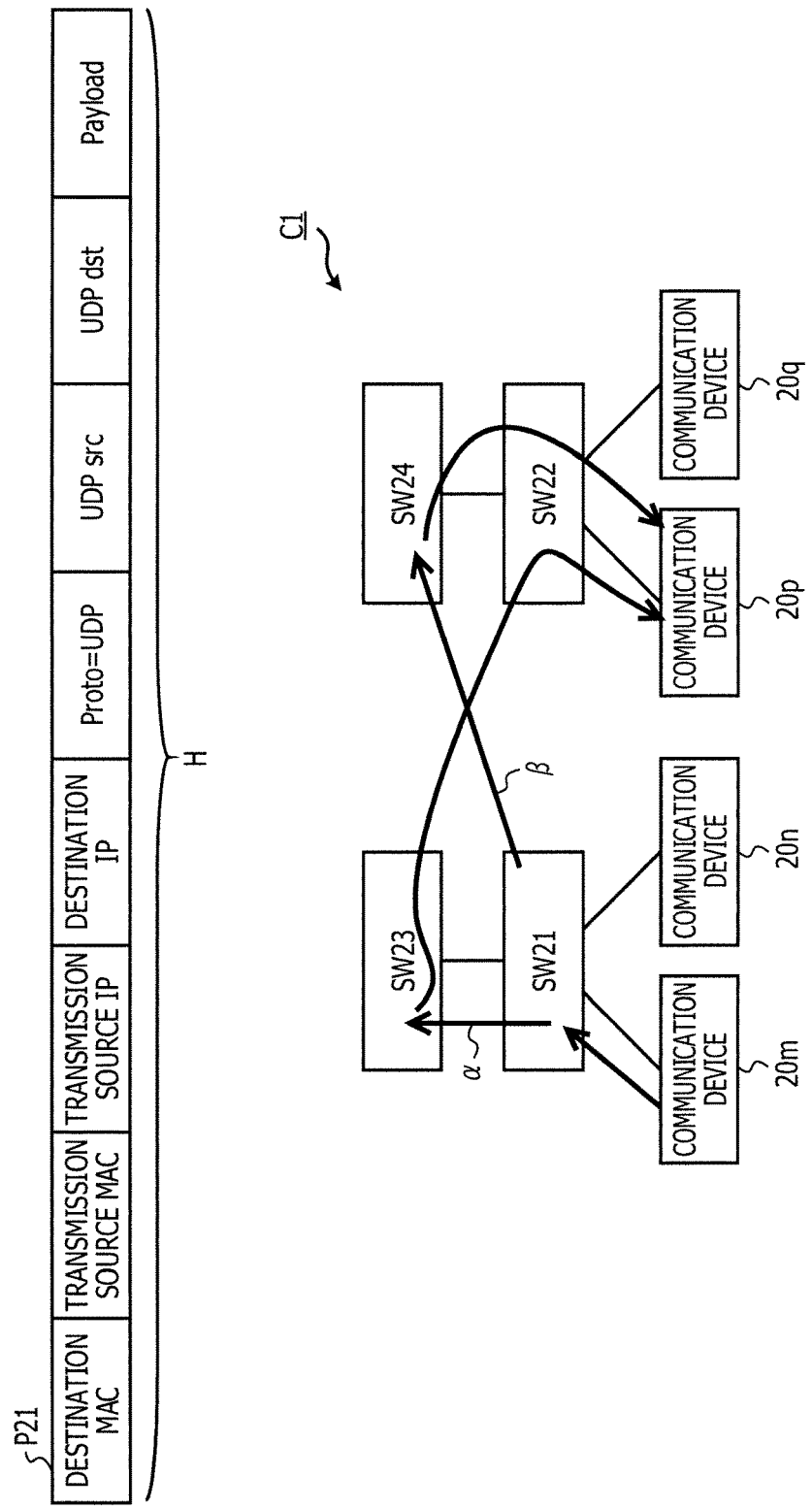
FIG. 7 is a diagram for describing an example of a traffic distribution process using a switch.

A packet P21 of FIG. 7 is an example of the packet to be transmitted. Among information items included in the header of the packet P21, the destination MAC address, the transmission source MAC address, the transmission source IP address, the destination IP address, the protocol, the transmission source port number, and the destination port number are used in the path determination. The information items to be used in the path determination are illustrated in H of FIG. 7. The switch 10 through which the plurality of paths passes correlates an output destination with a remainder acquired when a hash value calculated from a bit array acquired by connecting information items to be used in the path determination is divided by the number of paths passing through the switch 10, and stores the output destination. Thus, the switch 10 determines a transmission destination of the packet according to the value of the acquired remainder. Since the switches 10 included in the network perform the same process, the transmission path of the packet is distributed to the plurality of paths.

Hereinafter, in order to easily describe an example of the distribution process, an example of a network in which the number of communication devices 20 or the number of switches 10 is smaller than that in the network illustrated in FIG. 4 is used. For example, it is assumed that four communication devices 20 including a communication device 20*m*, a communication device 20*n*, a communication device 20*p*, and a communication device 20*q* are connected to each other through the switches 10 (SW21 to SW24) as illustrated in a case C1. In a case where the packet is transmitted to the communication device 20*m* to the communication device 20*p* in this state, as the transmission paths, there are two paths including a path from the communication device 20*m* to the communication device 20*p* through the SW21, the SW23, and the SW22 and a path from the communication device 20*m* to the communication device 20*p* through the SW21, the SW24, and the SW22. If the packet is transmitted from the communication device 20*m*, the SW21 calculates a remainder when a hash value of information represented in H of the packet P21 by 2. The SW selects one of an arrow α and an arrow β, as the transmission path depending on the acquired remainder. For example, it is assumed that the arrow α is correlated with remainder=0 and the arrow β is correlated with remainder=1. Here, in a case where a remainder acquired using the hash value calculated from the header of the packet P21 is 0, since the packet P21 is transmitted from the SW21 to the SW23, this packet is transmitted to the communication device 20*p* through the SW21, the SW23, and the SW22. Meanwhile, in a case where the remainder acquired using the hash value calculated from the header of the packet P21 is 1, since the packet P21 is transmitted from the SW21 to the SW24, this packet is transmitted to the communication device 20*p* through the SW21, the SW24, and the SW22.

Figure 8:
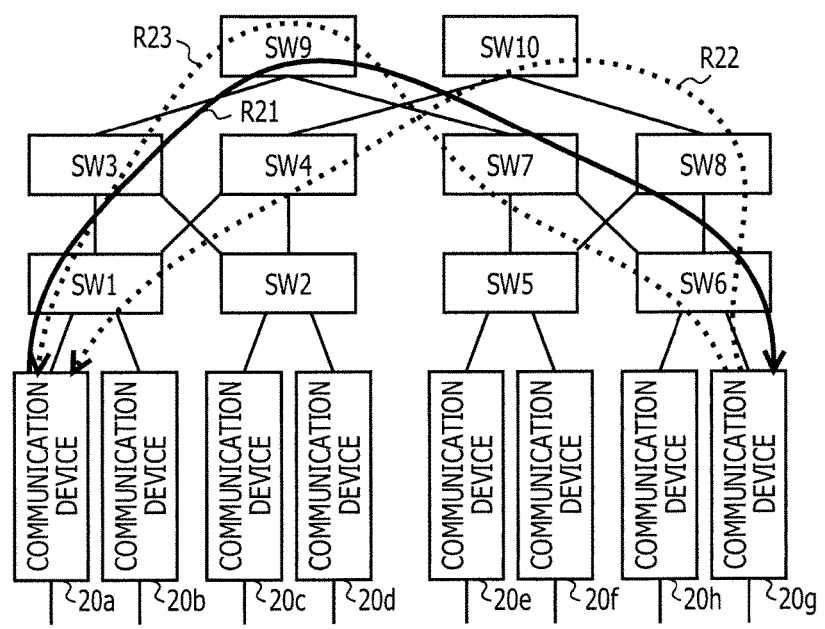
FIG. 8 is a diagram for describing an example of transmission paths of a check packet and a response packet.

FIG. 8 is a diagram for describing an example of the transmission path of the check packet and the response packet. The determination method of the transmission path is similarly applied to any packet other the check packet. For example, the path is also determined by the same process in a case where the response packet is transmitted from the communication device 20 as the destination of the check packet.

For example, it is assumed that the check packet transmitted from the communication device 20*a* arrives at the communication device 20*g* through the SW1, the SW3, the SW9, the SW7, and the SW6 as depicted by an arrow R21. Meanwhile, it is assumed that the communication device 20*g* generates packets which are two response packets as responses to the check packet and have different transmission source port numbers from each other and transmits the generated packets to the communication device 20*a*. In this case, the individual response packets are distributed to the paths by the same process as the process described with reference to FIG. 7. For example, it is assumed that one response packet is transmitted over a path arriving at the communication device 20*a* through the SW6, the SW8, the SW10, the SW4, and the SW1 as depicted by an arrow R22. Meanwhile, the other response packet is transmitted over a path to the communication device 20*a* through the SW6, the SW7, the SW9, the SW3, and the SW1 as depicted by an arrow R23.

Figure 9:
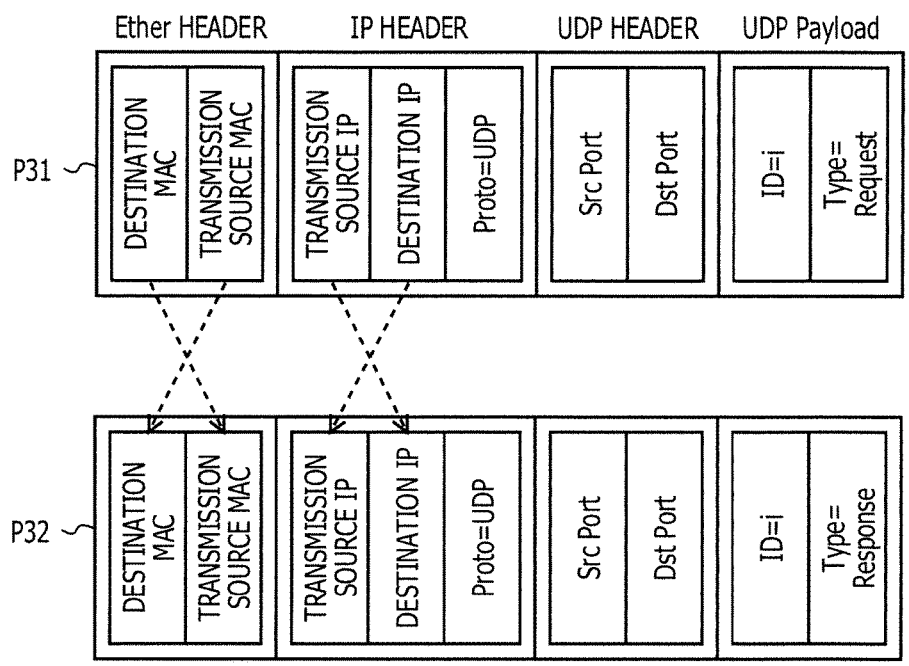
FIG. 9 is a diagram for describing an example of a generation method of a base of the response packet.

(3) Reception Process of Check Packet and Transmission Process of Response Packet It is assumed that a check packet P31 illustrated in FIG. 9 is a check packet transmitted from the communication device 20*a* to the communication device 20*g*. If the check packet P31 is received, the reception unit 22*g* of the communication device 20*g* outputs the check packet P31 to the classification unit 23*g*. Since the destination port number included in the check packet P31 is the checking port number, the classification unit 23*g* outputs the check packet P31 to the response unit 33*g* and the determination unit 35*g*. Since the value of the type field included in the UDP payload of the check packet P31 is Request, the determination unit 35*g* determines that this packet is not the process target, and ends the process.

Since the value of the type field included in the UDP payload of the check packet P31 is Request, the response unit 33*g* generates bases to be used for generating the response packets by using the check packet P31.

FIG. 9 is a diagram for describing an example of the generation method of the bases of the response packets. In a base P32 of the response packet, the transmission source MAC address of the check packet P31 is used as the destination MAC address, and the transmission source IP address of the check packet P31 is used as the destination IP address. In the base P32 of the response packet, the destination MAC address of the check packet P31 is used as the transmission source MAC address, and the destination IP address of the check packet P31 is used as the transmission source IP address. The value of the transmission source port number set to the response packet is set to be different for each response packet, but the transmission source port number is appropriately set to the base P32. For example, the transmission source port number of the check packet may be set to the base P32. In the base P32 of the response packet, the checking port number is used as the destination port number, and the value included in the UDP payload of the check packet is used as the ID included in the UDP payload. In the base P32 of the response packet, the type field is set to be Response. The response unit 33g outputs the generated base P32 to the duplication unit 34g.

Figure 10:
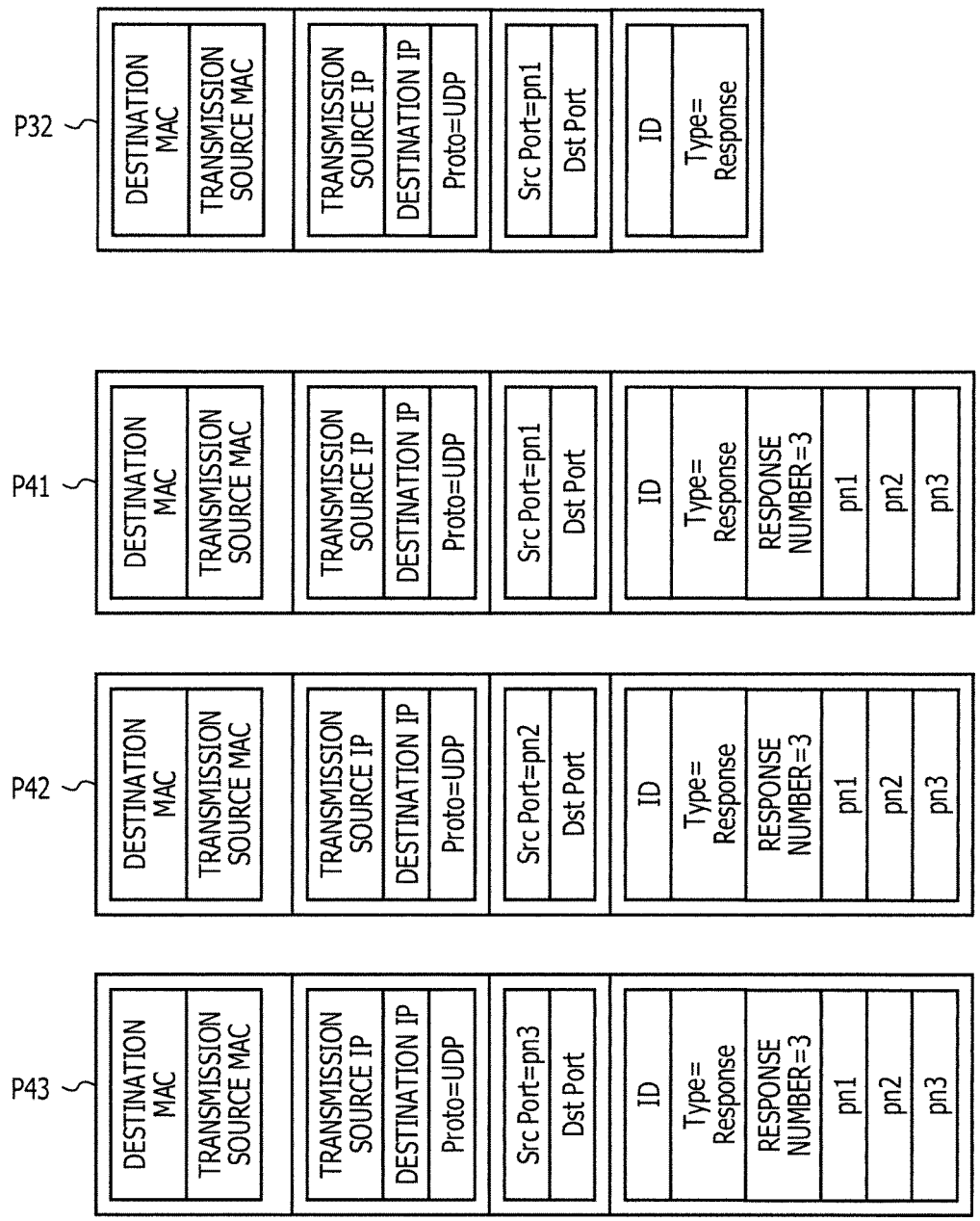
FIG. 10 is a diagram for describing an example of a generation method of the response packet.

FIG. 10 is a diagram for describing an example of the generation method of the response packet. An example of the process performed in a case where response packets P41 to P43 are generated will be described with reference to FIG. 10. The duplication unit 34g stores the number (response number) of response packets generated to one check packet. The duplication unit 34g determines as many transmission source port numbers as the response number, and generates response packets by using the determined transmission source port numbers. The response number and the transmission source port number included in each response packet are included in data of an individual response packet. The duplication unit 34g may determine the transmission source port number by performing an arithmetic operation using the transmission source port number included in the base P32.

For example, in the example of FIG. 10, the transmission source port number to be used for the response packet P41 by the duplication unit 34g is a transmission source port number pn1 included in the base P32. It is assumed that the duplication unit 34g sets the transmission source port number to be used for the response packet P42 to be pn2 acquired by adding a predetermined number to pn1. It is assumed that the duplication unit 34g sets the transmission source port number to be used for the response packet P43 to be pn3 acquired by adding a predetermined number to the transmission source port number pn2 of the response packet P42. The duplication unit 34g adds the response number and a list {pn1, pn2, pn3} of the transmission source port numbers of the response packets P41 to P43 to the UDP payloads of the response packets P41 to P43. The duplication unit 34g transmits the generated response packets P41 to P43 to the communication device 20a through the transmission unit 21g.

In any response packet, since a value set to the base P32 of the response packet is used as a value other than the transmission source port number, there is no difference between the response packets except for the value other than transmission source port number. Thus, if any one of the packets P41 to P43 arrives at the transmission source of the check packet, it is possible to restore the header information in the total number of transmitted response packets or each of the transmitted response packets in the communication device 20 as the transmission source of the check packet.

Figure 11:
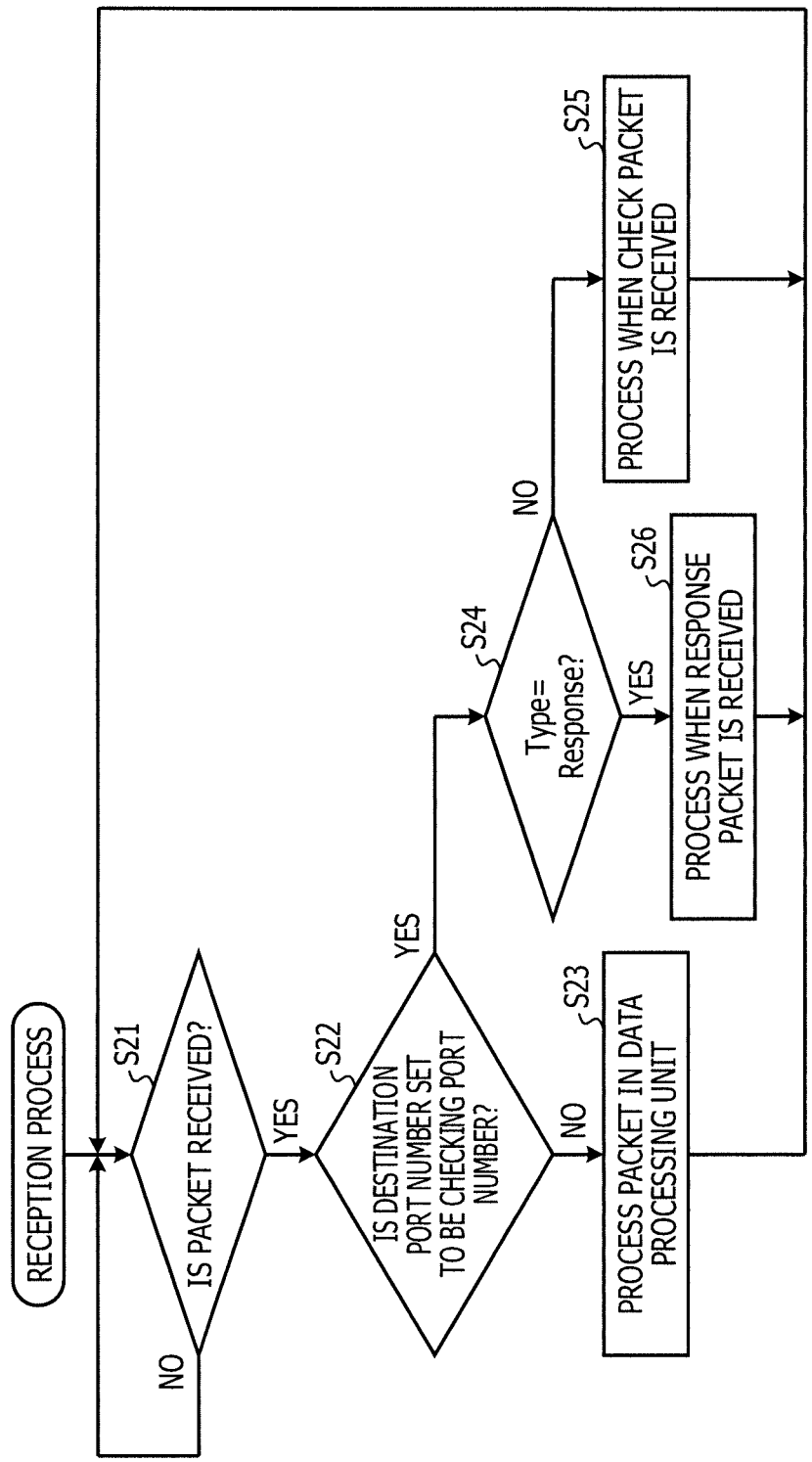
FIG. 11 is a flowchart for describing an example of a reception process of a packet in the communication device.

FIG. 11 is a flowchart for describing an example of the reception process of the packet in the communication device 20. The reception unit 22 of the communication device 20 waits until the packet is received (No in step S21). If the packet is received, the reception unit 22 outputs the received packet to the classification unit 23 (Yes in step S21). The classification unit 23 determines whether or not the destination port number of the received packet is the checking port number (step S22). In a case where the destination port number of the received packet is not the checking port number, since the received packet is neither the check packet nor the response packet, the received packet is processed by the data processing unit 24 (No in step S22, step S23). In a case where the destination port number of the reception packet is the checking port number, the classification unit 23 outputs the reception packet to the determination unit 35 and the response unit 33 (Yes in step S22). The determination unit 35 and the response unit 33 determine whether or not the value of the type field of the input packet is set to be Response (step S24). In a case where the value of the type field of the input packet is not Response, the response unit 33 processes the packet when the check packet is received (step S25). The example of the process when the check packet is received is the process described with reference to FIGS. 9 and 10. Meanwhile, in a case where the value of the type field of the input packet is Response, the determination unit 35 processes the packet when the response packet is received (step S26). The process when the response packet is received will be described below. After the process of step S25 or step S26 is performed, the processes subsequent to step S21 are repeated.

Figure 12:
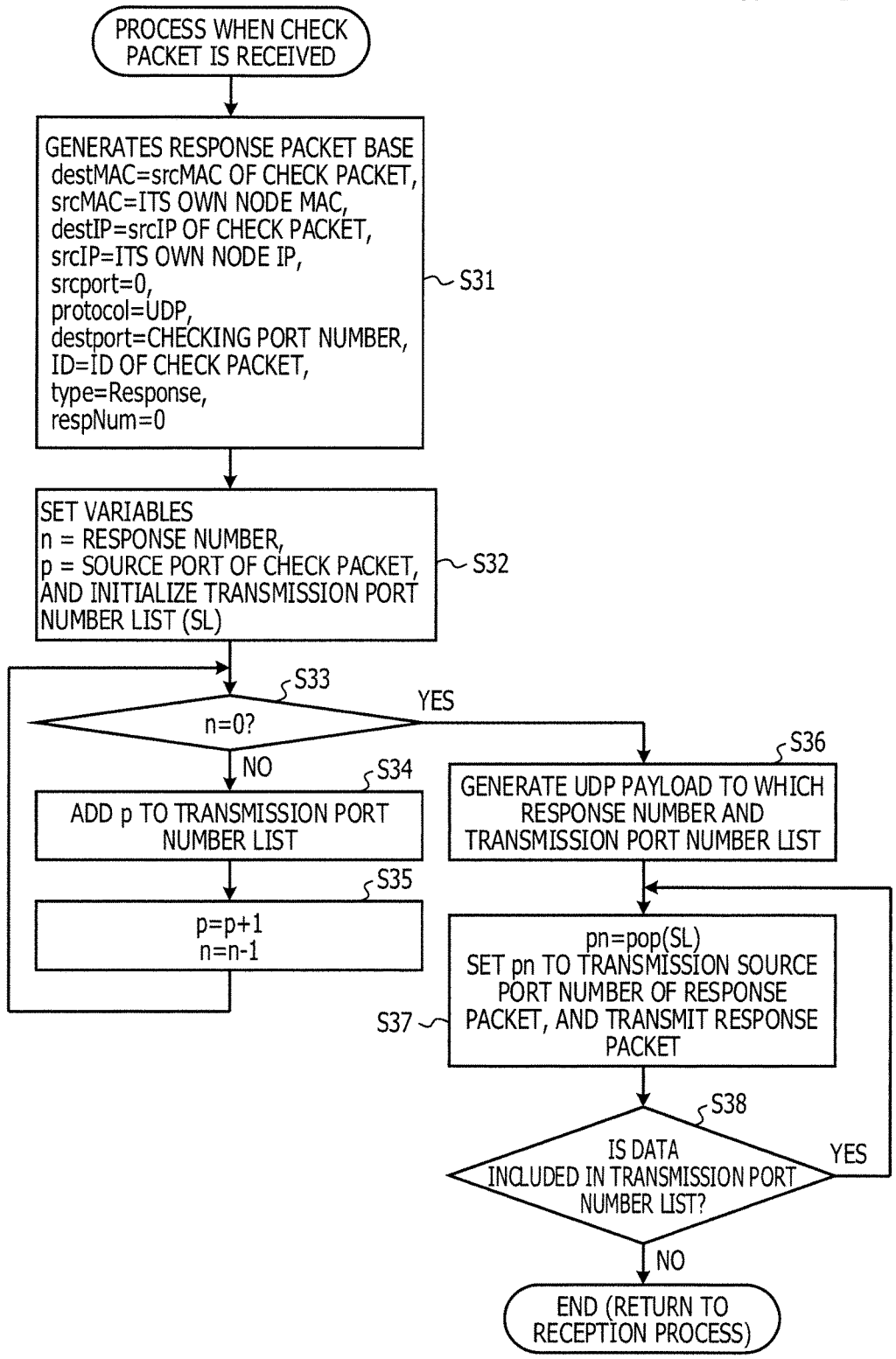
FIG. 12 is a flowchart for describing an example of a process when the check packet is received and the response packet is transmitted.

FIG. 12 is a flowchart for describing an example of the process when the check packet is received and the response packet is transmitted. FIG. 12 is an example of the process of step S25 of FIG. 11. In FIG. 12, the case where the transmission source port number is set to be 0 in the response packet base and the transmission source port number of the check packet is notified to the duplication unit 34 separately from the base of the response packet will be described. The response unit 33 generates the response packet base to be used for generating the response packet by using the check packet (step S31). In the response packet base, the transmission source MAC address of the check packet is used as the destination MAC address, and the transmission source IP address of the check packet is used as the destination IP address. A MAC address of its own node is set to the transmission source MAC address, and an IP address assigned to its own node is used as the transmission source IP address. The transmission source port number (srcport) is set to be 0, and the destination port number is set to be the checking port number. The protocol is set to be the UDP, and the ID is set to be the ID of the check packet. The setting type is set to be Response. The total number (respNum) of the response packet is set to be 0.

The duplication unit 34 sets a variable n to the response number and sets a variable p to the transmission source port number of the check packet, and initializes a transmission port number list (SL) (step S32). The transmission port number list is a list of the transmission source port number to be used for generating the response packet. The duplication unit 34 determines whether or not the variable n is 0 (step S33). In a case where the variable n is not 0, the duplication unit 34 adds the variable p to the transmission port number list (No in step S33, step S34). The duplication unit 34 increments the variable p by one and decrements the variable n by one, and returns to step S33 (step S35). In a case where the variable n is 0, the duplication unit 34 determines that as many of the transmission source port number as the response number (Yes in step S33). Here, the duplication unit 34 generates the UDP payload to which the response number and the transmission port number list are set by using the base of the response packet (step S36).

In step S37, the duplication unit 34 sets the value acquired by performing a pop process on the transmission port number list (SL) to the variable pn. The duplication unit 34 sets the variable pn to the transmission source port number of the response packet generated by combining the response packet base and the UDP payload, and transmits the response packet acquired after the setting process is performed (step S37). The duplication unit 34 determines whether or not the data is included in the transmission port number list (step S38). In a case where the data is included in the transmission port number list, the processes subsequent to step S37 are repeated (No in step S38). Meanwhile, in a case where the data is not included in the transmission port number list, the duplication unit 34 determines that the transmission of the response packet is ended, and ends the process (Yes in step S38).

(4) Reception of Response Packet

An example of the process of the communication device 20 that receives the response packets will be described as an example of a case where the communication device 20a receives the response packets after the response packets P41 to P43 are transmitted to the communication device 20a from the communication device 20g. In the communication device 20a, the classification unit 23a acquires the reception packets through the reception unit 22a. The classification unit 23a outputs the received packets to the response unit 33a and the determination unit 35a since the checking port number is used as the received packet.

The response unit 33a determines that the process of the input packet is not performed since the type value of the response packet is Response. Meanwhile, the determination unit 35a recognizes the response packet as the processing target since the type value of the response packet is Response.

Figure 13:
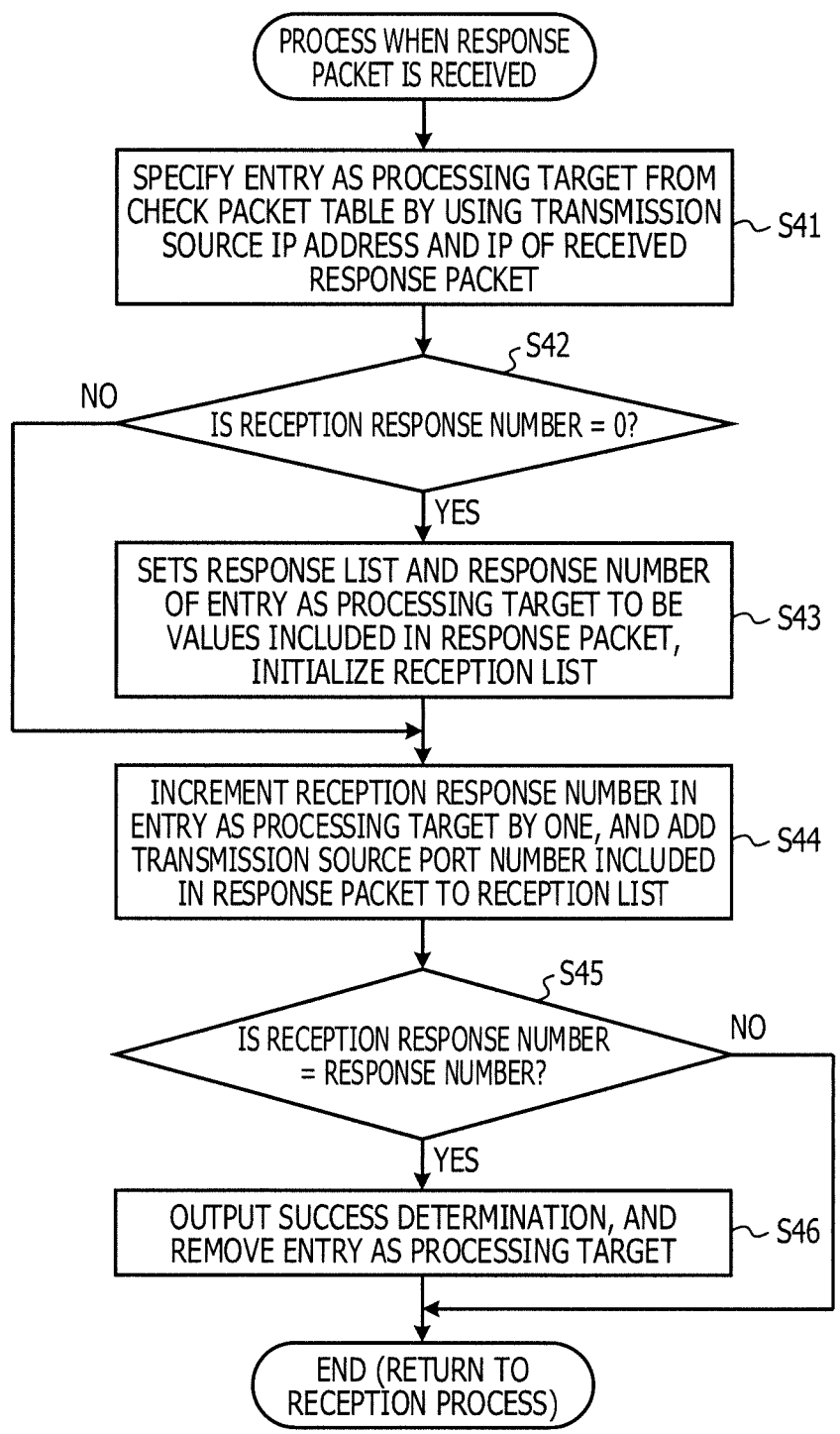
FIG. 13 is a flowchart for describing an example of a reception process of the response packet.

FIG. 13 is a flowchart for describing an example of the reception process of the response packet. FIG. 13 is an example of the process of step S26 of FIG. 11. An example of the process performed in the determination unit 35a will be described with reference to FIG. 13. The determination unit 35a specifies the entry as the processing target from the check packet table 36 by using the ID and the transmission source IP address of the received response packet (step S41). For example, it is assumed that the communication device 20a retains the check packet table 36-1 (FIG. 5) and the response packet including ID=1 is received from the communication device 20g. It is assumed that the IP address of the communication device 20g is IPg. In so doing, the determination unit 35a specifies the first entry of the check packet table 36-1, as the processing target.

The determination unit 35a determines whether or not reception response number=0 is set in the entry as the processing target (step S42). The entry in which the reception response number=0 is an entry that does not receive the response packet so far and is related to the check packet. Here, in a case where the entry in which reception response number=0 is the processing target, the determination unit 35a sets the response number and the response list to be values included in the response packet, and initializes the reception list (step S43). For example, it is assumed that the response packet input to the determination unit 35a is the response packet P41 (FIG. 10). In so doing, the determination unit 35a records response number=3 and the response list={pn1, pn2, pn3} in the entry as the processing target. That is, in the process of step S43, information of another response packet other than the received response packet is acquired from the data of the response packet. Another response packet is a packet transmitted as a response to the same check packet as the received response packet.

In a case where the reception response number in the entry as the processing target is equal to or greater than 1 and after the process of step S43 is performed, the determination unit 35a increments the reception response number in the entry as the processing target by one, and adds the transmission source port number included in the response packet to the reception list (step S44). For example, in a case where the response packet input to the determination unit 35a is the response packet P41 (FIG. 10), after the process of step S43 is performed, the determination unit 35a sets the reception response number to be 1, and adds the transmission source port number pn1 of the response packet P41 to the reception list. Thus, these processes are ended, the first entry of the check packet table 36-1 is changed to a first entry of a check packet table 36-2 illustrated in FIG. 14.

Thereafter, the determination unit 35a determines whether or not the reception response number is the same as the response number (step S45). In a case where the reception response number is not the same as the response number, the determination unit 35a ends the process (No in step S45). In this case, if the packet is newly received, the processes described with reference to FIGS. 11 to 13 are repeated. Meanwhile, in a case where the reception response number is the same as the response number, the determination unit 35a outputs the determination (success determination) indicating that there is no abnormality in the path as the checking target, and removes the entry as the processing target from the check packet table 36 (Yes in step S45, step S46).

A second entry of the check packet table 36-2 illustrated in FIG. 14 is an example in which the reception response number and the response number are the same through the reception of the response packet. In so doing, the determination unit 35a determines that all the response packets transmitted to the communication device 20a from the communication device 20f to which the IP address of IPf is assigned arrives at the communication device 20a. Thus, the determination unit 35a determines that the failure does not occur over a physical network in the communication path between the communication device 20f and the communication device 20a. The determination unit 35a outputs the determination result to a display device included in the communication device 20a. The determination unit 35a may transmit the determination result to a terminal operated by the operator through the transmission unit 21a. Thus, the operator can recognize that it is determined that the failure of the physical network does not occur for the communication between the communication device 20f and the communication device 20a. Accordingly, in a case where the failure occurs in the communication between a virtual machine operated in the communication device 20f and a virtual machine operated in the communication device 20a, the operator can determine that a failure occurs by a failure of a virtual network.

(5) Inquiry about Path in which Packet is Lost

Before the path in which the packet is lost is specified, an example of a timer process will be described. The timer process is performed on all the entries of the check packet table in which the reception of all the response packets for the check packet is not completed.

Figure 15:
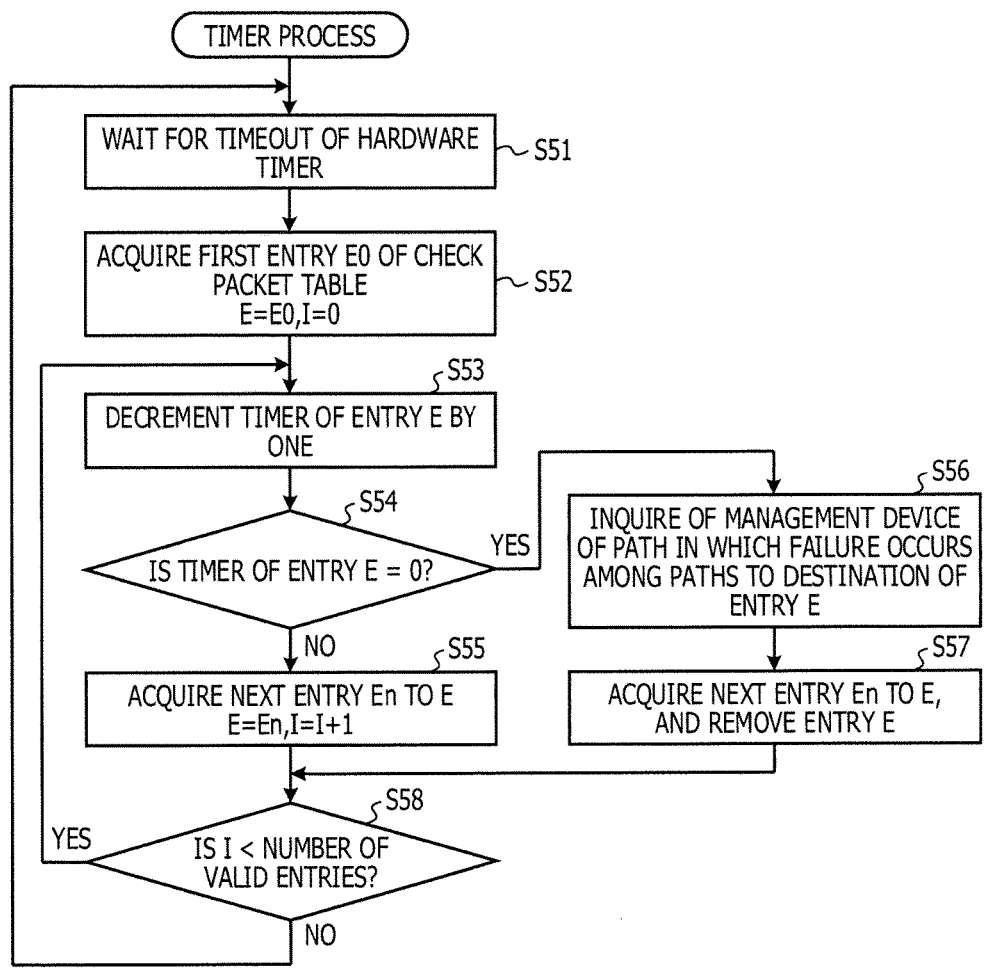
FIG. 15 is a flowchart for describing an example of a timer process.

FIG. 15 is a flowchart for describing an example of the timer process. In FIG. 15, variables E and I are used. The variable E is used for specifying the entry as the processing target, and the variable I is used for counting the number of processed entries. The determination unit 35 monitors a hardware timer, and waits for timeout of the hardware timer (step S51). The determination unit 35 acquires a first entry E0 of the check packet table 36, substitutes E with E0, and sets the variable I to be 0 (step S52). The determination unit 35 decrements the timer of the entry E by one (step S53). The timer of the entry E is a value of the timer field included in the entry E. The determination unit 35 determines whether or not the timer of the entry E is 0 (step S54). In a case where the timer of the entry E is not 0, the determination unit 35 acquires the next entry En to E from the check packet table 36, and substitutes E with En. The determination unit 35 increments the variable I by one (No in step S54, step S55). The determination unit 35 determines whether or not the variable I is less than the number of valid entries (step S58). In a case where the variable I is less than the number of valid entries, the processes subsequent to step S53 are repeated (Yes in step S58). Meanwhile, in a case where the variable I is equal to or greater than the number of valid entries, the processes subsequent to step S51 are repeated (No in step S58).

In a case where the timer of the entry E is 0, the determination unit 35 inquires of the management device 80 about the path in which the failure occurs among the paths to the destination of the entry E (Yes in step S54, step S56). The details of the process performed in step S56 will be described below. Thereafter, the determination unit 35 acquires the next entry En to E, and removes the entry E. The determination unit 35 substitutes E with En, and increments the variable I by one (step S57). Thereafter, the processes subsequent to step S58 are performed.

Figure 16:
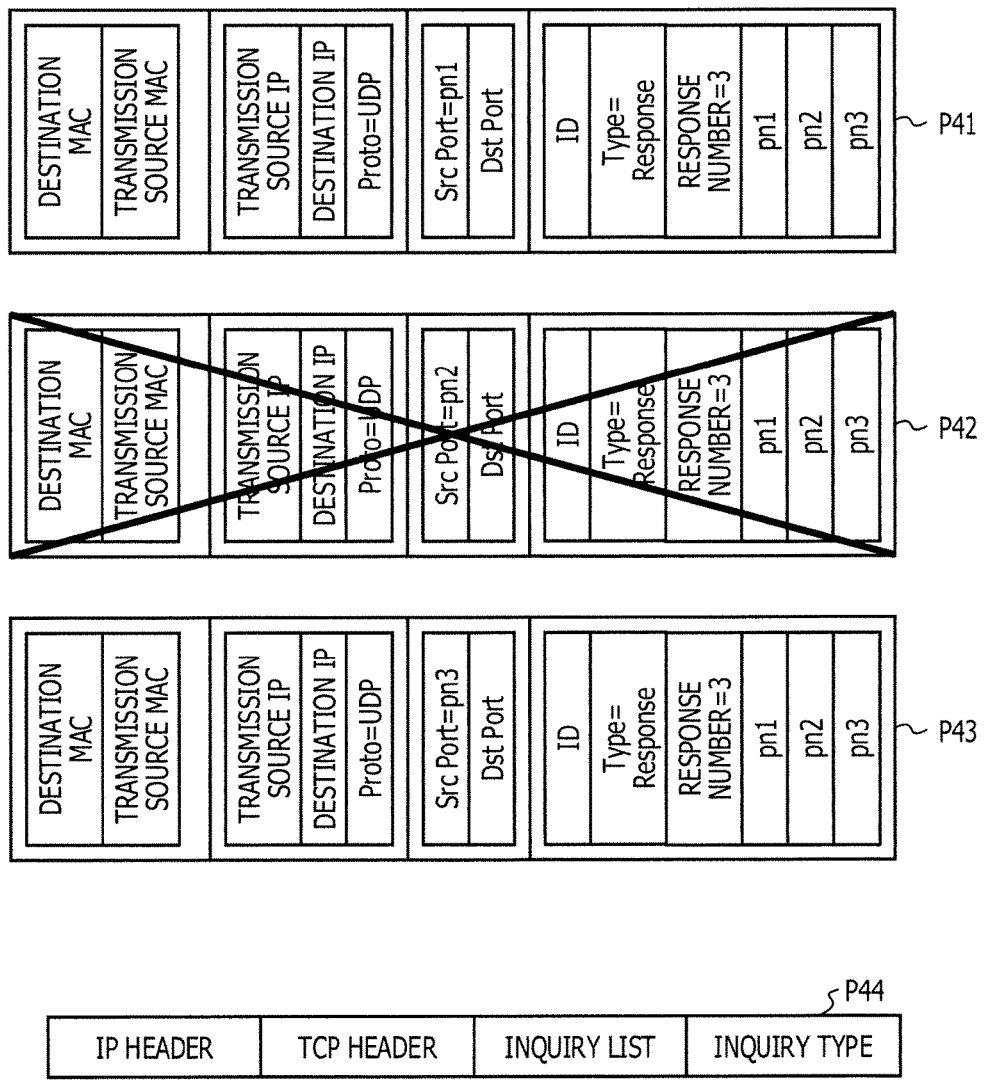
FIG. 16 is a diagram for describing a loss example of the response packet.

FIG. 16 is a diagram for describing a loss example of the response packet. An example of the process of step S56 of FIG. 15 will be described with reference to FIG. 16. For example, it is assumed that the packet P42 among the packets P41 to P43 transmitted from the communication device 20g to the communication device 20a is lost in the transmission path. In so doing, the determination unit 35a determines that the response packet in which the transmission port number=pn2 is not received even in a point of tie when the timer value of the first entry of the check packet table 36-2 is 0. In so doing, the determination unit 35a generates header information of the response packet that fails to be received by using the information of the received response packet and the value pn2 of the transmission source port number included in the response packet that fails to be received. The determination unit 35a determines that the failure occurs in the path specified by the generated header information, and adds the generated header information to an inquiry list.

A packet P44 is a packet (analysis request packet) used by the determination unit 35 when the management device 80 is requested to analyze the path. The packet P44 includes an IP header, a Transmission Control Protocol (TCP) header, an inquiry list, and an inquiry type. The inquiry list is a list of header information items of the response packets that are not received by the communication device 20. The number of headers included in the inquiry list is an arbitrary value. The inquiry type is a value for determining whether the inquiry is an inquiry that the reception of the response packet is failed or an inquiry performed regardless of the reception state of the response packet. When the inquiry about the path in which the packet is lost is performed, inquiry type=packet loss occurrence path is set. In a case where the inquiry is performed regardless of the reception state of the response packet, inquiry type=inquiry is set.

Although the example in which the transmission source of the check packet does not receive some of the response packets has been described with reference to FIG. 16, there is a possibility that the transmission source of the check packet will not receive any one of the response packets ever after a predetermined time elapses from the transmission of the check packet. In such a case, since there is a high possibility that the check packet will not arrive at the destination, the determination unit 35 determines that the failure occurs in the path specified by the header information of the check packet. The information of the header of the check packet can be reproduced from the information recorded in the check packet table 36. Thus, the determination unit 35 adds the header information of the check packet to the inquiry list, and inquires of the management device 80 about the path.

Figure 17:
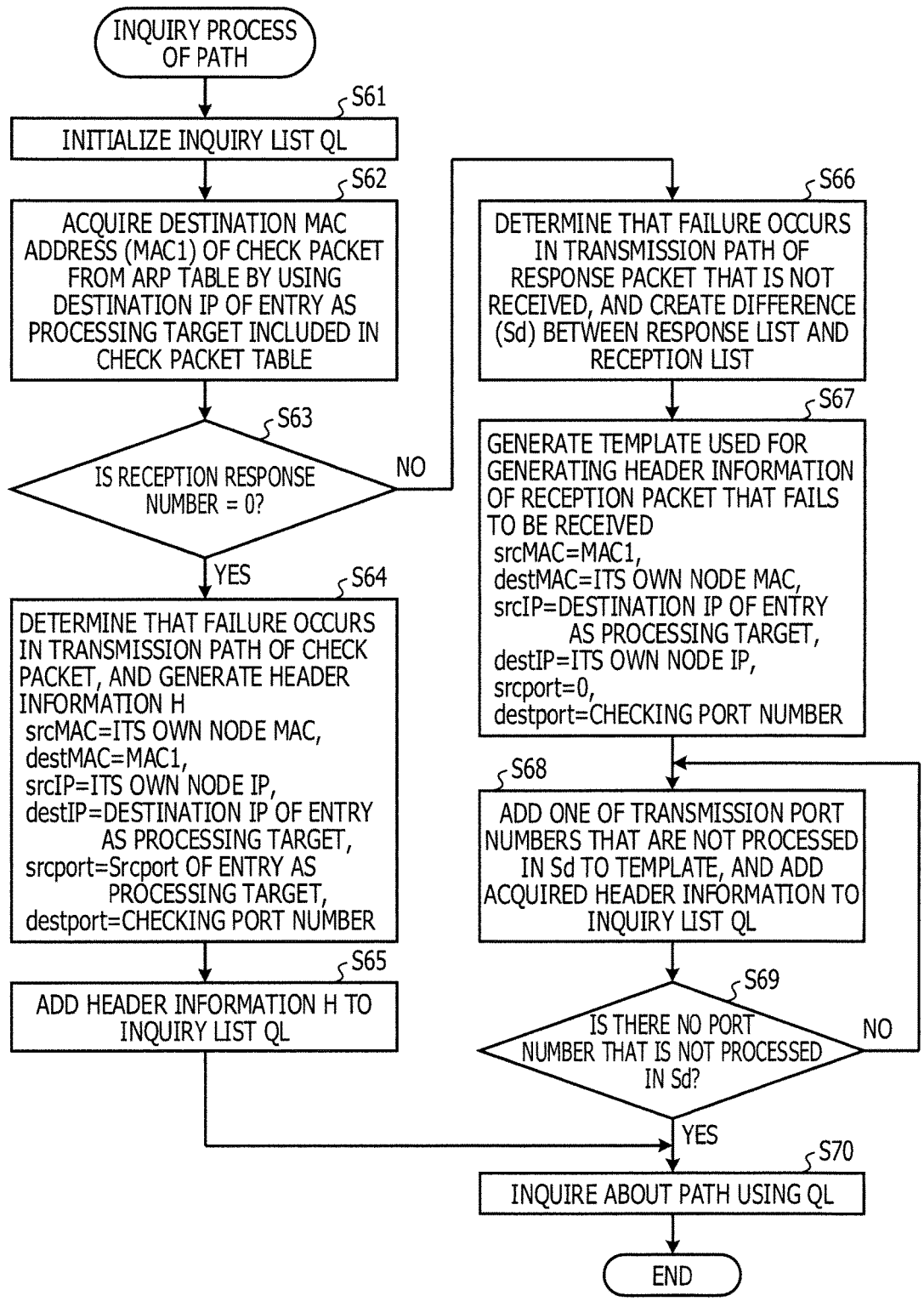
FIG. 17 is a flowchart for describing an example of an inquiry process of the path.

FIG. 17 is a flowchart for describing an example of an inquiry process of the path. FIG. 17 illustrates the details of the process of step S56 of FIG. 15. The determination unit 35 initializes an inquiry list (QL) (step S61). The determination unit 35 uses the entry of the check packet table 36 of which the timer is 0, as the processing target. A destination MAC address (MAC1) of the check packet is acquired from an ARP table by using the destination IP address of the entry as the processing target included in the check packet table 36 (step S62). The determination unit 35 determines whether or not the reception response number in the entry is 0 (step S63).

In a case where the reception response number in the entry is 0, since any one of the response packets is not received from the communication device 20 as the destination of the check packet, the determination unit 35 determines that the failure occurs in the transmission path of the check packet (Yes in step S63). Here, the determination unit 35 uses header information H of the inquiring target as the header included in the check packet (step S64). That is, the determination unit 35 uses the transmission source MAC address and the transmission source IP address in the header information H, as the addresses of its own device, and uses the destination IP address as the destination IP address included in the entry as the processing target. The determination unit 35 sets the MAC1 acquired in step S62 to be the destination MAC address in the header information H. The determination unit 35 uses the transmission source port number in the header information H, as the transmission source port number included in the entry as the processing target, and sets the destination port number to be the checking port number. Thereafter, the determination unit 35 adds the generated header information H to the inquiry list QL, and performs the inquiry about the path using the inquiry list QL (step S65, S70). In this case, the determination unit 35 generates the analysis request packet including the inquiry list, and transmits the generated packet to the management device 80 through the transmission unit 21.

In a case where the reception response number in the entry is not 0, since some of the response packets transmitted from the communication device 20 as the destination of the check packet are received, the determination unit 35 determines that the failure occurs in the transmission path of the response packet that fails to be received (No in step S63). The transmission source port number included in the header of the response packet that fails to be received is included in the response list of the entry as the processing target, but is not included in the reception list. Here, the determination unit 35 generates a difference (Sd) between the reception list and the response list of the entry as the processing target (step S66). For example, in the case of FIGS. 16, P41 and P43 of the response packets transmitted from the communication device 20g are received by the communication device 20a. Thus, the response list is {pn1, pn2, pn3}, whereas the reception list is {pn1, pn3}. Accordingly, Sd=pn2. In a case where the reception of one or more response packets is failed, a plurality of transmission source port numbers is included in Sd.

Subsequently, the determination unit 35 generates a template used for generating the header information of the response packet that fails to be received. That is, the determination unit 35 uses the destination MAC address and the destination IP address in the template, as the addresses of its own device, and uses the transmission source IP address as the destination IP address in the entry as the processing target. The determination unit 35 sets the MAC1 acquired in step S62 to the transmission source MAC address in the template. The determination unit 35 sets the transmission source port number in the template to be 0, and sets the destination port number to be the checking port number (step S67). Thereafter, the determination unit 35 adds one of the transmission port numbers that are not processed in the difference Sd to the template, and adds the acquired header information to the inquiry list QL (step S68). The determination unit 35 determines whether or not there are the port numbers that are not processed in the difference Sd (step S69). In a case where there are the port numbers that are not processed in the difference Sd, the determination unit 35 returns to step S68 (No in step S69). In a case where there are no port numbers that are not processed in the difference Sd, the determination unit 35 performs the inquiry about the path by using the inquiry list QL (Yes in step S69, S70). The inquiry about the path in this case may also be performed using the analysis request packet (P44 of FIG. 16).

(6) Example of Process in Management Device 80

If the analysis request packet is received, the management device 80 specifies the transmission path of the packet included in the same header as the header information of the inquiring target notified using the analysis request packet. The management device 80 previously retains topology information of the network and an algorithm of a selection process of the path in each switch 10, and specifies the transmission path by using the specified header information and algorithm. For example, the management device 80 may generate information acquired by arranging identification information of the switch 10, and an input port and an output port of the packet for the switch 10, as path information, for each of the switches 10 included in the path in the order of passed packets. The management device 80 transmits the acquired path information to the transmission source of the analysis request packet.

Figure 18:
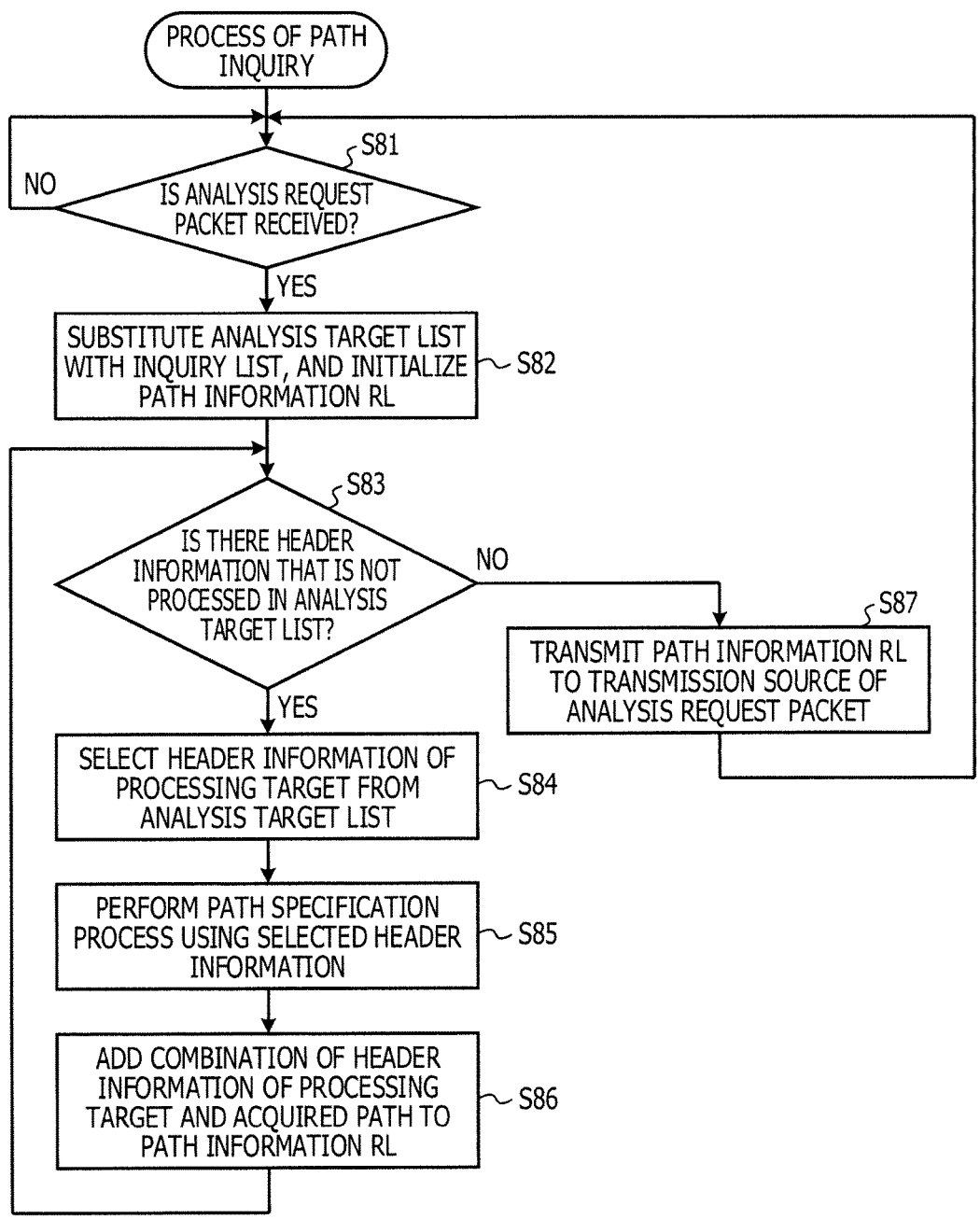
FIG. 18 is a flowchart for describing an example of a process in a management device that receives an inquiry about a path.

FIG. 18 is a flowchart for describing an example of the process in the management device 80 that receives the inquiry about the path. It is assumed that the management device 80 retains a list (analysis target list) of the header information items as the targets on which an analysis process is performed. It is assumed that the management device 80 may retain the analysis result as the path information.

The management device 80 determines whether or not the analysis request packet is received (step S81). If the inquiry list is extracted from the analysis request packet, the management device 80 substitutes the analysis target list with the inquiry list, and initializes path information RL (step S82). The management device 80 determines whether or not there are the header information items that are not processed in the analysis target list (step S83). In a case where there are the header information items that are not processed in the analysis target list, the management device 80 selects the header information as the processing target from the analysis target list (Yes in step S83, step S84). The management device 80 performs a path specification process by using the selected header information (step S85). Thereafter, the combination of the header information as the processing target and the acquired path to the path information RL, and returns to step S83 (step S86). In a case where there are no header information items that are not processed in the analysis target list, the management device 80 transmits the path information RL to the transmission source of the analysis request packet, and returns to step S81 (No in step S83, step S87).

Figure 19:
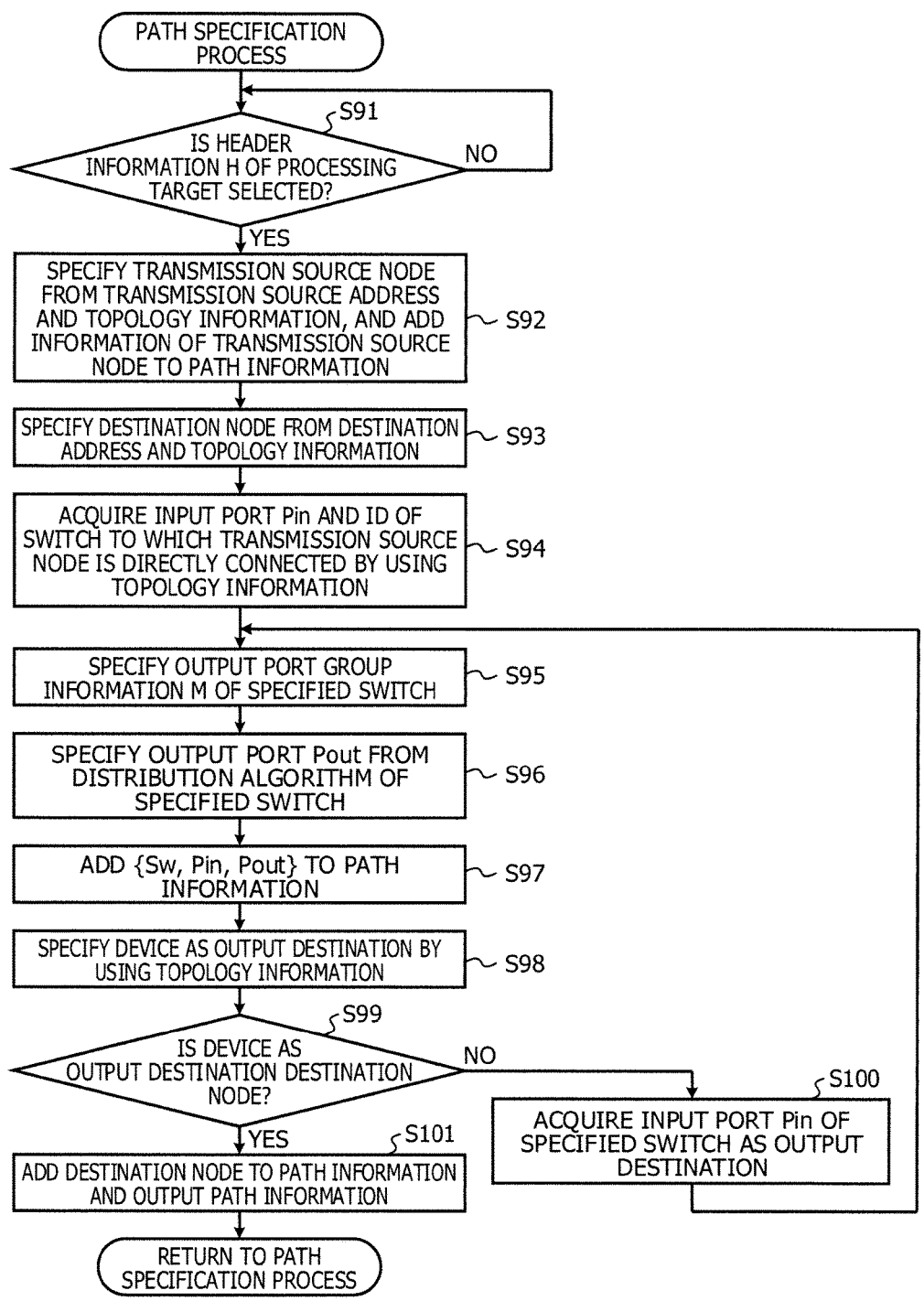
FIG. 19 is a flowchart for describing an example of a specification process of a path in the management device.

FIG. 19 is a flowchart for describing an example of a specification process of the path in the management device 80. FIG. 19 illustrates an example of the process of step S85 of FIG. 18. It is assumed that the path information generated through the process of FIG. 19 is a character string acquired by expressing the path from a transmission source node to a reception node of the packet having the header as the inquiring target in the following form. {ID of transmission source node, (ID of switch 10, input port of switch 10, output port of switch 10), . . . , ID of destination node}

The management device 80 does not perform the path specification process until the header information H of the processing target is selected (No in step S91). If the header information H of the processing target is selected, the management device 80 specifies the transmission source node of the packet by using the transmission source address included in the header information H and the topology information, and adds the information of the transmission source node to the path information (Yes in step S91, step S92). In step S92, one or more of the transmission source MAC address and the transmission source IP address may be used as the transmission source address. Subsequently, the management device 80 specifies the destination node of the packet by using the destination address included in the header information H and the topology information (step S93). In step S93, one or more of the destination MAC address and the destination IP address may be used as the destination address. The management device 80 acquires the ID of the switch 10 to which the transmission source node is directly connected and the input port number Pin of the packet for the switch by using the topology information (step S94). The management device 80 specifies output port group information of the specified switch (step S95). Here, the port group information is the combination of the port numbers as the output destination in a case where the packet having the header of the processing target is input from the Pin in the specified switch 10. The management device 80 specifies an output port Pout from a distribution algorithm of the specified switch 10 (step S96). In step S96, Expression (1) may be used.

In remainder corresponding to Pout=F(h, M) . . . (1) In Expression (1), h is a hash value of the header information H. F represents a modulo operation, and h is a dividend in the modulo operation. M is the number of ports included in the port group information, and is used as a divisor in the modulo operation. It is assumed that the management device 80 previously retains the relationship between a value acquired through the modulo operation in each switch 10 and the port used as the output port, as a part of the algorithm.

The management device 80 combines an identifier (Sw) of the specified switch 10, an input port (Pin) of the packet, and an output port (Pout) of the packet, and adds the combined information to the path information (step S97). The management device 80 specifies the device as the output destination by using the topology information (step S98). The management device 80 determines whether or not the device as the output destination is the destination node (step S99). In a case where the device as the output destination is not the destination node, the device as the specified output destination is the switch 10 (No in step S99). Here, if the input port Pin of the packet having the header of the header information H for the specified switch is specified, the management device 80 repeats the processes subsequent to step S95 (step S100).

Meanwhile, in a case where the device as the output destination is the destination node, an end point of the path is searched for (Yes in step S99). Here, the management device 80 adds the ID of the destination node to the path information (step S101).

For example, it is assumed that the response packet P42 (FIG. 16) that fails to be received by the communication device 20a is transmitted over the path to the communication device 20a through the SW6, the SW8, the SW10, the SW4, and the SW1 as depicted by an arrow R22 of FIG. 8. If the transmission path of the response packet P42 is inquired, the management device 80 notifies the communication device 20a of the combination of the identifier, the input port, and the output port of each switch included in the path of the arrow R22, as the path. For example, if the port number is continuously described as a character string of "Po", the path information generated by the management device 80 is expressed as follows.

{communication device 20g, (SW6, Po2, Po4), (Sw8, Po2, Po3), (SW10, Po2, Po1), (SW4, Po3, Po1), (SW1, Po4, Po1), communication device 20a}

As described above, according to the first embodiment, the communication device 20 that receives the check packet generates a plurality of response packets as responses to the check packet, and adds header information of another response packet to each response packet. Thus, if one of the plurality of response packets is received, the communication device 20 as the transmission source of the check packet can specify the header of the response packet that is not received. It is possible to specify the path in which the failure occurs by using the information of the header of the response packet that is not received. In a case where any one of the response packets is not received, the communication device 20 as the transmission source of the check packet can determine that the failure occurs in the transmission path of the transmission check packet. Accordingly, it is easy to specify the path in which the failure occurs in a state in which the paths are redundant.

In a case where the communication device 20 that receives the check packet receives all the response packets from the destination of the check packet, the failure of the physical network is not found. In this case, it is possible to determine that a communication failure between the virtual machine operated in the communication device 20 as the transmission source of the response packet and the virtual machine operated in the communication device 20 as the transmission source of the check packet is caused by a problem in the virtual network.

As stated above, if the first embodiment is used, it is easy to distinguish whether the failure in the system in which the virtual network is established in the physical network is caused by the failure in the physical network or by the failure in the virtual network. Thus, it is easy to perform the restoration from the failure.

<Second Embodiment>

Although it has been described in the first embodiment that the plurality of response packets having different headers is transmitted in the communication device 20, there are some cases where some of the response packets pass over the same path. Here, in the second embodiment, a case where the communication device that transmits the plurality of response packets learns a distribution state of the path will be described.

Figure 20:
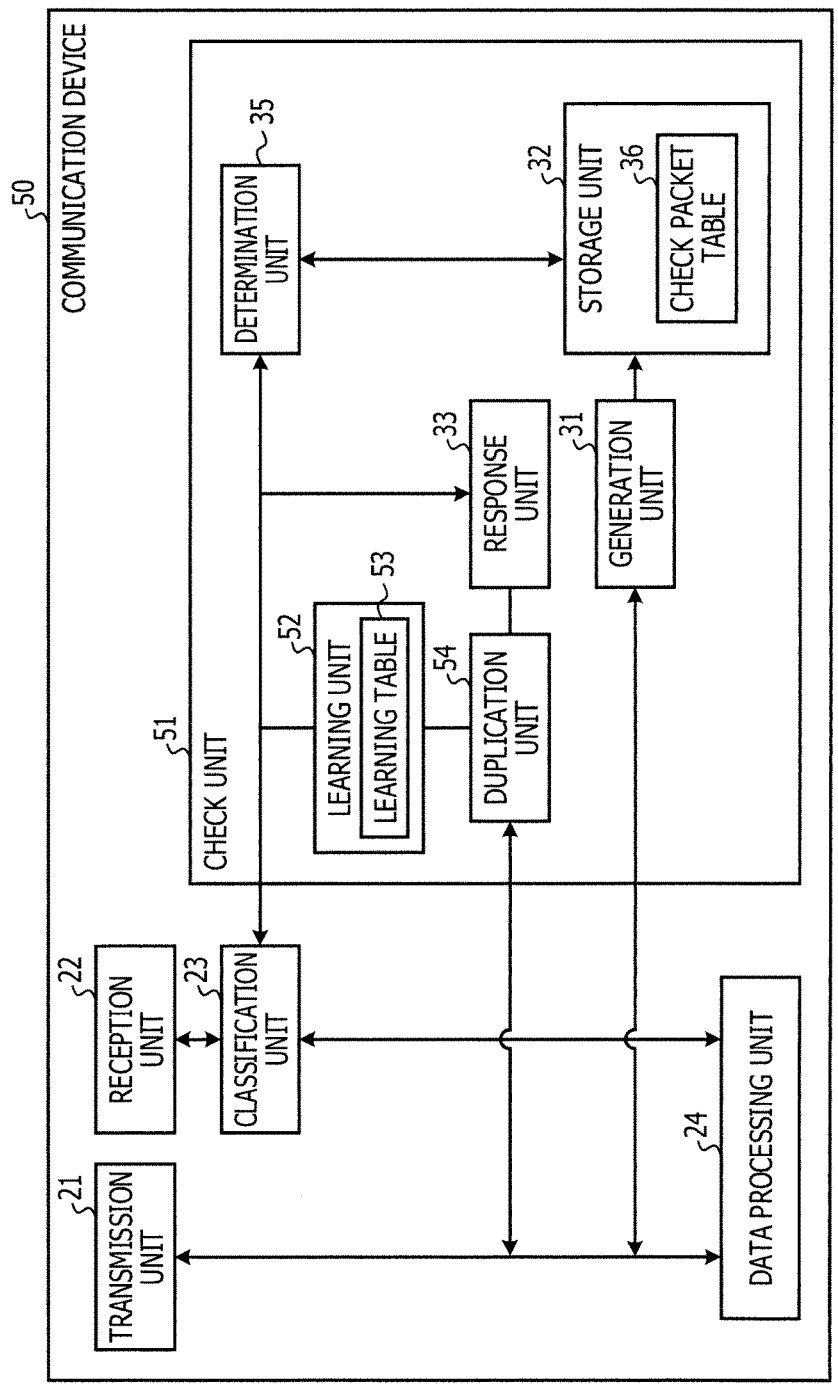
FIG. 20 is a diagram for describing an example of a configuration of a communication device according to a second embodiment.

FIG. 20 is a diagram for describing an example of a configuration of a communication device 50 according to the second embodiment. The communication device 50 includes a transmission unit 21, a reception unit 22, a classification unit 23, a data processing unit 24, and a check unit 51. The check unit 51 includes a generation unit 31, a storage unit 32, a response unit 33, a duplication unit 54, a determination unit 35, and a learning unit 52. The storage unit 32 stores the check packet table 36, and the learning unit 52 includes a learning table 53.

The learning unit 52 inquires of the management device 80 about the transmission path to be used for each of the response packets. The learning unit 52 determines whether or not there are the response packets passing over the same path among the plurality of response packets by using the information of the path acquired from the management device 80. The learning unit specifies a state of the distribution or redundancy of the transmission paths of the plurality of response packets, and records the header information items of the response packets transmitted to the distributed paths in the learning table 53. The duplication unit 54 generates the plurality of response packets by using the header information items recorded in the learning table 53.

The processes performed in the transmission unit 21, the reception unit 22, the classification unit 23, the data processing unit 24, the generation unit 31, the storage unit 32, the response unit 33, and the determination unit 35 and the check packet table 36 in the second embodiment are the same as those in the first embodiment.

A hardware configuration of the communication device 50 is also as illustrated in FIG. 3. A processor that realizes the communication device 50 is operated as the classification unit 23, the data processing unit 24, the generation unit 31, the response unit 33, the determination unit 35, the learning unit 52, and the duplication unit 54. The learning table 53 is appropriately stored in the memory 102.

Figure 21:
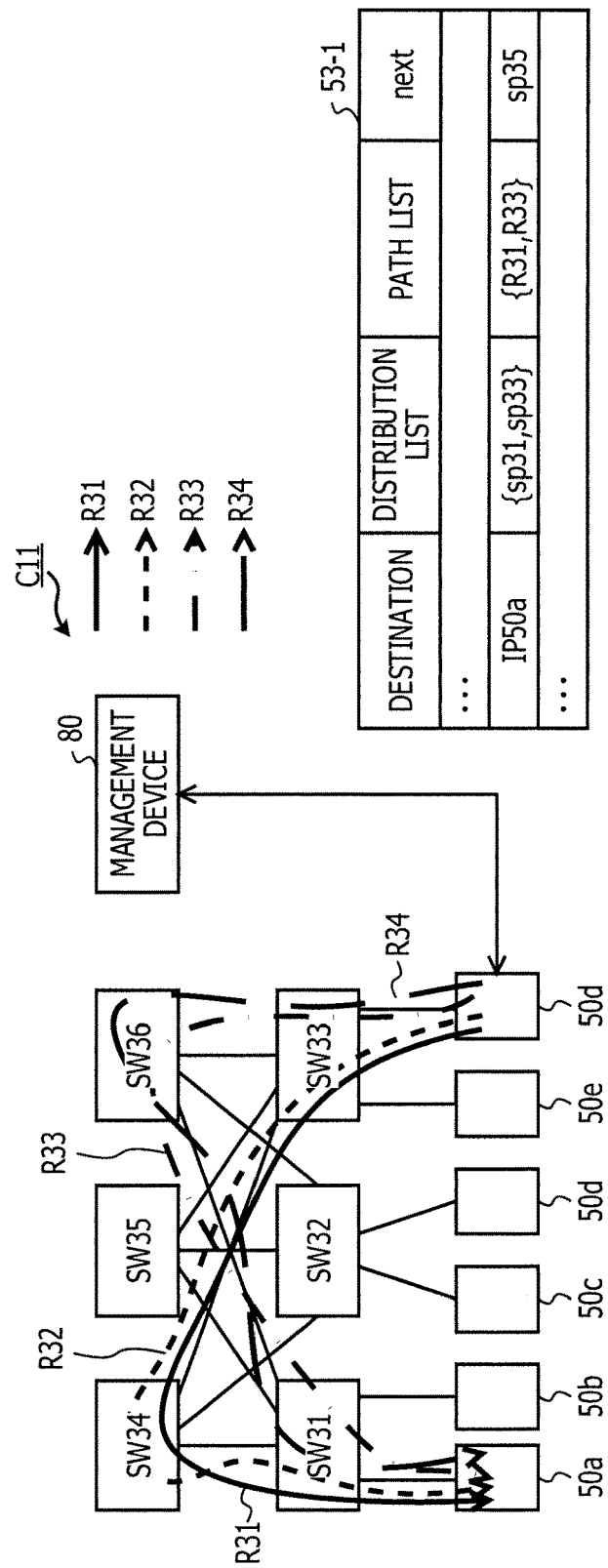
FIG. 21 is a diagram for describing an example of a generation method of a response packet.

FIG. 21 is a diagram for describing an example of the generation method of the response packet. In FIG. 21, it is assumed that the communication devices 50a to 50f are connected to each other through the switches 10 (SW31 to SW36) as depicted in a case C11. Although it is not illustrated in FIG. 21 in order to easily illustrate the drawing, it is assumed that the management device 80 is connected to the communication device 50 and the switches 10 included in the network through a control line.

It is assumed that the check packet is transmitted to the communication device 50f from the communication device 50a in the network illustrated in the case C11 and the check packet arrives at the communication device 50f through the same process as that in the first embodiment. Similarly to the first embodiment, the response unit 33f of the communication device 50f generates the bases of the response packets. In a case where the communication device 20f initially receives the check packet from the communication device 50a, the duplication unit 54f generates the plurality of response packets through the same process as that in the first embodiment. For example, in a case where the number of duplicates is 4, the duplication unit 54f generates four response packets. In the generated response packets, the values of the transmission source port numbers are different from each other. In the example of FIG. 21, it is assumed that any one of sp31, sp32, sp33, and sp34 is used as the transmission source port number included in the generated response packets. The duplication unit 54f transmits four generated response packets through the transmission unit 21f.

Thereafter, the duplication unit 54f generates the analysis request packet including the header information of each of four generated response packets. In this case, since the packet loss does not occur, the duplication unit 54f sets the inquiry type of the analysis request packet to be "inquiry". The duplication unit 54f transmits the analysis request packet to the management device 80 through the transmission unit 21f.

The analysis process performed in the management device 80 and the notification process of the analysis result are the same as the processes described in the first embodiment. However, in the second embodiment, it is assumed that the checking port number is designated in the destination port number of the notification packet for notifying of the path. As the analysis result in the management device 80, it is assumed that the transmission of the response packets is specified as illustrated in the case C11. Here, a path R31 is a transmission path of the response packet of which transmission source port number=sp31. A path R32 is a transmission path of the response packet of which transmission source port number=sp32, and a path R33 is a transmission path of the response packet of which transmission source port number=sp33. A path R34 is a transmission path of the response packet of which transmission source port number=sp34.

It is assumed that the notification of the path is transmitted to the communication device 50f from the management device 80. The classification unit 23f acquires the notification packet through the reception unit 22f, and outputs the notification packet to the response unit 33f, the determination unit 35f, and the learning unit 52f in response to the destination port number. The response unit 33f and the determination unit 35f do not use the notification packet as the processing target.

If the notification packet is acquired, the learning unit 52f specifies the transmission path for each response packet by using the combination of the path notified by the notification packet with the header information. As illustrated in the case C11, the learning unit 52f determines that both the response packet of which transmission source port number=sp31 and the response packet of which transmission source port number=sp32 arrive at the communication device 50a from the communication device 50f through the SW33, the SW34, and the SW31. The learning unit 52f determines that both the response packet of which transmission source port number=sp33 and the response packet of which transmission source port number=sp34 arrive at the communication device 50a from the communication device 50f through the SW33, the SW36, and the SW31. When the check packet is received from the communication device 50a later, the learning unit 52f records the transmission source port numbers of which the paths do not overlap each other and the transmission paths in the learning table 53f in order to transmit the plurality of response packets over different paths.

A learning table 53-1 is an example of the learning table 53f generated in a case where the paths illustrated in the case C11 are acquired. The learning table 53-1 includes a destination, a distribution list, a path list, and a next value for each entry. The destination is a destination of the response packet. In the case C11, since the response packet is transmitted to the communication device 50a, the destination is set to be an IP address (IP50a) of the communication device 50a. The distribution list is a list of transmission source port numbers selected such that the paths of the response packets do not overlap each other. In the case C11, since the transmission paths of the response packet of which transmission source port number=sp31 and the response packet of which transmission source port number=sp32 overlap each other, one of the sp31 and the sp32 is included in the distribution list. Since the transmission paths of the response packet of which transmission source port number=sp33 and the response packet of which transmission source port number=sp34 overlap each other, one of the sp33 and the sp34 is included in the distribution list. In the example of the learning table 53-1, the sp31 and the sp33 are recorded in the distribution list.

The path list is a list of transmission paths to be used when the transmission source port numbers included in the distribution list are used. In the example of the learning table 53-1, since the sp31 and the sp33 are recorded in the distribution list, the R31 and the R33 are recorded in the path list. The next value is a value to be initially used in a case where the response packets are generated by using the transmission source port numbers that are not used by the duplication unit 54 so far. When the transmission process is performed as illustrated in the case C11, the sp31 to sp34 are used as the transmission source port numbers. Here, the learning unit 52f sets sp35 to be the next value.

Hereinafter, a case where the communication device 50f receives the check packet from the communication device 50a again after the process of FIG. 21 will be described. In this case, the generation of the base of the response packet when the response packet is generated is performed by the response unit 33f similarly to the first embodiment.

The duplication unit 54f generates the response packets by using the transmission source port numbers included in the distribution list. In a case where the learning table 53-1 is used, the duplication unit 54f generates the response packet of which transmission source port number=sp31 and the response packet of which transmission source port number=sp33. Although the generation of the response packets that use the transmission source port numbers included in the learning table 53-1 is ended in this stage, the total number of response packets is 2, and is not 4 which is the response number. As stated above, even though the response packets are generated by using all the transmission source port numbers included in the distribution list, in a case where as many response packets as the response number are not generated, the duplication unit 54f generates the response packets by using the next values as new port numbers. In the learning table 53-1, next value=sp35. Here, the duplication unit 54f generates the response packet of which transmission source port number=sp35 and the response packet of which transmission source port number=sp36. The duplication unit 54f transmits four generated response packets through the transmission unit 21f. Thereafter, the duplication unit 54f inquires of the management device 80 about the transmission path by using the header information of each of two response packets which are newly generated among four generated response packets.

Figure 22:
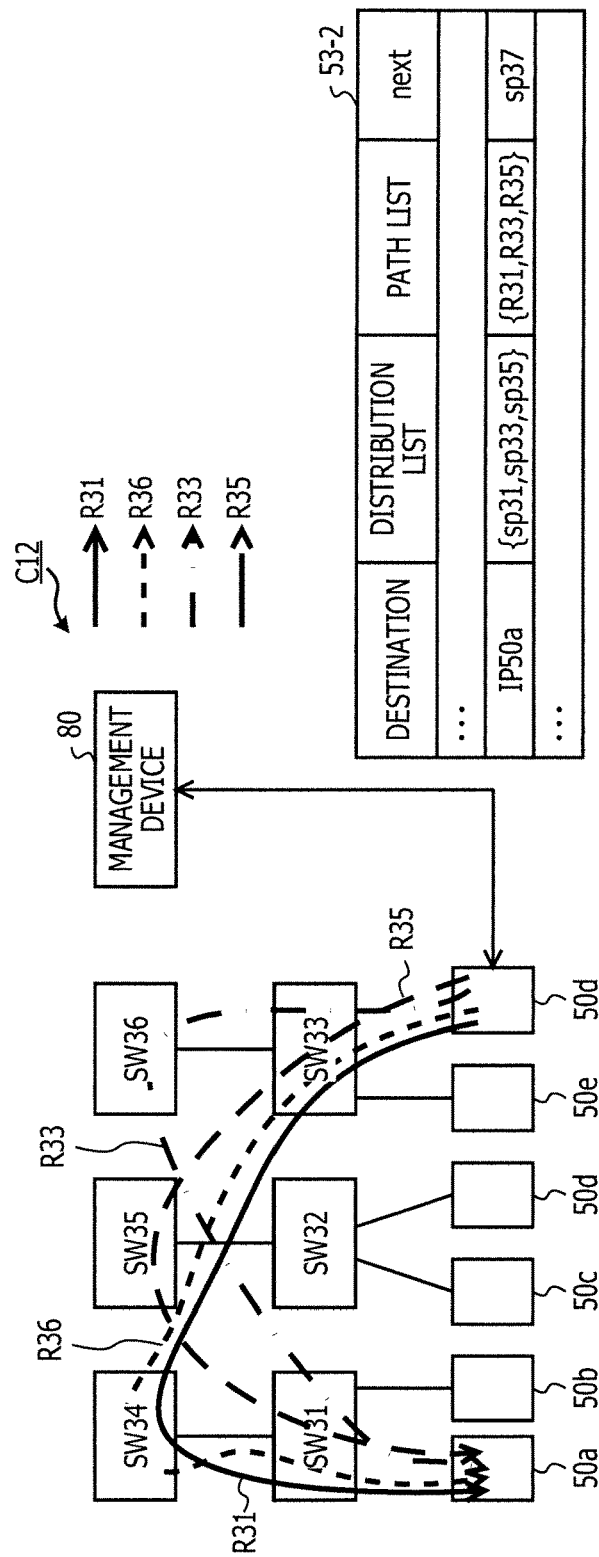
FIG. 22 is a diagram for describing an example of the generation method of the response packet.

A case C12 of FIG. 22 is a diagram for describing an example of the transmission path of the response packet generated using the learning table 53-1. The path R31 is a transmission path of the response packet of which transmission source port number=sp31, and the path R33 is a transmission path of the response packet of which transmission source port number=sp33. A path R35 is a transmission path of the response packet of which transmission source port number=sp35. A path R36 is a transmission path of the response packet of which transmission source port number=sp36. If the notification packet including the inquired path information is acquired from the management device 80, the learning unit 52f specifies the transmission path for each response packet and updates the learning table 53 through the same process as the process described with reference to FIG. 21. For example, since the transmission path of the response packet of which transmission source port number=sp35 and any one of the response packets do not overlap each other, the learning unit 52*f* adds the response packet of which transmission source port number=sp35 to the distribution list, and adds the path R35 to the path list. Meanwhile, the transmission paths of the response packet of which transmission source port number=sp36 and the response packet of which transmission source port number=sp31 overlap each other, the information of the response packet of which transmission source port number=sp31 is already recorded in the learning table 53. Thus, the learning unit 52*f* does not add the transmission path of the response packet of which transmission source port number=sp36 and the transmission source port number to the learning table 53. The learning unit 52*f* updates the next value of the transmission source port number capable of being used for the response packet addressed to the communication device 50*a* with sp37. As mentioned above, the learning table 53-1 (FIG. 21) is updated as illustrated in a learning table 53-2 (FIG. 22) through the process of the learning unit 52*f*.

Although as many response packets as the response number are transmitted from the communication device 50 that transmits the response packets in the process described with reference to FIGS. 21 and 22, the minimum response number may be set in addition to the response number in the second embodiment. The minimum response number is the number of response packets to be transmitted capable of being applied when the response is performed using only the response packets of which the transmission over different paths is checked, and is a value smaller than the response number. Thus, in a case where the number of transmission source port numbers included in the distribution list exceeds the minimum response number, as many response packets as the minimum response number are generated by using the transmission source port numbers included in the distribution list. In a case where as many response packets of which the transmission over different paths is checked as the minimum response number are not transmitted, since there is a possibility that the transmission of the response packets in the overlapped paths will be performed, as many response packets as the response number are transmitted.

Figure 23B:
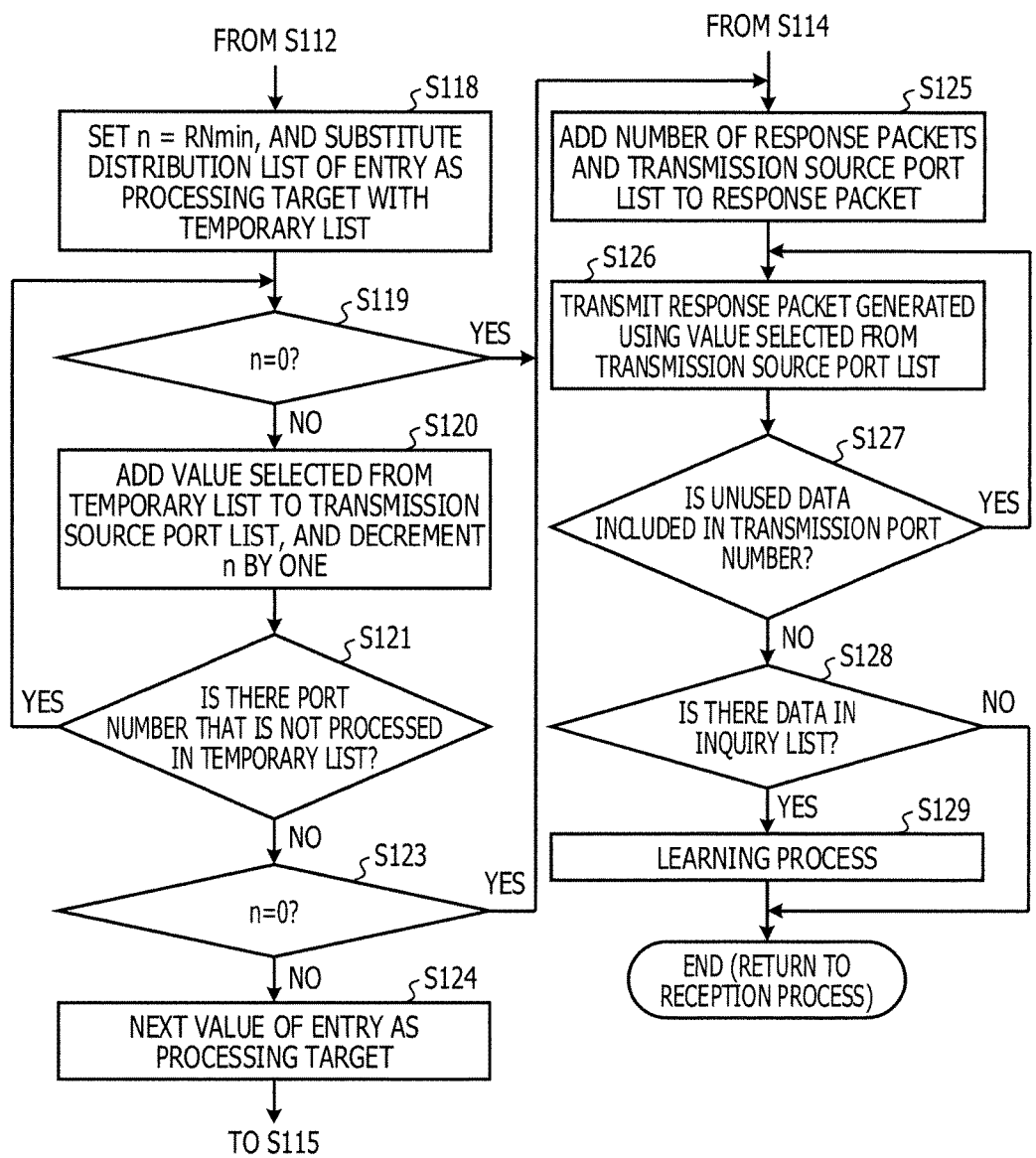

FIGS. 23A and 23B are a flowchart for describing an example of the generation method of the response packet. FIGS. 23A and 23B illustrate an example of the process performed in a case where the minimum response number (RNmin) is set in addition to the response number.

The duplication unit 54 initializes the transmission source port list and the inquiry list (step S111). The duplication unit 54 determines whether or not there is the entry corresponding to the destination of the response packet in the learning table 53 (step S112). In a case where there is no entry corresponding to the destination of the response packet, the duplication unit 54 sets the variable n to the response number, and sets the variable p to the transmission source port number (SP) of the response packet base (step S113). The duplication unit 54 determines whether or not the variable n is 0 (step S114). In a case where the variable n is not 0, the determination of the transmission source port number to be used for generating as many response packets as the response number is not ended (No in step S114). Here, the duplication unit 54 adds the header information of which the transmission source port number is set to be the variable p to the inquiry list (step S115). The duplication unit 54 adds the variable p to the transmission source port list (step S116). The duplication unit 54 increments the variable p by one, and decrements the variable n by one (step S117). After step S117, the process returns to step S114.

If it is determined that the variable n is 0, the duplication unit 54 adds the number of generated response packets and the transmission source port list to the UDP payload of the response packet (step S125). The duplication unit 54 transmits the response packet having the value selected from the transmission source port list as the transmission source port number by using the response packet base and the UDP payload set in step S125 (step S126). The duplication unit 54 determines whether or not unused data is included in the transmission port number list (step S127). In a case where the unused data is included in the transmission port number list, the duplication unit 54 returns to the process of step S126 (Yes in step S127). In a case where the unused data is not included in the transmission port number list, the duplication unit 54 determines whether or not data is included in the inquiry list (No in step S127, step S128). In a case where the data is not included in the inquiry list, the duplication unit 54 ends the process (No in step S128). In a case where the data is included in the inquiry list, the duplication unit 54 performs the learning process, and ends the process (Yes in step S128, step S129).

Subsequently, a case where there is an entry corresponding to the destination of the response packet in the learning table 53 will be described (Yes in step S112). In this case, the duplication unit 54 sets the variable n to the minimum response number (RNmin), and substitutes the distribution list of entries as the processing targets with a temporary list (step S118). The duplication unit 54 determines whether or not the variable n is 0 (step S119).

In a case where the variable n is not 0, the determination of the transmission source port numbers to be used for generating as many response packets as the minimum response number is not ended (No in step S119). Here, the duplication unit 54 adds the value selected from the temporary list to the transmission source port list, and decrements the variable n by one (step S120). The duplication unit 54 determines whether or not there are the port numbers that are not processed in the temporary list (step S121). In a case where there are the port numbers that are not processed in the temporary list, the duplication unit 54 repeats the processes subsequent to step S119 (Yes in step S121). Meanwhile, in a case where there are no port numbers that are not processed in the temporary list, the duplication unit 54 determines whether or not the variable n is 0 (No in step S121, step S123). In a case where the variable n is not 0, the determination of the transmission source port numbers to be used for generating as many response packets as the minimum response number is not ended (No in step S123). However, in this case, all the values of the temporary list are used. That is, the value included in the transmission source port list is smaller than the minimum response number. Since the number of header information items of the response packets of which the transmission over different paths is checked is less than the minimum response number, the duplication unit 54 determines to generate as many response packets as the response number. Thus, the duplication unit 54 sets the variable n to be a value acquired by subtracting the total number (RNmin−n) of transmission source port numbers determined so far from the response number, and sets the variable p to be the next value of the entry as the processing target of the learning table 53 (step S124). In step S124, if the response number is RN, the value substituted with the variable n may be expressed as RN−

(RNmin−n). After step S124, the duplication unit 54 performs the processes subsequent to step S115. Meanwhile, in a case where it is determined that the variable n is 0 in step S119 or step S123, the duplication unit 54 performs the processes subsequent to step S125.

Figure 24:
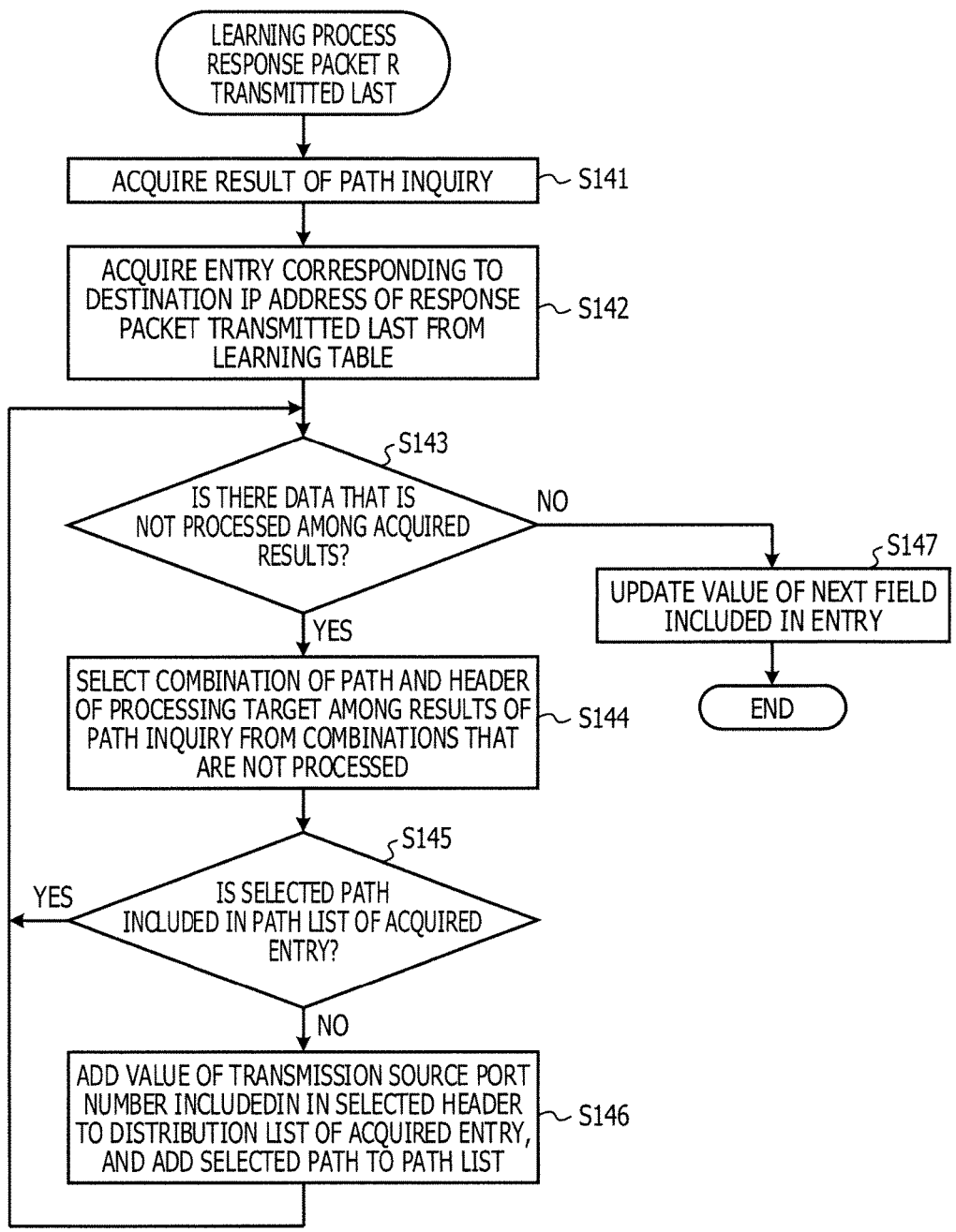
FIG. 24 is a flowchart for describing an example of a process performed when a distribution state of the paths is learned.

FIG. 24 is a flowchart for describing an example of the process performed when the distribution state of the paths is learned. The learning unit 52 acquires the result of the inquiry about the path for the management device 80 (step S141). The learning unit 52 acquires the information of the entry corresponding to the destination IP address of the response packet transmitted last from the learning table 53 (step S142). The learning unit 52 determines whether or not there are the data items that are not processed among the acquired results (step S143). The learning unit 52 selects the combination of the header of the processing target with the path from the combinations that are not processed among the result results about the path (step S144). The learning unit 52 determines whether or not the selected path is included in the path list of the entry acquired in step S143 (step S145). In a case where the selected path is included in the path list of the entry, the learning unit 52 determines that the information of the path overlapping the transmission path of the response packet generated using any value of the distribution list of the entry is the processing target (Yes in step S145). Thus, the learning unit 52 returns to step S143 without recording the information of the selected path in the learning table 53.

In a case where the selected path is not included in the path list of the entry, the learning unit 52 determines that the information of the path which does not overlap the transmission path of the response packet generated using the value included in the distribution list of the entry is selected as the processing target (No in step S145). Here, the learning unit 52 adds the transmission source port number included in the header selected in step S144 to the distribution list of the selected entry, adds the selected path to the pat list, and returns to step S143 (step S146).

If the process on all the data items included in the inquiry result about the path is ended, the learning unit 52 updates the value of the next field of the entry as the processing target in the learning table 53 (No in step S143, step S147).

As stated above, the communication device 50 according to the second embodiment can generate the list of the transmission source port numbers capable of being used for generating the response packets of which the transmission paths do not overlap each other by using the analysis result of the transmission paths of the response packets transmitted from the communication device 50. Thus, since a predetermined number of response packets are able to be transmitted to the transmission source of the check packet such that the paths do not overlap each other, it is possible to efficiently determine whether or not the failure occurs in the physical network.

<Third Embodiment>

Figure 25:
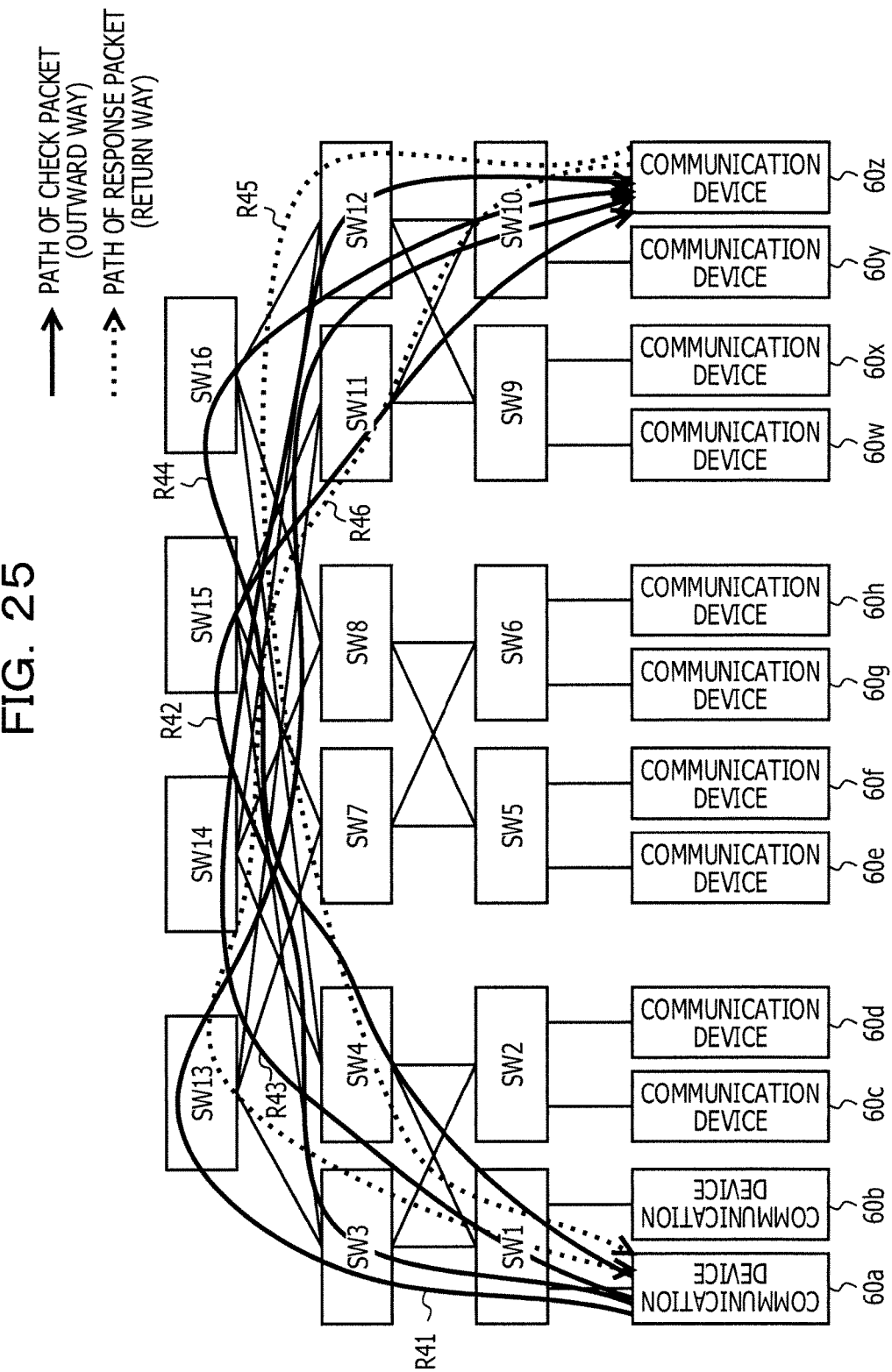
FIG. 25 is a diagram for describing an example of communication performed in a third embodiment.

FIG. 25 is a diagram for describing an example of communication performed in a third embodiment. In the third embodiment, the transmission source of the check packet transmits the plurality of check packets in order to determine the states of the plurality of paths capable of arriving at the destination of the check packet. In the network illustrated in FIG. 25, a plurality of communication devices 60 (60a to 60h, 60w to 60z) is connected through the switches 10 (SW1 to SW16). In such a network, it is assumed that the communication device 60a transmits the plurality of check packets in order to determine the state of the communication path with the communication device 60z. As illustrated in FIG. 25, it is assumed that four check packets addressed to the communication device 60z from the communication device 60a arrive at the communication device 60z through a path R41, a path R42, a path R43, and a path R44, respectively.

As mentioned above, in a case where the plurality of check packets is transmitted, if the communication device 60x that receives the check packets performs the same process as that in the first and second embodiments, there is a concern that the number of response packets will be increased. Here, in the third embodiment, a case where responses to the plurality of check packets are grouped as one response packet will be described. In the third embodiment, the communication device 60z transmits the plurality of response packets including the responses to the plurality of check packets such that the loss of the response packet is recognized by the communication device 60a as the transmission side.

Figure 26:
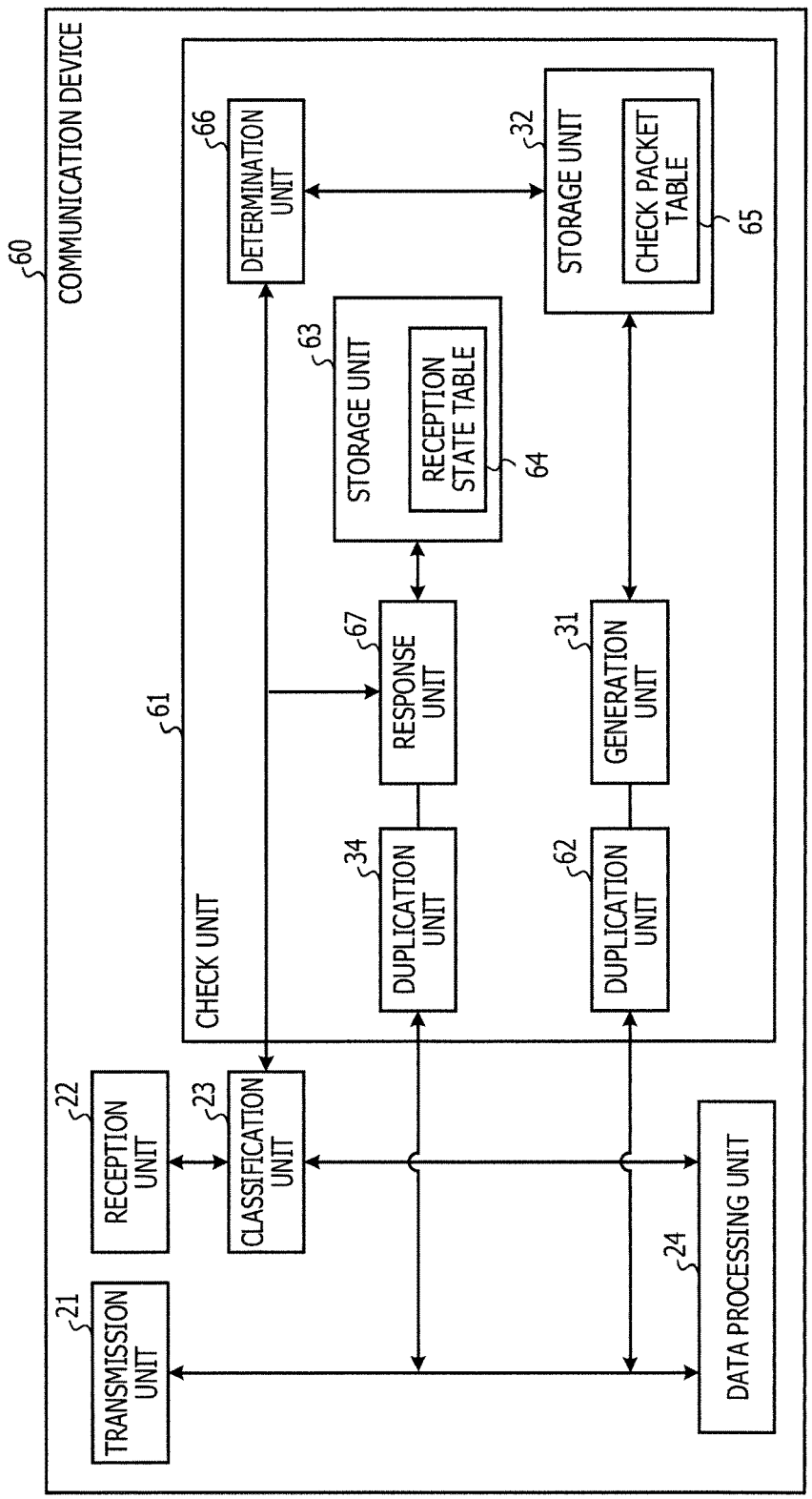
FIG. 26 is a diagram for describing an example of a configuration of a communication device according to the third embodiment.

FIG. 26 is a diagram for describing an example of a configuration of the communication device 60 according to the third embodiment. The communication device 60 includes a transmission unit 21, a reception unit 22, a classification unit 23, a data processing unit 24, and a check unit 61. The check unit 61 includes a duplication unit 62, a storage unit 63, a determination unit 66, and a response unit 67, and also includes a generation unit 31, a storage unit 32, and a duplication unit 34. The storage unit 32 stores a check packet table 65.

The duplication unit 62 duplicates the check packet generated by the generation unit 31, and changes the transmission source port number included in the duplicated check packet. In this case, the duplication unit 62 sets the transmission source port numbers such that the transmission source port numbers are different from each other between the plurality of check packets. The storage unit 63 retains a reception state table 64. The reception state table 64 records the reception state of the check packet. The response unit 67 records the reception state of the check packet in the reception state table 64, and generates the base of the response packet if the condition in which the response packet is transmitted is satisfied. In the third embodiment, the storage unit 32 retains the check packet table 65 instead of the check packet table 36. The check packet table 65 includes arrival information of the check packet in addition to the information included in the check packet table 36. The check packet table 65 is appropriately updated by the generation unit 31, the duplication unit 62, and the determination unit 66. The determination unit 66 determines whether or not the failure occurs in the transmission path of the check packet or the response packet by using the reception state of the response packet and the arrival state of the check packet.

The hardware configuration of the communication device 60 is also as illustrated in FIG. 3. A processor that realizes the communication device 60 is operated as the classification unit 23, the data processing unit 24, the generation unit 31, the response unit 67, the determination unit 66, the duplication unit 34, and the duplication unit 62. The storage unit 63 is appropriately realized by the memory 102.

Hereinafter, the third embodiment will be described while distinguishing between a process when the check packet is transmitted, a process performed in the communication device 60 that receives the check packet, and a process when the response packet is received.

(A) Process when Check Packet is Transmitted

Figure 27:
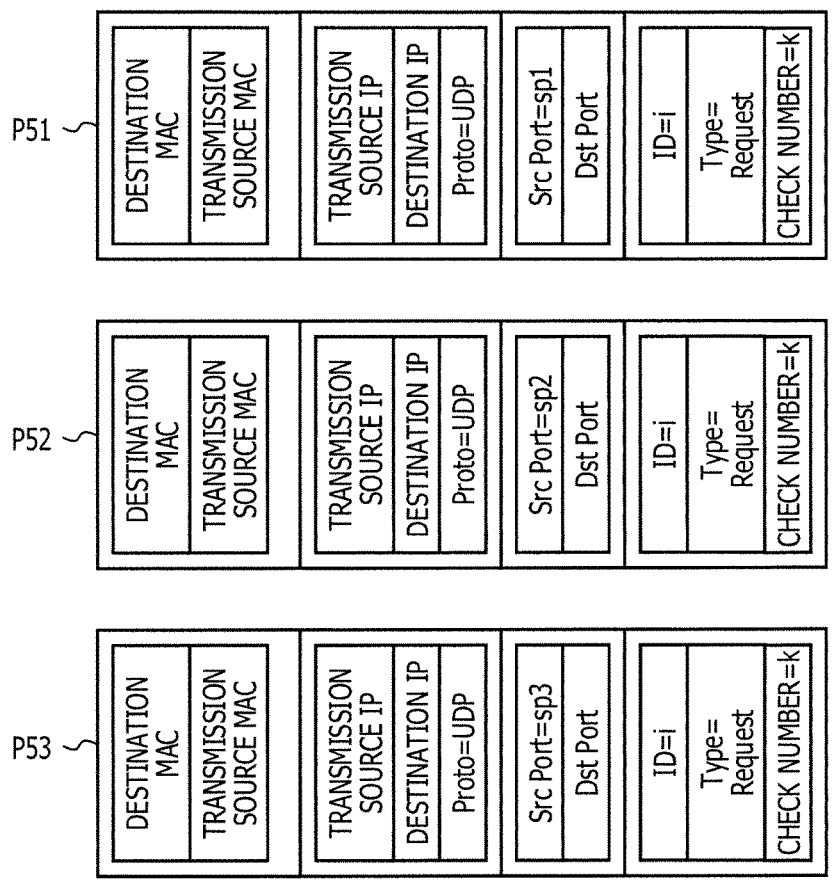
FIG. 27 is a diagram for describing an example of the check packet.

FIG. 27 is a diagram for describing an example of the check packet used in the third embodiment. The check packet used in the third embodiment includes an Ether header, an IP header, a UDP header, and a UDP payload. Information elements included in the Ether header, the IP header, and the UDP header are same as those of the check packet described with reference to FIG. 5. The UDP payload includes an ID field, a type field, and a check number field. The check number is the total number of check packet of which the combination of the value of the ID field is the same as that of the communication device 60 as the destination. The ID field and the type field are the same as those of the check packet described with reference to FIG. 5.

Packets P51 to P53 illustrated in FIG. 27 are examples of the check packet of which the combination of the value of the ID field is the same as that of the communication device 60 as the destination. In the third embodiment, the transmission source port numbers are set to be different from each other between the plurality of check packets of which the combination of the value of the ID field is the same as that of the communication device 60 as the destination. For example, the transmission source port number included in the check packet P51 is sp1, the transmission source port number included in the check packet P52 is sp2, and the transmission source port number included in the check packet P53 is sp3.

FIG. 28 is a diagram for describing an example of the check packet table 65. The check packet table 65 includes check packet information, response packet information, and a timer field. The check packet information is information of the check packet transmitted by the communication device 60 itself, and includes a destination IP address field, an ID field, a check number field, a check list field, an arrival check number field, and an arrival list field. An IP address of the destination of the check packet is stored in the destination IP address field, and an ID of the check packet is stored in the ID field. The total number of check packets of which the destination IP address and the ID value are the same is recorded in the check number field. A list of transmission source port numbers used by the check packets having the combination of the destination IP address and the ID value of the entry is stored in the check list field.

The arrival check number is the total number of check packets arriving at the communication device 60 as the destination within a predetermined period of time, and a list of transmission source port addresses included in the check packets arriving at the communication device 60 as the destination within a predetermined period of time is stored in the arrival list field. Both the arrival check number and the arrival list are information items acquired from the response packets, and the acquisition method of these information items will be described.

The response packet information and the timer field are the same as the response packet information and the timer field included in the check packet table 36 described with reference to FIG. 5.

Figure 29:
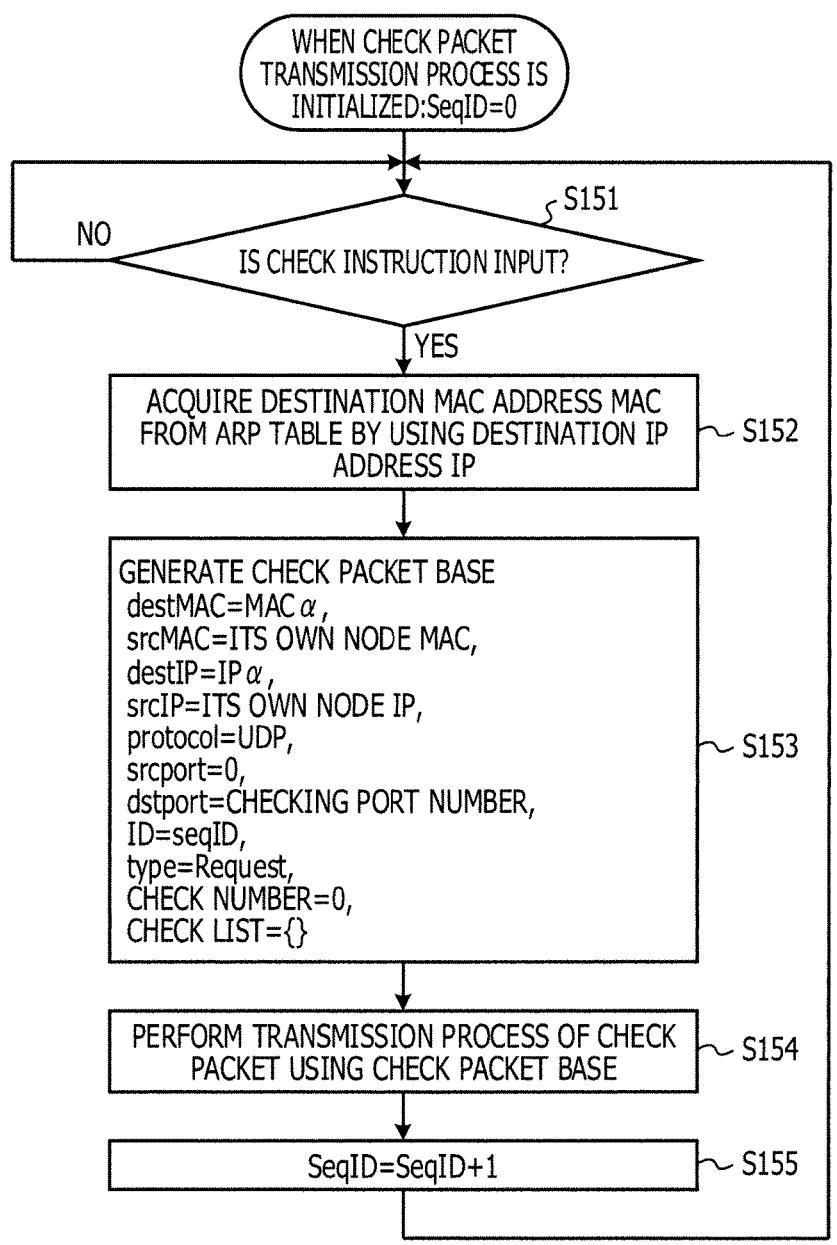
FIG. 29 is a flowchart for describing an example of a transmission process of the check packet.

FIG. 29 is a flowchart for describing an example of a transmission process of the check packet. In FIG. 29, SeqID is a variable representing a value used as the ID of the check packet, and SeqID=0 is set when the communication device 60 is initialized.

The generation unit 31 waits until a check instruction is input (No in step S151). If the input of the check instruction is detected, the generation unit 31 specifies a MAC address (MACα) of the communication device 60 as the destination from an ARP table and a destination IP address (IPα) included in the check instruction (Yes in step S151, step S152).

The generation unit 31 generates the check packet base to be used for generating the plurality of check packets (step S153). In the check packet base, the destination MAC address is set to be the MAC address (MACα) of the communication device 60 as the destination acquired in step S152, and the destination IP address is set to be the IP address (IPα) designated by the generation instruction. The transmission source MAC address and the transmission source IP address of the check packet are set to be values assigned to the communication device 20 as the transmission source of the check packet, and the protocol is designated as being the UDP. The transmission source port number included in the check packet base is set to be an invalid value such as 0. The destination port number is set to be the checking port number, and the ID is set to be the value of the SeqID. Request is set in the type field included in the check packet, and the check number and the check list are initialized.

If the check packet base is generated, the duplication unit 62 performs the generation of the check packet and the transmission process of the check packet by using the check packet base (step S154). Thereafter, the generation unit 31 increments the SeqID by one, and returns to step S151.

Figure 30:
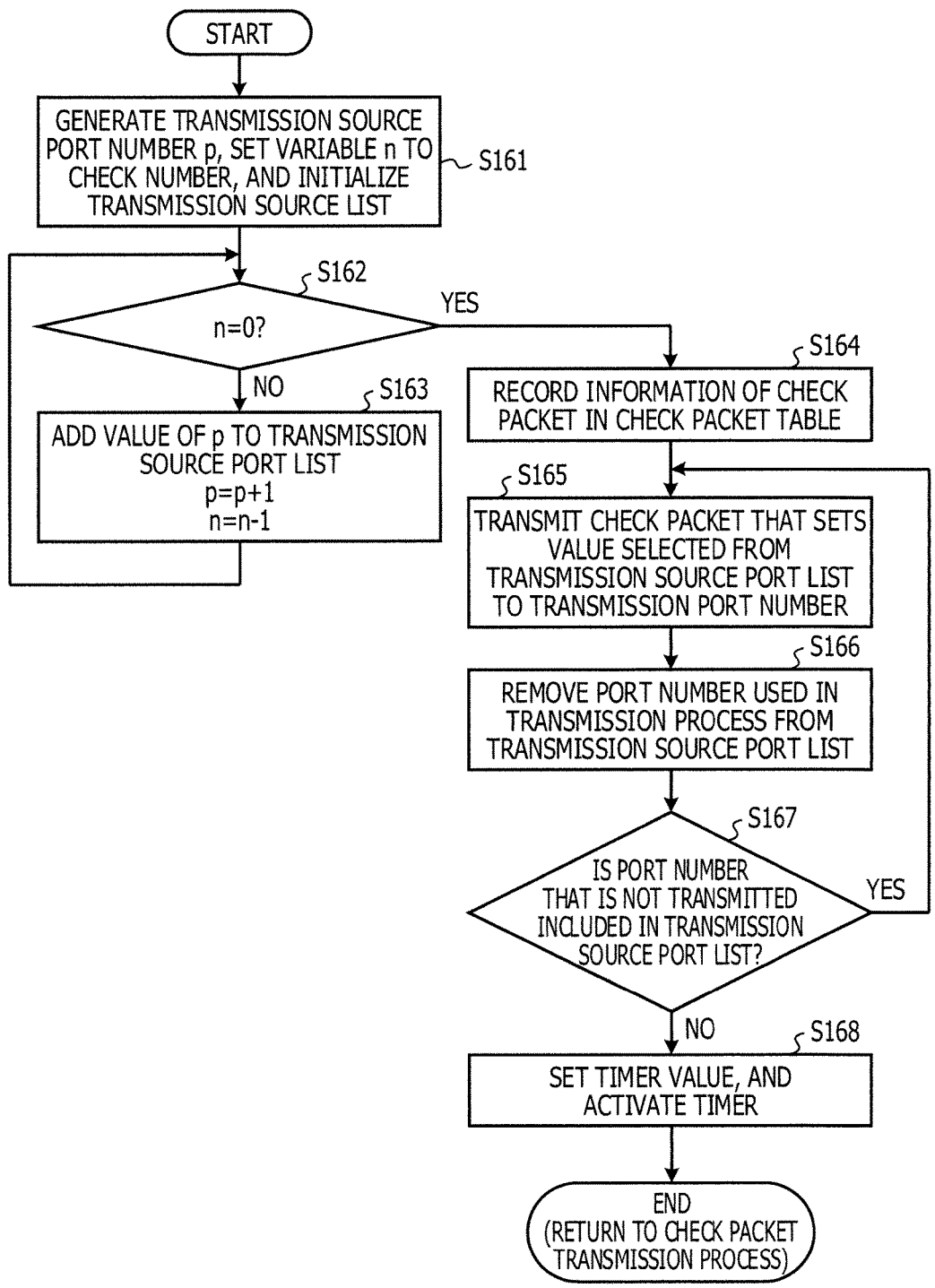
FIG. 30 is a flowchart for describing an example of a duplication process of the check packet.

FIG. 30 is a flowchart for describing an example of a duplication process of the check packet. FIG. 30 illustrates an example of the details of the process performed in step S154 of FIG. 29. In FIG. 30, the transmission source port list is used when the list of values to be used for the transmission source port numbers is generated. The transmission source port list is a list retained in the duplication unit 62.

The duplication unit 62 generates a transmission source port number p, and sets the variable n to the check number. The transmission source port list is initialized (step S161). The duplication unit 62 determines whether or not the variable n is 0 (step S162). In a case where the variable n is not 0, the duplication unit 62 determines that as many transmission source port numbers as the number of check packets to be transmitted are not generated (No in step S162). Here, the duplication unit 62 adds the generated transmission source port number p to the transmission source port list. The duplication unit increments p by one, and decrements the variable n by one (step S163). After the process of step S163, the processes subsequent to step S162 are performed.

Meanwhile, in a case where the variable n is 0, the duplication unit 62 determines that as many transmission source port numbers as the number of check packets to be transmitted are generated (Yes in step S162). The duplication unit 62 records the information of the check packet in the check packet table 65 by using the check packet base and the transmission source port list (step S164). In step S164, the contents of the transmission source port list are recorded in the check list included in the check packet table 65. For example, it is assumed that the duplication unit 62*a* of the communication device 60 generates sp1, sp2, sp3, and sp4 as the transmission source port numbers for the check packet addressed to the communication device 60*z*. In so doing, the duplication unit 62*a* sets the destination IP address of the check packet table 65*a* to be the IP address (IP60*z*) of the communication device 60*z*, sets the check number to be 4, and sets the check list to be {sp1, sp2, sp3, sp4}. The duplication unit 62*a* records the value of the ID in the check packet table 65*a*. Thus, if the information of the check packet transmitted to the communication device 60*z* from the communication device 60*a* is recorded, the information of the first entry of FIG. 28 is recorded.

The duplication unit 62 generates the check packet having the value selected from the transmission source port list as the transmission source port number, and transmits the check packet through the transmission unit 21 (step S165). The duplication unit 62 removes the port number used in the transmission process from the transmission source port list (step S166). The duplication unit 62 determines whether or not the port numbers that are not transmitted are included in the transmission source port list (step S167). In a case where the port numbers of the packets that are not transmitted are included in the transmission source port list, the duplication unit 62 repeats the processes subsequent to step S165 (Yes in step S167). In a case where the port numbers that are not transmitted are not included in the transmission source port list, the duplication unit 62 sets the timer value in the timer field of the check packet table 65, and activates the timer (No in step S167, step S168).

(B) Process Performed in Communication Device 60 that Receives Check Packet

It is assumed that the reception unit 22z of the communication device 60z receives the check packet transmitted from the communication device 60a. The reception unit 22z outputs the received check packet to the classification unit 23z. Since the destination port number included in the check packet is the checking port number, the classification unit 23z outputs the check packet P31 to the response unit 67z and the determination unit 66z. The response unit 67z records the reception state of the check packet in the reception state table 64z.

FIG. 31 is a diagram for describing an example of the reception state table 64. The reception state table 64 is used for recording the reception state of the check packet. The reception state table 64 includes a transmission source IP address field, an ID field, a header information field, a check number field, a reception check number field, a reception list field, and a timer field. The response unit 67z records the transmission source IP address of the check packet in the transmission source IP address field, and records the ID included in the check packet in the ID field. The response unit 67z records the header information of the check packet in the header information field, and records the check number included in the UDP payload of the check packet in the check number field. Whenever the check packet is input, the response unit 67z increments the reception check number included in the entry including the combination of the ID and the transmission source IP address of the input check packet by one, and adds the transmission source port number included in the input check packet to the reception list.

For example, it is assumed that the check packets of which transmission source port number=sp1 and sp2 are received by the communication device 60z among four check packets transmitted to the communication device 60z from the communication device 60a. In this case, information of the first entry of the reception state table 64 illustrated in FIG. 31 is recorded through the process of the response unit 67z. It is assumed that the IP address assigned to the communication device 60a is IP60a. As illustrated in FIG. 31, the reception results of the plurality of check packets transmitted from the communication device 60 are grouped and managed for each combination of the transmission source IP address and the ID in the reception state table 64.

Figure 32:
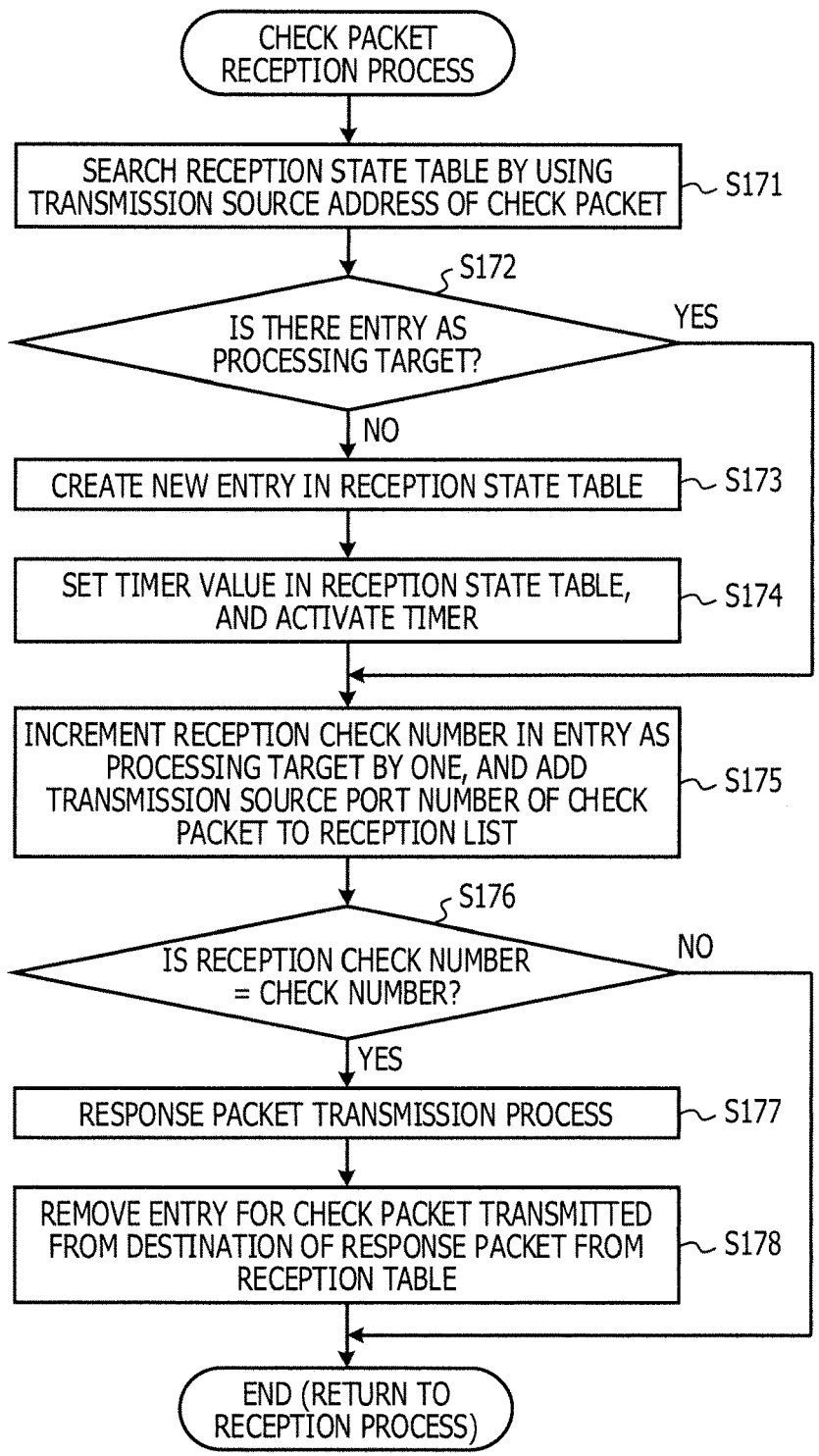
FIG. 32 is a flowchart for describing an example of a reception process of the check packet.

FIG. 32 is a flowchart for describing an example of a reception process of the check packet. If the check packet is input, the response unit 67 searches the reception state table 64 by using the transmission source address and the ID of the check packet, and determines whether or not there is an entry as the processing target including the transmission source address and the ID of the check packet (step S171, S172). In a case where there is no entry as the processing target, the response unit 67 generates a new entry in the reception state table 64 (No in step S172, step S173). The response unit 67 records the information items acquired from the check packet in the transmission source IP field, the ID field, and the check number field of the generated entry, and stores the header of the check packet in the header information field. The response unit 67 sets the reception check number of the newly generated entry to be 0, and initializes the reception list. Thereafter, the timer value is set in the newly generated entry, and the timer is activated (step S174).

The response unit 67 increments the reception check number by one in the entry as the processing target, and adds the transmission source port number of the check packet to the reception list (step S175). The response unit 67 determines whether or not the reception check number and the check number are the same (step S176). In a case where the reception check number and the check number are not the same, since there are the check packets that are not received, the response unit 67 ends the process (No in step S176).

Meanwhile, if the reception check number and the check number are the same, the response unit 67 determines that all the check packets specified by the combinations of the transmission sources and the IDs of the check packets being processed are received (Yes in step S176). Here, the response unit 67 generates the response packet bases, and the duplication unit 34 performs the transmission process of the response packets (step S177). Thereafter, the response unit 67 removes the entry for the check packet transmitted from the destination of the response packet from the reception state table 64 (step S178).

In a case where the entry as the processing target is searched for in step S172, the processes subsequent to step S175 are also performed.

It has been described that the response packets are transmitted after all the check packets of which the combinations of the transmission sources and the IDs of the check packets are the same are received while referring to steps S176 to S178 of FIG. 32. However, even in a case where all the check packets are not received within a predetermined period of time, if the timeout occurs, the response packets are transmitted. Hereinafter, the timer process will be described.

Figure 33:
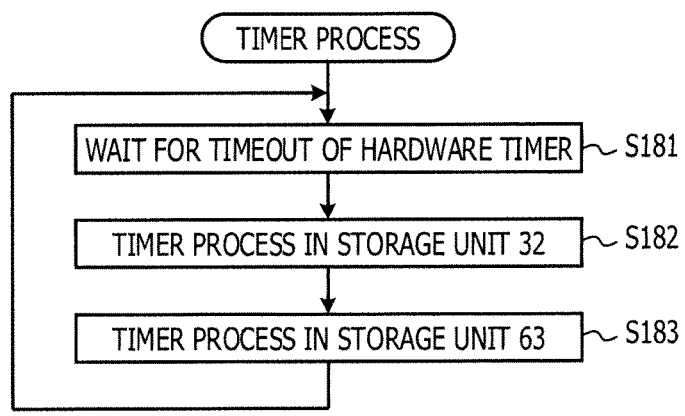
FIG. 33 is a flowchart for describing an example of the timer process.

FIG. 33 is a flowchart for describing an example of the timer process. FIG. 33 is an example, and the order of steps S182 and S183 may be changed to each other depending on the implementation of the components. If the timeout of the hardware timer occurs, the timer process in the storage unit 32 is performed (steps S181 and S182). The value of the timer in the check packet table 65 becomes small through the timer process in the storage unit 32. The check packet table 65 is a table used when the communication device itself transmits the check packet. Accordingly, the process in step S182 is the same as the process described with reference to steps S52 to S58 of FIG. 15. Subsequently, the timer process in the storage unit 63 is performed (step S183). The value of the timer in the reception state table 64 becomes small through the timer process in the storage unit 63. The reception state table 64 is a table used when the check packet transmitted from another communication device 60 is received. The details of the process in step S183 will be described with reference to FIG. 34.

Figure 34:
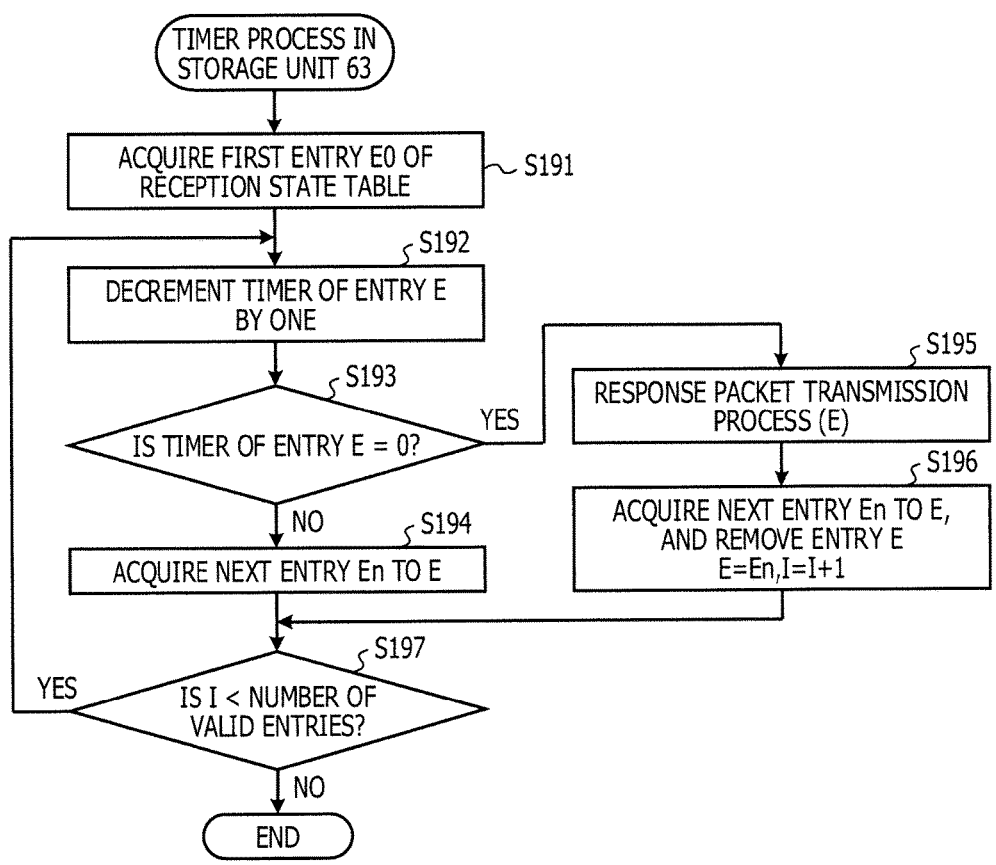
FIG. 34 is a flowchart for describing an example of the timer process.

FIG. 34 is a flowchart for describing an example of the timer process. The response unit 67 acquires the first entry E0 of the reception state table 64, substitutes E with E0, and sets the variable I to be 0 (step S191). The response unit 67 decrements the timer of the entry E by one, and determines whether or not the timer of the entry E is 0 (steps S192 and S193).

In step S193, in a case where the timer of the entry E is not 0, the response unit 67 acquires the next entry En to E from the reception state table 64, and substitutes E with En. The response unit 67 increments the variable I by one (No in step S193, step S194). The response unit 67 determines whether or not the variable I is less than the number of valid entries (step S197). In a case where the variable I is less than the number of valid entries, the processes subsequent to step S192 are repeated (Yes in step S197). Meanwhile, in a case where the variable I is equal to or greater than the number of valid entries, the response unit 67 ends the process (No in step S197).

In a case where the timer of the entry E is 0 in step S193, the response unit 67 and the duplication unit 34 perform the transmission process of the response packets addressed to the transmission source IP addresses included in the entry E (step S195). The details of the process performed in step S195 will be described. Thereafter, the response unit 67 acquires the next entry En to E, and removes the entry E. The response unit 67 substitutes E with En, and increments the variable I by one (step S196). Thereafter, the processes subsequent to step S197 are performed.

Figure 35:
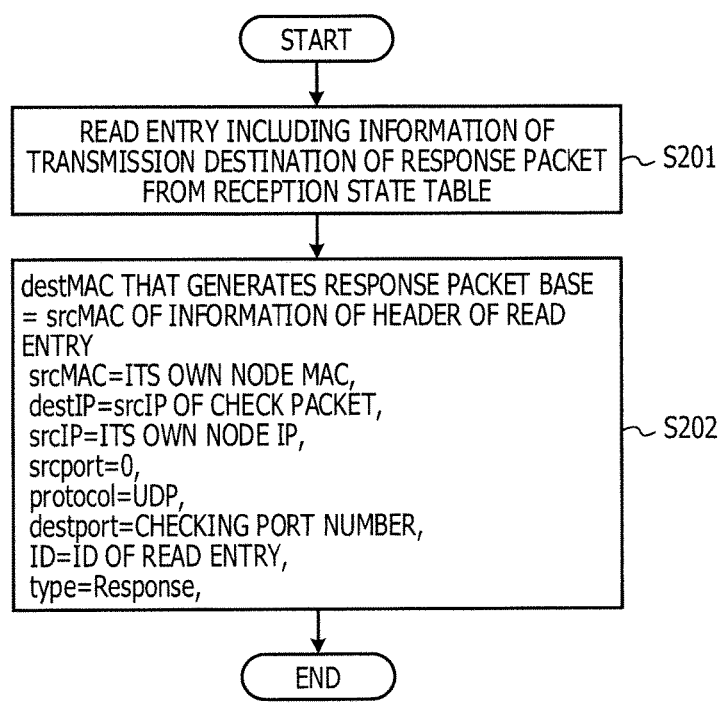
FIG. 35 is a flowchart for describing an example of a generation process of the base of the response packet.

FIG. 35 is a flowchart for describing an example of the generation process of the base of the response packet. The response unit 67 reads the entry including the information of the transmission destination of the response packet from the reception state table 64 (step S201). The entry including the information of the transmission destination of the response packet is an entry of the check packets of which the reception of all the check packets of which the combinations of the transmission sources and the IDs are the same is checked or an timeout entry as illustrated in step S195 of FIG. 34. The response unit 67 generates the response packet base by using the information of the read entry (step S202). In the response packet base, the transmission source MAC address included in the header information included in the read entry is used as the destination MAC address, and the transmission source IP address of the check packet is used as the destination IP address. A MAC address of its own node is set to the transmission source MAC address, and an IP address assigned to its own node is used as the transmission source IP address. The transmission source port number is set to be 0, and the destination port number is set to be checking port number. The protocol is set to be UDP, and the ID is set to be the ID of the check packet. The setting type is set to be Response. The total number of response packets is set to be 0. The reception check number and the reception list included in the read entry are also included in the response packet base. An example of the generated response packet base is illustrated in P61 of FIG. 36.

Figure 36:
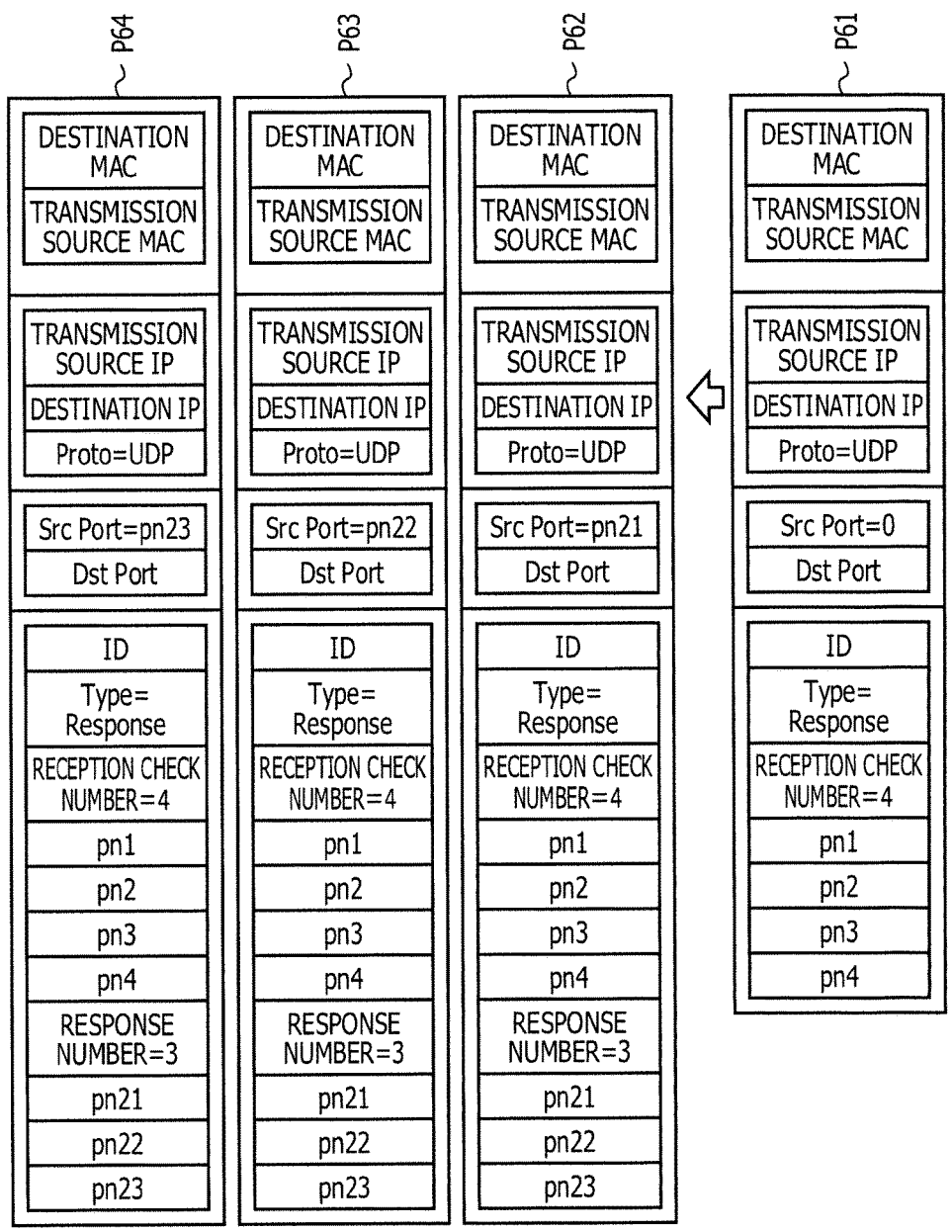
FIG. 36 is a diagram for describing an example of the response packet.

FIG. 36 is a diagram for describing an example of the response packet base and the response packet. The response packet base illustrated in P61 is an example of the response packet base generated by the response unit 67z in a case where the communication device 60z receives four check packets transmitted from the communication device 60a. In P61, reception check number=4, and the transmission source port numbers included in the received check packets are sp1, sp2, sp3, and sp4. The response unit 67z outputs the generated response packet base to the duplication unit 34.

As illustrated in P61, the reception state of the plurality of check packets is recorded in the response packet base. Thus, the information indicating the reception state included in the response packet is recorded in each of the response packets generated using the response packet bases. In other words, since the reception state of the plurality of check packets is included in the response packet used in the third embodiment, the communication device 60 groups the responses to the plurality of check packets as one response packet.

In the example of FIG. 36, it is assumed that the duplication unit 34z transmits to three response packets to the communication device 60a. The duplication unit 34z sets the transmission source port number of the response packet base P61 for each response packet, and adds the list of the transmission source port numbers in each response packet and the total number of response packets (the response number) to the UDP payload. Response packets P62 to P64 are generated through the process of the duplication unit 34z. The details of the process when the response packets are generated are the same as those of steps S32 to S38 described with reference to FIG. 12. The duplication unit 34z transmits the generated response packets P62 to P64 to the communication device 60a through the transmission unit 21z.

(C) Process when Response Packet is Received

An example of the process of the communication device 60 that receives the response packets will be described as an example of a case where the communication device 60a receives the response packets after the response packets P62 to P64 are transmitted to the communication device 60a from the communication device 60z.

Figure 37:
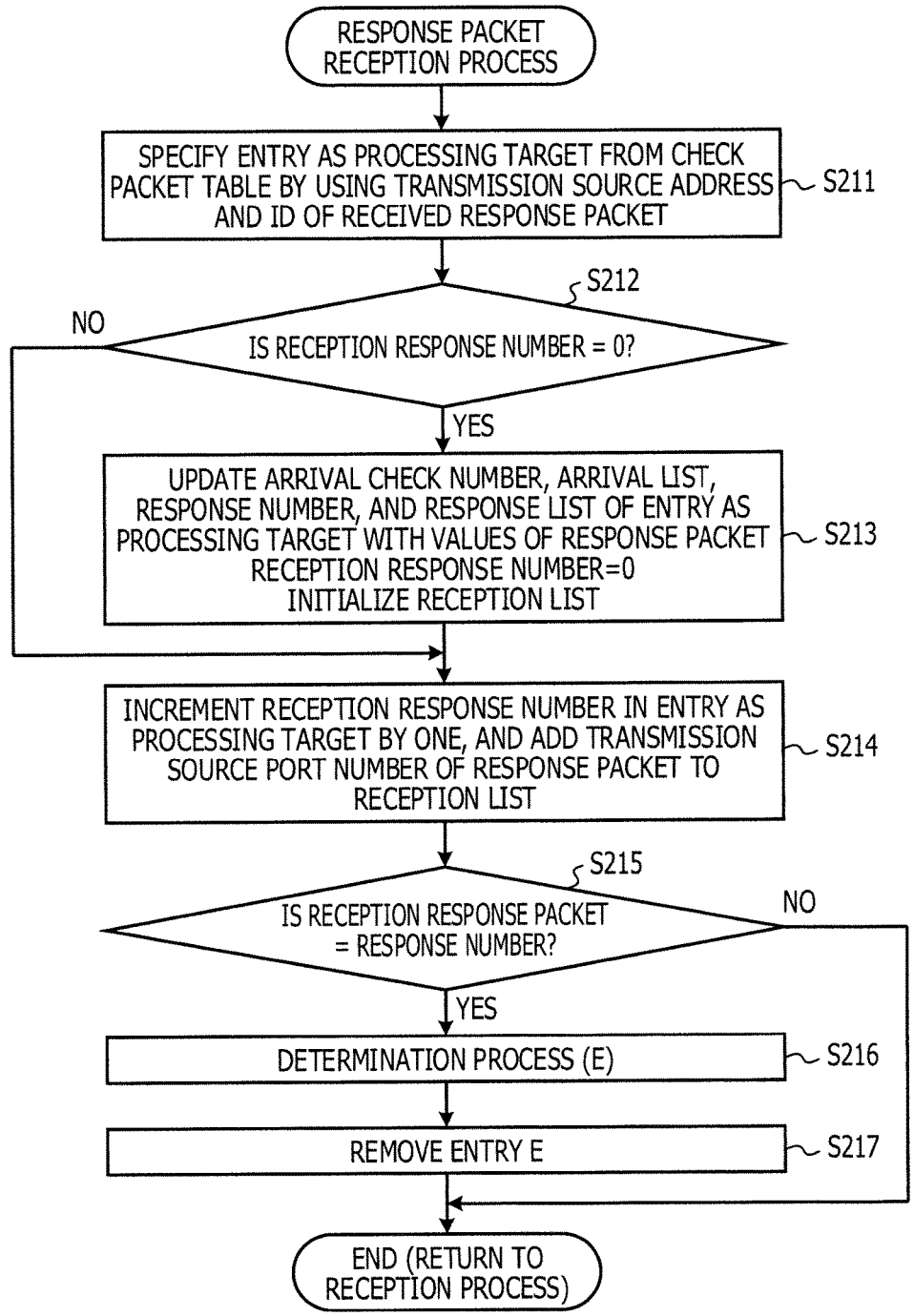
FIG. 37 is a flowchart for describing an example of a reception process of the response packet.

FIG. 37 is a flowchart for describing an example of the reception process of the response packet. The classification unit 23a outputs the response packets received by the reception unit 22a to the determination unit 66a and the response unit 67a. The determination unit 66a specifies the entry as the processing target from the check packet table 36 by using the ID and the transmission source IP address of the input response packet (step S211).

The determination unit 66a determines whether or not reception response number=0 is set in the entry as the processing target (step S212). The entry in which reception response number=0 is an entry that does not receive the response packet so far and is related to the check packet. Here, in a case where the entry of which reception response number=0 is the processing target, the determination unit 66a sets the arrival check number, the arrival list, the response number, and the response list included in the entry as the processing target to be the values in the response packet, and initializes the reception list (step S213). For example, it is assumed that the response packet input to the determination unit 66a is the response packet P63 (FIG. 36). In so doing, the determination unit 66a sets the entry as the processing target to enter the state including the following information items.

Destination IP address: IP60z (communication device 60z)
ID: 1
Check number: 4
Check list: {sp1, sp2, sp3, sp4}
Arrival check number: 4
Arrival list: {sp1, sp2, sp3, sp4}
Response number: 3
Response list: {pn21, pn22, pn23}

In a case where the reception response number in the entry as the processing target is equal to or greater than 1 and after the process of step S213 is performed, the determination unit 66a increments the reception response number in the entry as the processing target by one, and adds the transmission source port number included in the response packet to the reception list (step S214). For example, in a case where the response packet input to the determination unit 66a is the response packet P63 (FIG. 36), after the process of step S213 is performed, the determination unit 66a sets the reception response number to be 1, and adds the transmission source port number pn22 of the response packet P63 to the reception list.

Thereafter, the determination unit 66a determines whether or not the reception response number is the same as the response number (step S215). In a case where the reception response number is not the same as the response number, the determination unit 66a ends the process (No in step S215). In this case, if the response packet is newly received, the processes of FIG. 37 is repeated. Meanwhile, in a case where the reception response number is the same as the response number, the determination unit 66a determines that all the response packets are received, and performs the determination process using the arrival state of the check packet (Yes in step S215, step S216). Thereafter, the determination unit 66a removes the entry as the processing target from the check packet table 65 (step S217).

FIG. 38 is a diagram for describing an example of the check packet table 65. The first entry of the check packet table 65 represents the list of the transmission source port numbers of the check packets transmitted using ID=1 to the communication device 60z, the arrival information of the check packet, and the reception state of the response packet from the communication device 60z. Accordingly, in a case where the communication device 60a includes the check packet table 65 illustrated in FIG. 38, the determination unit 66a can determine that all the check packets transmitted to the communication device 60z arrive the communication device 60z. In other words, the determination unit 66a can determine that the failure does not occur in any one of the transmission paths of the check packets transmitted to the communication device 60z. If the timer times up or all the response packets are received, the determination unit 66a can perform the determination process on the transmission paths of the response packets.

The second entry of the check packet table 65 records the information of the check packet or the response packet transmitted using ID=5 to the communication device 60w (IP60w). The communication device 60a transmits the check packets of {sp11, sp12, sp13, sp14} to the communication device 60w. However, in the response packet received by the communication device 60w, arrival check number=3, and the check list is {sp11, sp12, sp14}. Accordingly, among the check packets transmitted from the communication device 60a, the check packet of which transmission source port number=sp13 does not arrive at the communication device 60w.

Figure 39A:
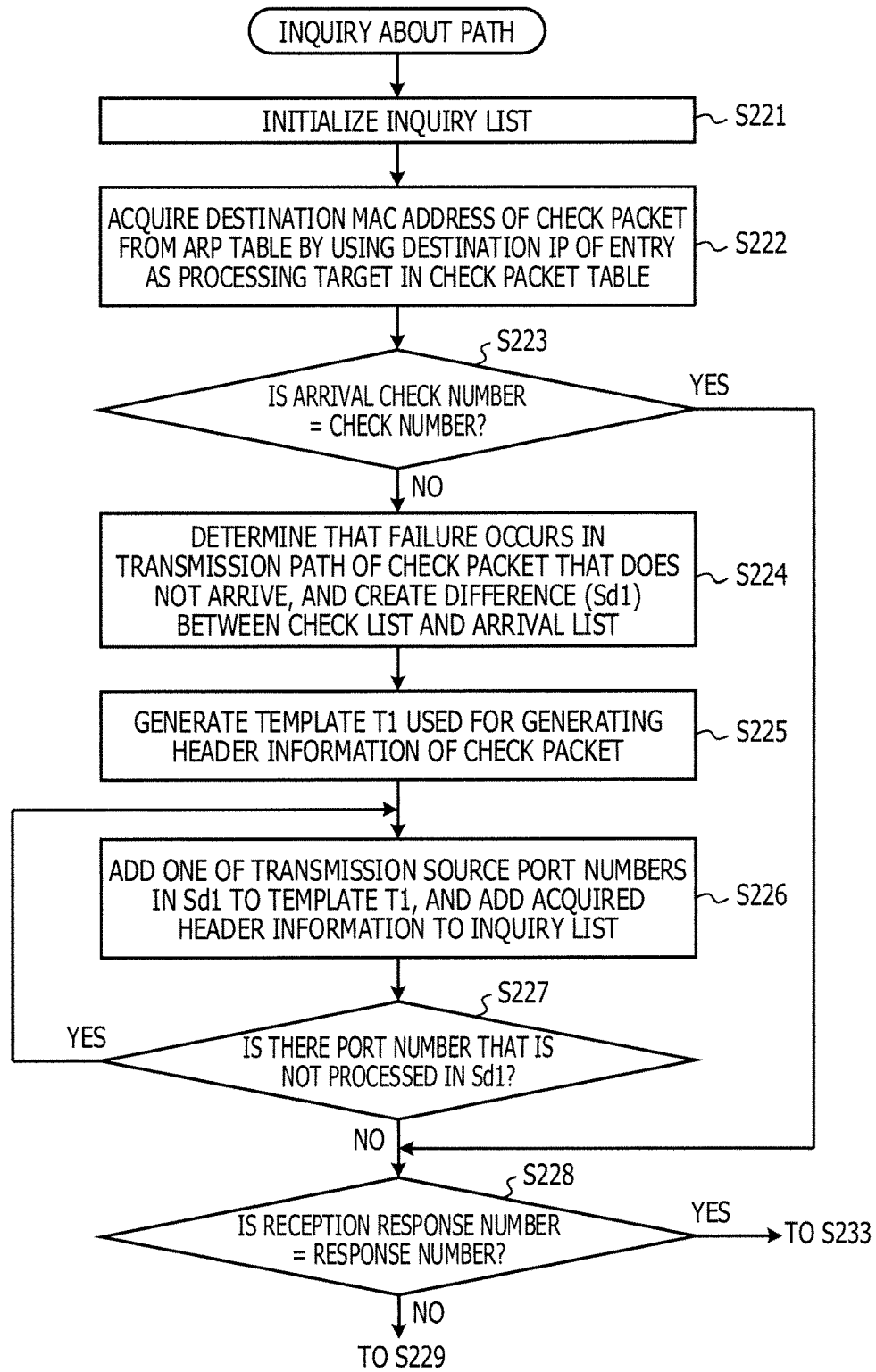
FIGS. 39A and 39B are a flowchart for describing an example of an inquiry process of the path.
Figure 39B:
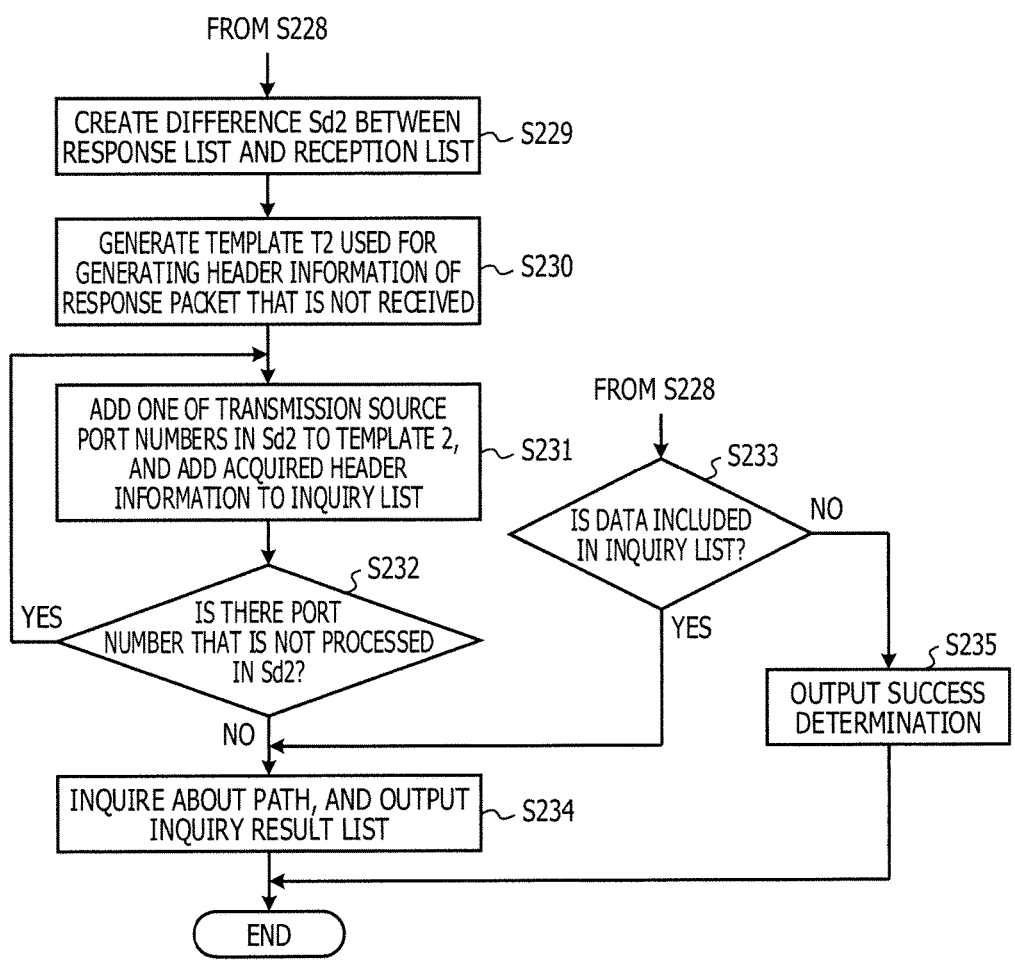

FIGS. 39A and 39B are a flowchart for describing an example of the inquiry process of the path. The process of FIGS. 39A and 39B are an example, and the processes may be changed depending on the implementation of the components. For example, before the determination using the arrival state of the check packet through steps S223 to S227 is performed, the determination using the reception state of the response packet illustrated in steps S228 to S232 may be performed. The determination process of FIGS. 39A and 39B are performed through step S216 of FIG. 37 or when the timer included in the entry of the check packet table 65 times up. A variation in the timer value included in the entry of the check packet table 65 is performed similarly to the process described using FIG. 15 or 33.

When the inquiry process of the path is started, the determination unit 66 initializes the inquiry list (step S221). The determination unit 66 acquires the destination MAC address of the check packet from the ARP table by using the destination IP address of the entry as the processing target included in the check packet table 65 (step S222). The determination unit 66 determines whether or not the arrival check number and the check number match each other on the entry as the processing target (step S223).

In a case where the arrival check number and the check number do not match each other, since some of the check packets does not arrive at the destination, the determination unit 66 determines that the failure occurs in the path specified using the header of the check packet that does not arrive (No in step S223). The determination unit 66 creates a difference (Sd1) between the check list and the arrival list, and generates a template T1 used for generating the header information of the check packet (steps S224 and S225). When the template T1 is generated, the determination unit 66 sets both the transmission source MAC address and the transmission source IP address to the addresses assigned to its own nodes. The determination unit 66 sets the destination MAC address included in the template T1 to the MAC address specified in step S222 and sets the destination IP address with the destination IP address included in the entry. The determination unit 66 sets the destination port number included in the template T1 to the checking port number. Thereafter, the determination unit 66 adds one of the transmission source port numbers of the difference Sd1 to the template T1 of the header information, and adds the acquired header information to the inquiry list (step S226). The determination unit 66 determines whether or not there are the port numbers that are not processed in the difference Sd1 (step S227). In a case where there are the port numbers that are not processed, the process returns to step S226 (Yes in step S227).

Hereinafter, the determination on the transmission paths of the response packets will be described. After the process of step S227 or if it is determined that the arrival check number and the check number match each other in step S223, the processes subsequent to step S228 are performed. Here, in a case where the arrival check number and the check number match each other, since all the check packets arrive at the destination, the determination unit 66 determines that the failure does not occur in the path specified using the header of the check packet (Yes in step S223).

The determination unit 66 determines whether or not the reception response number and response number match each other for the entry as the processing target (step S228). In a case where the reception response number and the response number do not match each other, since some of the response packets are not received, the determination unit 66 determines that the failure occurs in the path specified using the headers of the response packets that are not received (No in step S228). The determination unit 66 creates a difference (Sd2) between the response list and the reception list, and generates a template T2 used for generating the header information of the response packet (steps S229 and S230). When the template T2 is generated, the determination unit 66 sets both the destination MAC address and the destination IP address to the addresses assigned to its own nodes. The determination unit 66 sets the transmission source MAC address included in the template T2 to the MAC address specified in step S222, and sets the transmission source IP address to be the destination IP address included in the entry. The determination unit 66 sets the destination port number included in the template T2 to be the checking port number. Thereafter, the determination unit 66 adds one of the transmission source port numbers included in the difference Sd2 to the template T2 of the header information, and adds the acquired header information to the inquiry list (step S231). The determination unit 66 determines whether or not there are the port numbers that are not processed in the difference Sd2 (step S232). In a case where there are the port numbers that are not processed, the process returns to step S231 (Yes in step S232). Thereafter, the determination unit 66 inquires the management device 80 about the path specified by each header included in the inquiry list by using the inquiry list, and appropriately outputs the acquired result (No in step S232, step S234). The searching for the path in the management device 80 and the notifying the communication device 60 of the path are the same as those in the first embodiment.

In a case where the reception response number and the response number match each other for the entry as the processing target, the determination unit 66 determines whether or not the data is included in the inquiry list (Yes in step S228, step S233). In a case where the data is included in the inquiry list, the process of step S234 is performed. In a case where the data is not included in the inquiry list, since the transmission and reception of all the check packets and the response packets succeed, the determination unit 66 determines that the failure does not occur in the paths used in the transmission and reception of all the check packets and the response packets (No in step S233). Here, the determination unit 66 outputs the success determination to the display device, and ends the process (step S235).

As described above, according to the third embodiment, since the responses to the plurality of check packets is grouped as one response packet, it is possible to avoid the increase in the number of response packets. For one of groups of check packets grouped for each combination of the transmission sources and the IDs of the check packets, the plurality of response packets is transmitted, and information of another response packet is included in each response packet. Another response packet is a response to the same check packet as that of the response packet including the information of another response packet. Accordingly, in the third embodiment, it is possible to specify the path in which the failure occurs in the physical network by using the arrival state of the check packet and the reception state of the response packet.

In the third embodiment, since the plurality of check packets is transmitted, whether or not the failure occurs in the plurality of paths to the destination of the check packet from the transmission source of the check packet is examined. Thus, the third embodiment is useful in a case where the node or the application in which the failure occurs is not specified in the network.

<OTHERS>

The embodiments are not limited to the above-described embodiments, and may be modified in various forms. Hereinafter, some modification examples will be described.

For example, the number of response packets generated by the communication device 20, 50, or 60 may be arbitrarily changed depending on the implementation of the components. The number of check packets transmitted from the communication device 60 when the checking is performed once may be arbitrarily changed depending on the implementation of the components.

The arithmetic operation when the transmission source port number included in the response packet is determined may be determined depending on the implementation of the components. Although it has been described in the above-described example that the predetermined value is added to the transmission port of the check packet when the transmission source port number included in the response packet is determined, the predetermined value may be subtracted from the transmission port of the check packet, or another arithmetic operation may be performed.

In order to apply the above-described example with a network including a communication device other than the communication device 20, 50, or 60 according to the embodiments, the above-described example may be modified such that the determination unit 35 determines whether or not header information of the packet other than the reception packet is included in the data included in the received packet. In this case, if the inclusion of the header information of the packet other than the received packet in the data of the received response packet is specified, the determination unit 35 performs the reception process illustrated in FIG. 13. For example, in FIG. 13, a process of determining whether or not the information of another response packet is included in the response packet may be included between step S42 and step S43.

Although it has been described in the above-described example that the UDP packet is used as the check packet and the response packet, the protocol used for the check packet or the response packet may be changed depending on the implementation of the components. For example, The Internet Control Message Protocol (ICMP) may be used.

Similarly to the second embodiment, the third embodiment may be modified such that the communication device 60 as the transmission side of the response packet learns the overlapping state of the paths. The third embodiment may be modified such that the communication device 60 as the transmission source that transmits the plurality of check packets inquires of the management device 80 about the transmission paths of the transmitted check packets, and learns the overlapping state of the paths. In this case, in a case where the check packets are transmitted to the communication device 60 later, the communication device 60 as the transmission side may transmit the plurality of check packets such that the transmission paths do not overlap each other.

In the above-described embodiments, the timing when the check packet is transmitted may be arbitrarily changed depending on the implementation of these components. For example, the operator designates the destination of the check packet from a specific communication device 20, and executes a command, and thus, the check packet may be transmitted. The operator may designate the transmission source of the check packet and the destination of the check packet and may execute the command by using a management console. The operator may previously set the combination of the transmission source of the check packet, the destination of the check packet, and a time interval at which the checking is performed to the system, and may check the state of the transmission path in the system for every predetermined time. The operator may designate the transmission source port number of the check packet when the command related to the transmission of the check packet is executed. In a case where the designation is performed by the operator, the communication device 20 generates the check packet by using the designated transmission source port number. The above-described modification example is not limited to the case where the communication device 20 is used in the system, and may be applied to a system in which the communication device 50 or the communication device 60 is used.

The transmission of the check packet may be recognized by the determination unit 35 or the determination unit 66 by previously performing the setting when the failure occurs in the system. In this case, if all the response packets are received, the determination unit 35 or the determination unit 66 may generate a message notifying that there is a possibility that the failure will occur in the virtual network instead of the success determination.

The format of the packet or the table used in the above description is an example, and the information elements of the packet or the table may be changed depending on the implementation of these components.

The arithmetic operation performed for traffic distribution may also be changed depending on the implementation of these components. For example, a hash function may be calculated using five types of information elements without using seven types of information elements as described in FIG. 7. In this case, hash values are calculated using information items of the destination MAC address, the transmission source MAC address, the transmission source IP address, the destination IP address, and the protocol. The hash function used when the hash values are calculated may also be arbitrarily selected depending on the implementation of these components. The function used for the traffic distribution is not limited to a remainder function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium that stores a determination program that causes a computer processor included in a communication device to execute a process, the communication device monitoring a communication state with a communication destination device, the process comprising:
   transmitting a single check packet to the communication destination device;
   when the communication device receives a first response packet, determining whether or not header information of a second response packet is included in data of the first response packet, both of the first response packet and the second response packet being transmitted from the communication destination device that received first response packet in response to reception of the single check packet on the communication destination device, a communication path corresponding to the first response packet and a communication path corresponding to the second response packet being different each other; and
   determining that a failure occurs in the communication path corresponding to the second response packet when the header information of a second response packet is included in data of the first response packet and when the communication device does not receive the second response packet within a predetermined time from transmitting the check packet.

2. The non-transitory computer-readable storage medium according to claim 1, wherein the process comprises:
   storing, in a memory, header information included in the check packet before the check packet is transmitted;
   determining that there is a possibility that the check packet fails to be transmitted when the first response packet and the second response packet are not received within the predetermined time; and
   determining that a communication path corresponding to the check packet is a communication path having a possibility that the failure occurs.

3. The non-transitory computer-readable storage medium according to claim 1, wherein the process comprises:
   obtaining, from the first response packet, header information of a plurality of response packets, each of the plurality of response packets being transmitted from the communication destination device in response to reception of the check packet on the communication destination device;
   determining whether or not the communication device has been received all of the plurality of response packets based on the obtained header information of a plurality of response packets and one or more response packets received on the communication device within the predetermined time, the one or more response packets being included in the plurality of response packets; and
   determining that a failure is not occurred in the communication paths between the communication device and the communication destination device.

4. The non-transitory computer-readable storage medium according to claim 1, wherein the process comprises:
   setting predetermined values, as identification numbers set whenever checking is performed, to each of a plurality of check packets to be transmitted to the communication destination device;
   setting different transmission source port numbers between the plurality of check packets;
   transmitting the plurality of check packets to the communication destination device;
   when the identification number is set to be the predetermined value and when a list that represents the transmission source port numbers of the check packets that succeed to be received by the communication destination device is included in the first response packet, determining that the failure occurs in a path used for transmitting a specified check packets which are not included in the list.

5. The non-transitory computer-readable storage medium according to claim 1, wherein the process comprises:
   generating a plurality of packets as responses to a first check packet to be used for checking a communication state between the communication device and another communication device by using different transmission source port numbers between the plurality of packets when the communication device receives the first check packet from the other communication device;
   transmitting, to a management device, information of a network of header information of the plurality of packets as the responses to the first check packet, the management device retaining management information of a network;
   acquiring information indicating a plurality of transmission paths corresponding to each of the plurality of packets as responses to the first check packet from the management device;
   storing, in a memory, the transmission source port numbers included in a specified group of packets included in the plurality of packets as responses to the first check packet;
   when the communication device receives a second check packet transmitted from the other communication device, transmitting a plurality of packets, as responses to the second check packet, by using the transmission source port numbers stored in the memory.

6. A communication device that checks a communication state with a communication destination device, the communication device comprising:
   a memory; and
   a processor coupled to the memory and the processor configured to:
      transmit a single check packet to the communication destination device;
      when the communication device receives a first response packet, determine whether or not header information of a second response packet is included in data of the first response packet, both of the first response packet and the second response packet being transmitted from the communication destination device that received first response packet in response to reception of the single check packet on the communication destination device, a communication path corresponding to the first response packet and a communication path corresponding to the second response packet being different each other; and
      determine that a failure occurs in the communication path corresponding to the second response packet when the header information of a second response packet is included in data of the first response packet and when the communication device does not receive the second response packet within a predetermined time from transmitting the check packet.

7. A determination method executed by a communication device that checks a communication state with a communication destination device, the determination method comprising:
   transmitting a single check packet to the communication destination device;
   when the communication device receives a first response packet, determining whether or not header information of a second response packet is included in data of the first response packet, both of the first response packet and the second response packet being transmitted from the communication destination device that received first response packet in response to reception of the single check packet on the communication destination device, a communication path corresponding to the first response packet and a communication path corresponding to the second response packet being different each other; and
   determining that a failure occurs in the communication path corresponding to the second response packet when the header information of a second response packet is included in data of the first response packet and when the communication device does not receive the second response packet within a predetermined time from transmitting the check packet.

* * * * *